(12) United States Patent
Takeuchi

(10) Patent No.: US 8,909,731 B2
(45) Date of Patent: Dec. 9, 2014

(54) CONTENT REPRODUCTION DEVICE, CONTROL METHOD AND NETWORK SYSTEM

(75) Inventor: Masaki Takeuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 383 days.

(21) Appl. No.: 12/811,501

(22) PCT Filed: Jan. 8, 2009

(86) PCT No.: PCT/JP2009/050128
§ 371 (c)(1),
(2), (4) Date: Jul. 1, 2010

(87) PCT Pub. No.: WO2009/090906
PCT Pub. Date: Jul. 23, 2009

(65) Prior Publication Data
US 2010/0287258 A1    Nov. 11, 2010

(30) Foreign Application Priority Data
Jan. 16, 2008 (JP) ................................. 2008-007061

(51) Int. Cl.
G06F 15/16 (2006.01)
G08C 17/00 (2006.01)
H04N 21/41 (2011.01)
H04N 21/422 (2011.01)
H04N 21/432 (2011.01)
H04N 21/433 (2011.01)

(52) U.S. Cl.
CPC ............ *G08C 17/00* (2013.01); *H04N 21/4126* (2013.01); *H04N 21/4131* (2013.01); *H04N 21/4135* (2013.01); *H04N 21/42202* (2013.01); *H04N 21/42204* (2013.01); *H04N 21/4325* (2013.01); *H04N 21/4334* (2013.01); *G08C 2201/50* (2013.01)
USPC .......................................... 709/217; 709/246

(58) Field of Classification Search
USPC .................................................. 709/217, 246
See application file for complete search history.

(56) References Cited

U.S. PATENT DOCUMENTS

| 6,985,450 B2* | 1/2006 | Slemmer et al. .............. 370/270 |
| 7,909,698 B2* | 3/2011 | Onoda et al. ..................... 463/36 |
| 7,929,693 B2* | 4/2011 | Terauchi et al. ................. 380/44 |
| 8,195,782 B2* | 6/2012 | Yi et al. ......................... 709/223 |
| 2002/0154138 A1 | 10/2002 | Wada et al. |
| 2005/0219055 A1* | 10/2005 | Takai et al. ................. 340/573.1 |
| 2006/0128370 A1* | 6/2006 | Tahara ........................... 455/420 |

(Continued)

FOREIGN PATENT DOCUMENTS

| CN | 1394327 A | 1/2003 |
| CN | 1937813 A | 3/2007 |

(Continued)

*Primary Examiner* — Abdullahi Salad
(74) *Attorney, Agent, or Firm* — Birch, Stewart, Kolasch & Birch, LLP

(57) ABSTRACT

A content reproduction device (600) determines whether there is a change in the connection state of the content reproduction device. When a determination is made that there is a change in the connection state, the content reproduction device transmits to a portable terminal device (500) control information to control the content reproduction device or another device (600A) connected to the content reproduction device. The portable terminal device can control the content reproduction device or another device connected to the content reproduction device based on the received control information.

7 Claims, 45 Drawing Sheets

(56) References Cited

U.S. PATENT DOCUMENTS

| | | |
|---|---|---|
| 2006/0268336 A1* | 11/2006 | Sakaniwa et al. ............ 358/1.15 |
| 2006/0282848 A1 | 12/2006 | Watanabe et al. |
| 2007/0024462 A1 | 2/2007 | Kitaura |
| 2007/0239847 A1* | 10/2007 | Takehara et al. ............. 709/217 |
| 2008/0014966 A1* | 1/2008 | Chakraborty et al. ..... 455/456.4 |
| 2008/0024296 A1* | 1/2008 | Jeong ........................ 340/539.26 |
| 2008/0082688 A1* | 4/2008 | Yi et al. ........................ 709/246 |
| 2008/0166971 A1* | 7/2008 | Yashiro et al. ............... 455/66.1 |
| 2008/0172725 A1 | 7/2008 | Fujii et al. |
| 2008/0272889 A1* | 11/2008 | Symons ....................... 340/10.1 |
| 2009/0108082 A1* | 4/2009 | Goldmann et al. .......... 236/49.1 |
| 2009/0262710 A1* | 10/2009 | Doi et al. ..................... 370/336 |
| 2010/0138764 A1* | 6/2010 | Hatambeiki et al. .......... 715/765 |
| 2011/0021161 A1* | 1/2011 | Sakaniwa et al. ............... 455/75 |
| 2012/0185574 A1* | 7/2012 | Cho et al. ...................... 709/219 |

FOREIGN PATENT DOCUMENTS

| | | |
|---|---|---|
| CN | 101257385 A | 9/2008 |
| JP | 4-273795 A | 9/1992 |
| JP | 2004-72648 A | 3/2004 |
| JP | 2004-88484 A | 3/2004 |
| JP | 2004-356820 A | 12/2004 |
| JP | 2006-13564 A | 1/2006 |
| JP | 2007-36906 A | 2/2007 |

* cited by examiner

FIG.7

CTD100

| CONTENT ID | MV201 |
|---|---|
| FILE NAME | MV201.mpg |
| TITLE | STORY OF AB |
| CATEGORY | ACTION |
| TIME (MINUTES) | 120 |
| SUBJECT | abc ... |
| PERMITTED REPRODUCTION CONTROL | PLAY<br>STOP<br>PAUSE<br>FAST FORWARD<br>FAST REWIND |
| PROHIBITED REPRODUCTION CONTROL | SLOW REPRODUCTION |

FIG.8

EVD200

| CONTENT ID | MV201 |
|---|---|
| RECOMMENDED TEMPERATURE (°C) | 26 |
| RECOMMENDED HUMIDITY (%) | 40 |
| RECOMMENDED LIGHT INTENSITY (LUX) | 400 |
| RECOMMENDED VOLUME (DECIBEL) | 60 |
| RECOMMENDED SCREEN BRIGHTNESS (LUX) | 400 |

| NO. | CONTENT ID | TITLE | CONTENT FORM | DEVICE TYPE LABEL | LOCATION INFORMATION |
|---|---|---|---|---|---|
| 1 | MV101 | DRAMA AA | RECORDED | HDREC-1 | HDMI-1 |
| 2 | MV121 | SS MUSIC | RECORDED | HDREC-1 | HDMI-1 |
| 3 | MV131 | QUIZ DD | RECORDED | PC-1 | http://111.222.33.02/ |
| ⋮ | ⋮ | ⋮ | ⋮ | ⋮ | ⋮ |
| 31 | MV201 | STORY OF AB | INTERNET (VOD) | — | http://www.bb7.com/ |
| 32 | MV202 | NN SOCCER | INTERNET (DLMV) | — | http://www.bb7.com/ |
| ⋮ | ⋮ | ⋮ | ⋮ | ⋮ | ⋮ |
| 51 | PIC301 | NET ALBUM | INTERNET (DL) | — | http://www.pic7.com/ |
| ⋮ | ⋮ | ⋮ | ⋮ | ⋮ | ⋮ |

| CONTENT FORM |
|---|
| RECORDED |
| INTERNET (VOD) |
| INTERNET (DLMV) |
| INTERNET (DL) |

| CONTENT ID | TITLE |
|---|---|
| MV201 | STORY OF AB |
| MV202 | NN SOCCER |
| ⋮ | ⋮ |

| ILLUMINATION LEVEL | LIGHT INTENSITY (LUX) |
|---|---|
| L1 | 50 |
| L2 | 100 |
| L3 | 300 |
| L4 | 400 |
| L5 | 600 |

FIG.18

ACD520

| | |
|---|---|
| TEMPERATURE SETTING (°C) | 24 |
| HUMIDITY SETTING (%) | 40 |
| OPERATION MODE | COOL |
| AIR VOLUME MODE | WEAK |

FIG.19

VTD410

| VOLUME VALUE | VOLUME (DECIBEL) |
|---|---|
| 0 | 0 |
| ⋮ | ⋮ |
| 5 | 20 |
| ⋮ | ⋮ |
| 15 | 40 |
| ⋮ | ⋮ |
| 20 | 60 |
| ⋮ | ⋮ |
| 40 | 80 |
| ⋮ | ⋮ |
| 50 | 100 |

FIG.20

LTD420

| SCREEN BRIGHTNESS | LIGHT INTENSITY (LUX) |
|---|---|
| VERY DARK | 100 |
| DARK | 200 |
| NORMAL | 400 |
| BRIGHT | 600 |
| VERY BRIGHT | 800 |

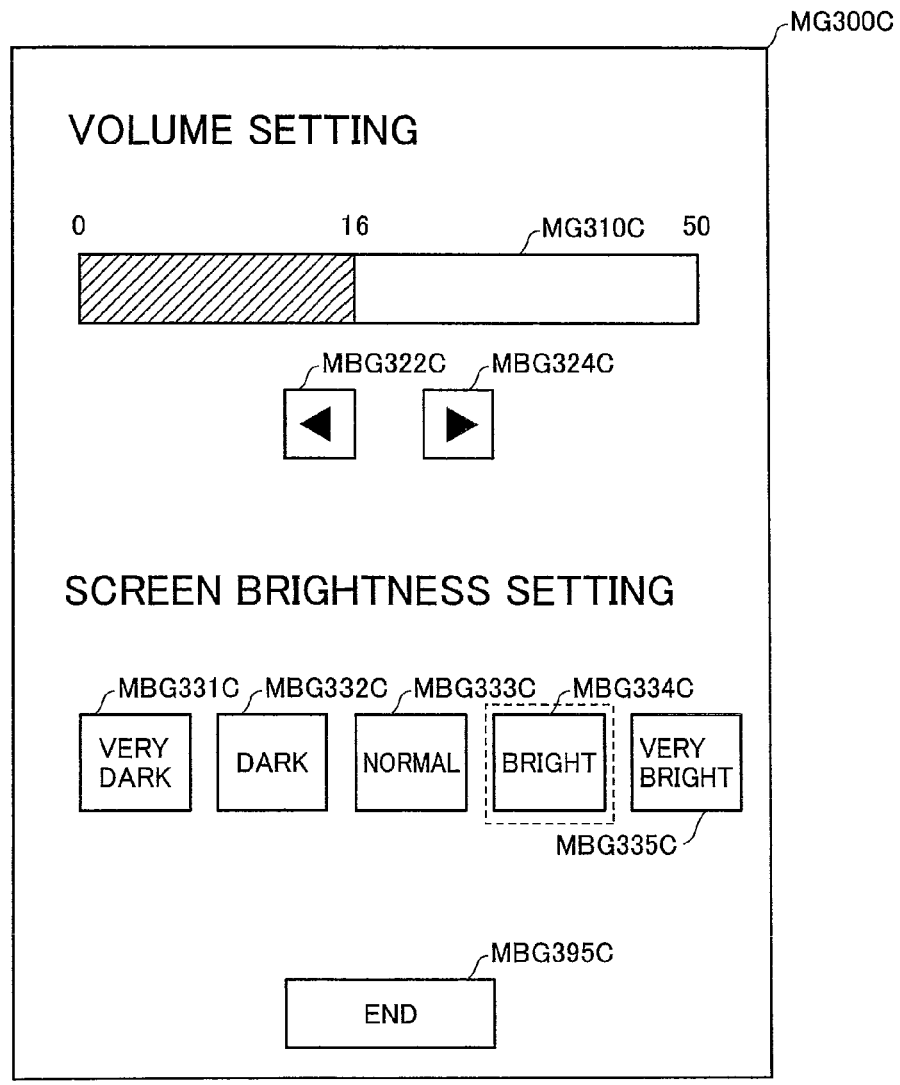

FIG.23

| CONTENT ID | REPRODUCTION CONTROL | VOLUME CONTROL | SCREEN BRIGHTNESS CONTROL | ILLUMINATION DEVICE CONTROL | AIR CONDITIONING DEVICE CONTROL |
|---|---|---|---|---|---|
| MV201 | PLAY | 20 | NORMAL | L4 | 26°C |
| | STOP | | | | 40% |
| | PAUSE | | | | AUTOMATIC |
| | FAST FORWARD | | | | AUTOMATIC |
| | FAST REWIND | | | | |

| CONTENT ID | REPRODUCTION CONTROL | VOLUME CONTROL | SCREEN BRIGHTNESS CONTROL | ILLUMINATION DEVICE CONTROL | AIR CONDITIONING DEVICE CONTROL |
|---|---|---|---|---|---|
| MV201 | PLAY | 19 | NORMAL | L3 | 27°C |
|  | STOP |  |  |  | 40% |
|  | PAUSE |  |  |  | AUTOMATIC |
|  | FAST FORWARD |  |  |  | AUTOMATIC |
|  | FAST REWIND |  |  |  |  |

| REPRODUCTION STOPPED DATE | CONTENT ID | TITLE | CONTENT FORM | VOLUME VALUE | TIME (MINUTE: SECOND) | STOPPED TIME (MINUTE: SECOND) | DEVICE TYPE LABEL | LOCATION INFORMATION |
|---|---|---|---|---|---|---|---|---|
| 2008/1/10 19:20:30 | MV131 | QUIZ DD | RECORDED | 20 | 60:00 | 20:10 | PC-1 | http://111.222.33.02/mv131.mpg |

| NUMBER | REPRODUCTION STOPPED DATE | CONTENT ID | TITLE | CONTENT FORM | VOLUME VALUE | TIME (MINUTE: SECOND) | STOPPED TIME (MINUTE: SECOND) | DEVICE TYPE LABEL | LOCATION INFORMATION |
|---|---|---|---|---|---|---|---|---|---|
| 1 | 2008/1/14 21:15:50 | MV101 | DRAMA AA | RECORDED | 18 | 60:00 | 15:45 | HDREC-B | http://111.222.33.11/mv101.mpg |
| 2 | 2008/1/13 19:40:30 | MV121 | SS MUSIC | RECORDED | 21 | 50:10 | 26:40 | HDREC-B | http://111.222.33.11/mv121.mpg |
| 3 | 2008/1/11 20:25:20 | MV201 | STORY OF AB | INTERNET (VOD) | 22 | 120:00 | 30:20 | — | http://www.bb7.com/vod/mv201.mpg |
| 4 | 2008/1/10 19:20:30 | MV131 | QUIZ DD | RECORDED | 20 | 60:00 | 20:10 | PC-1 | http://111.222.33.02/mv131.mpg |
| ... | ... | ... | ... | ... | ... | ... | ... | ... | ... |

| NUMBER | REPRODUCTION STOPPED DATE | CONTENT ID | TITLE | CONTENT FORM | VOLUME VALUE | TIME (MINUTE: SECOND) | STOPPED TIME (MINUTE: SECOND) | DEVICE TYPE LABEL | LOCATION INFORMATION |
|---|---|---|---|---|---|---|---|---|---|
| 1 | 2008/1/14 21:15:50 | MV101 | DRAMA AA | RECORDED | 18 | 60:00 | 15:45 | HDREC-B | http://111.222.33.11/mv101.mpg |
| 2 | 2008/1/13 19:40:30 | MV121 | SS MUSIC | RECORDED | 21 | 50:10 | 26:40 | HDREC-B | http://111.222.33.11/mv121.mpg (NO CONTENT) |
| 3 | 2008/1/11 20:25:20 | MV201 | STORY OF AB | INTERNET (VOD) | 22 | 120:00 | 30:20 | — | http://www.bb7.com/vod/mv201.mpg |
| 4 | 2008/1/10 19:20:30 | MV131 | QUIZ DD | RECORDED | 20 | 60:00 | 20:10 | PC-1 | http://111.222.33.02/mv131.mpg (COMMUNICATION DISABLED) |
| ... | ... | ... | ... | ... | ... | ... | ... | ... | ... |

FIG.33

| TIME ZONE | TV-1 | HDREC-1 | TV-A | PC-1 | HDREC-B | LIGHT-1 | ... | MT800 |
|---|---|---|---|---|---|---|---|---|
| 6:00–6:59 | 0 | 0 | 0 | 0 | 0 | 0 | ... | |
| 7:00–11:59 | 0 | 0 | 0 | 0 | 0 | 0 | ... | |
| ... | ... | ... | ... | ... | ... | ... | ... | |
| 19:00–19:59 | 0 | 0 | 0 | 0 | 0 | 0 | ... | |
| 20:00–21:59 | 0 | 0 | 0 | 0 | 0 | 0 | ... | |
| 22:00–23:59 | 0 | 0 | 0 | 0 | 0 | 0 | ... | |
| ... | ... | ... | ... | ... | ... | ... | ... | |

FIG.35

| TIME ZONE | TV-1 | HDREC-1 | TV-A | PC-1 | HDREC-B | LIGHT-1 | ... |
|---|---|---|---|---|---|---|---|
| 6:00-6:59 | 10 | 0 | 25 | 0 | 2 | 4 | ... |
| 7:00-11:59 | 64 | 30 | 10 | 3 | 0 | 10 | ... |
| ... | ... | ... | ... | ... | ... | ... | |
| 19:00-19:59 | 24 | 26 | 8 | 10 | 10 | 15 | ... |
| 20:00-21:59 | 84 | 30 | 16 | 12 | 11 | 10 | ... |
| 22:00-23:59 | 22 | 12 | 40 | 2 | 2 | 4 | ... |
| ... | ... | ... | ... | ... | ... | ... | |

| TIME ZONE | DEVICE TYPE LABEL | SITE |
|---|---|---|
| 6:00-6:59 | TV-A | BEDROOM |
| 7:00-11:59 | TV-1 | LIVING ROOM |
| ⋮ | ⋮ | ⋮ |
| 19:00-19:59 | HDREC-1 | LIVING ROOM |
| 20:00-21:59 | TV-1 | LIVING ROOM |
| 22:00-23:59 | TV-A | BEDROOM |
| ⋮ | ⋮ | ⋮ |

| DEVICE TYPE LABEL | POWER STATE | COMMUNICATION STATE |
|---|---|---|
| HDREC-1 | ON (DURING PREPROGRAMMED RECORDING) | ONLINE |

| DEVICE TYPE LABEL | POWER STATE | COMMUNICATION STATE |
|---|---|---|
| LIGHT-1 | ON | ONLINE |

| DEVICE TYPE LABEL | POWER STATE | COMMUNICATION STATE |
|---|---|---|
| LIGHT-2 | ON | ONLINE |

| DEVICE TYPE LABEL | POWER STATE | COMMUNICATION STATE |
|---|---|---|
| AIR-CNT-1 | OFF | ONLINE |

| DEVICE TYPE LABEL | DEVICE DESIGNATION | POWER STATE | COMMUNICATION STATE | SITE |
|---|---|---|---|---|
| HDREC-1 | HDD RECORDER | ON (DURING PREPROGRAMMED RECORDING) | ONLINE | LIVING ROOM |
| LIGHT-1 | LIVING ROOM ILLUMINATION | ON | ONLINE | LIVING ROOM |
| LIGHT-2 | HALLWAY ILLUMINATION | ON | ONLINE | HALLWAY |

CONTENT REPRODUCTION DEVICE, CONTROL METHOD AND NETWORK SYSTEM

TECHNICAL FIELD

The present invention relates to a content reproduction device, a control method and a network system. Particularly, the present invention relates to a content reproduction device, a control method, and a network system for a user to control various devices using a device such as a remote controller.

BACKGROUND ART

In recent years, a content reproduction device such as a television receiver, allowing connection with a wide variety of devices, media, and the like, is becoming pervasive.

Japanese Patent Laying-Open No. 04-273795 (Patent Document 1) discloses the technique for detecting the state of a plurality of connected devices, and controlling the plurality of devices according to the detected state.

Patent Document 1: Japanese Patent Laying-Open No. 04-273795

DISCLOSURE OF THE INVENTION

Problems to be Solved by the Invention

A content reproduction device often has its connection state changed since a wide variety of devices, media, and the like will be connected. A content reproduction device is often controlled by another device such as a remote controller in possession of the user. For the standpoint of convenience, it is often required to allow another device such as a remote controller to control a device according to the connection state. Japanese Patent Laying-Open No. 04-273795 (Patent Document 1) is silent about the approach to control, using a device such as a remote controller, a content reproduction device whose connection state changes.

The present invention is directed to solving the problem set forth above, and an object is to provide a content reproduction device, a control method, and a network system that can control a content reproduction device whose connection state changes or another device connected to the content reproduction device, through the usage of a device such a remote controller by a user.

Means for Solving the Problems

To solve the problem set forth above, the present invention according to an aspect provides a content reproduction device communicating with a portable terminal device. The portable terminal device controls the content reproduction device or another device connected to the content reproduction device based on control information. The content reproduction device includes a determination unit determining whether there is a change in a connection state of the content reproduction device, and a transmission unit transmitting, to the portable terminal device, control information to control the content reproduction device or another device connected to the content reproduction device, when the determination unit determines that there is a change in the connection state.

Preferably, the transmission unit transmits the control information to the portable terminal device through near-field wireless communication.

Preferably, the determination unit determines whether there is a change in the connection state of the content reproduction device by determining whether another device has been connected to the content reproduction device or not. The transmission unit transmits, to the portable terminal device, first control information to control another device, when the determination unit determines that there is a change in the connection state.

Preferably, the determination unit determines whether there is a change in the connection state of the content reproduction device by determining whether a recording medium is connected to the content reproduction device or not. The transmission unit transmits, to the portable terminal device, second control information to cause the content reproduction device to access the recording medium, when the determination unit determines that there is a change in the connection state.

Preferably, the content reproduction device further includes a display unit to display content. The recording media stores content. The portable terminal device causes the display unit to display the content recorded on the recording media based on the second control information.

According to another aspect of the present invention, there is provided a control method for causing a portable terminal device to control a content reproduction device. The control method includes the steps of the content reproduction device determining whether there is a change in the connection state of the content reproduction device, and the content reproduction device transmitting, to the portable terminal device, control information to control the content reproduction device or another device connected to the content reproduction device, when a determination is made that there is a change in the connection state.

According to a further aspect of the present invention, there is provided a network system including a content reproduction device, a portable terminal device capable of data communication with the content reproduction device, and a recording medium or another device capable of data communication with the content reproduction device. The content reproduction device includes a determination unit determining whether the content reproduction device is capable of data communication with another device or recording medium, and a transmission unit transmitting, to the portable terminal device, control information to control the content reproduction device or another device, when the determination unit determines that data communication is allowed. The portable terminal device receives the control information from the content reproduction device to control the content reproduction device or another device based on the control information.

Effects of the Invention

A content reproduction device of the present invention determines whether there is a change in the connection state of the content reproduction device, and when a determination is made that there is a change in the connection state, control information to control the content reproduction device or another device connected to the content reproduction device is transmitted to the portable terminal device.

Therefore, the portable terminal device can control the content reproduction device or another terminal based on the control information received from the content reproduction device.

The control method according to the present invention causes the content reproduction device to determine whether there is a change in the connection state of the content reproduction device, and transmits, to the portable terminal device, the control information to control the content reproduction device or another device connected to the content reproduction device, when a determination is made that there is a change in the connection state.

Therefore, the portable terminal device can control the content reproduction device or another terminal based on the control information received from the content reproduction device.

BRIEF DESCRIPTION OF THE DRAWINGS

FIG. 7 represents content related data, by way of example.

FIG. 8 represents environment data, by way of example.

FIG. 9 shows a content information data table, by way of example.

FIG. 10 shows list selection data, by way of example.

FIG. 12 shows content list data, by way of example.

FIG. 14 shows an illumination data table, by way of example.

FIG. 18 shows air adjustment setting data, by way of example.

FIG. 19 shows a volume data table, by way of example.

FIG. 20 shows a screen brightness data table, by way of example.

FIG. 21 shows a control image, by way of example.

FIG. 22 shows reproduction device setting data, by way of example.

FIG. 23 shows reproduction environment data, by way of example.

FIG. 25 shows changed reproduction environment data, by way of example.

FIG. 28 shows resume data, by way of example.

FIG. 29 shows a resume data table, by way of example.

FIG. 31 shows a resume data table, by way of example.

FIG. 33 shows an hourly control device count table, by way of example.

FIG. 35 shows an hourly control device count table, by way of example.

FIG. 36 shows an hourly control device data table, by way of example.

FIG. 39 shows state data, by way of example.

FIG. 40 shows state data, by way of example.

FIG. 41 shows state data, by way of example.

FIG. 42 shows state data, by way of example.

FIG. 43 shows state notification data, by way of example.

Figure 1:
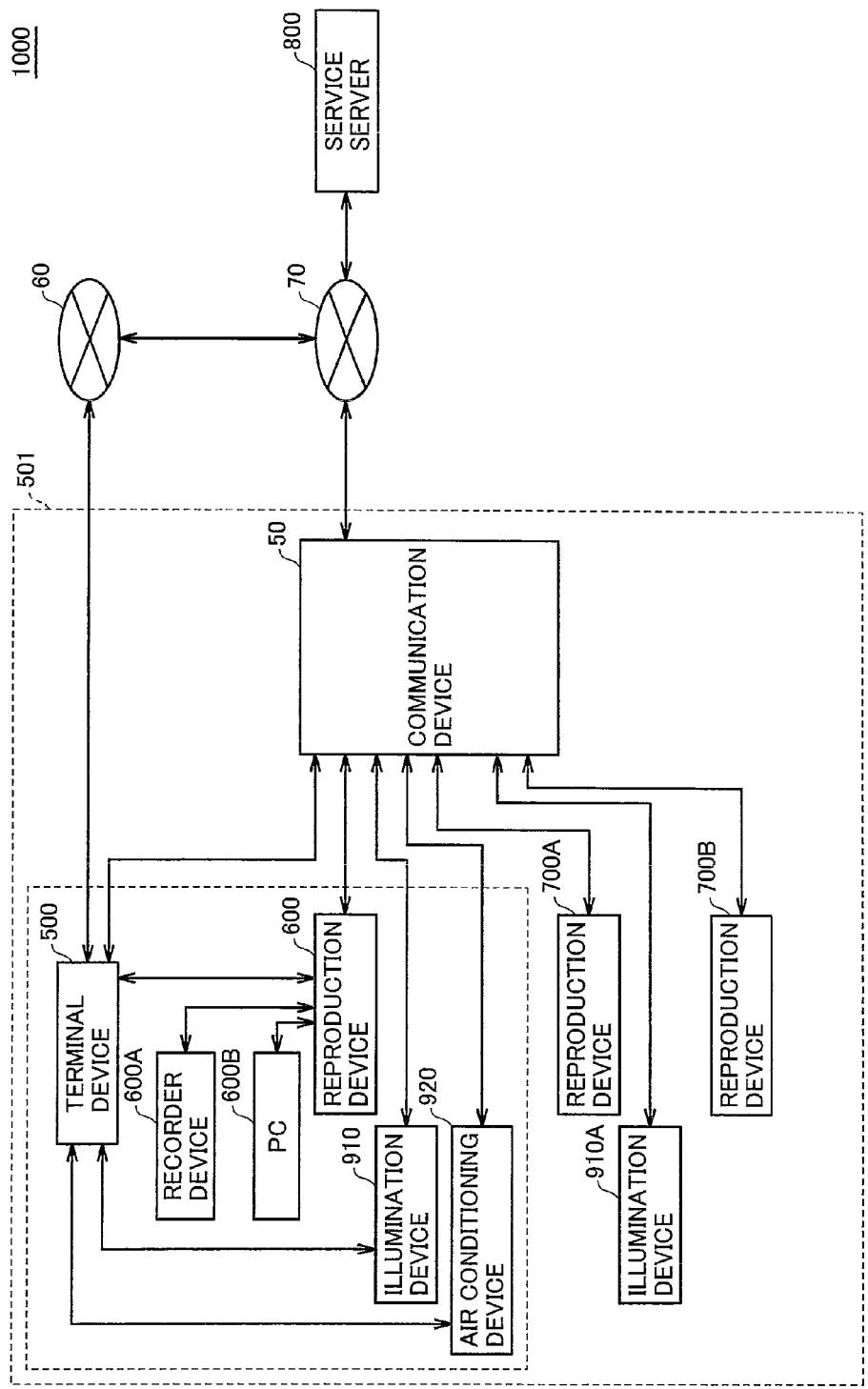
FIG. 1 represents a configuration of a network system according to the present embodiment.

DESCRIPTION OF THE REFERENCE CHARACTERS 50 communication device, 70 network, 180, 180A program, 500 portable terminal device, 510, 610 control unit, 520, 620 storage unit, 530, 630 display unit, 540 input unit, 555, 555A recording medium, 600, 700A, 700B content reproduction device, 600A recorder device, 910, 910A illumination device, 920 air conditioning device, 1000 network system.

BEST MODES FOR CARRYING OUT THE INVENTION

Embodiments of the present invention will be described hereinafter with reference to the drawings. In the description set forth below, the same or corresponding components have the same reference characters allotted. Their designation and function are also identical. Therefore, detailed description thereof will not be repeated.

First Embodiment (System Configuration)

FIG. 1 shows a configuration of a network system 1000 of the present embodiment. Referring to FIG. 1, network system 1000 includes a home network 501.

Home network 501 is, for example, a network provided on the premises. "Premises" include, for example, the user's house, company, and the like. Home network 501 includes a portable terminal device 500, a content reproduction device 600, and a communication device 50.

Portable terminal device 500 is, but not limited to, a cellular phone, and may be any device as long as it has communication capability and is portable. Portable terminal device 500 may be, for example, a PDA (Personal Digital Assistance), PC (Personal Computer), or the like.

Portable terminal device 500 is capable of data communication with another device via a telephone network 60 and wireless connection. Telephone network 60 may be a telephone network for, for example, cellular phones.

Content reproduction device 600 is, but not limited to a television receiver, and may be any device as long as it is capable of content reproduction.

Communication device 50 is a router. Communication device 50 carries out data communication with an external device using wired or wireless technique. Communication device 50 is not limited to a router, and may be any device as long as it can carry out data communication with an external device utilizing wired or wireless technique. Wired technique is based on, for example, Ethernet (registered trademark). Wired technique is not limited to connection based on Ethernet, and may be a technique based on PLC (Power Line Communication), or other wired techniques. Wireless technique is a connection based on, but not limited to IEEE802.11g, for example, and may be another type of wireless technique.

When the wired technique is used, communication device 50 carries out data communication with each of portable terminal device 500, content reproduction device 600 and network 70 via, for example, a LAN (Local Area Network) cable. Network 70 is a wide-area network such as the Internet.

When the wireless technique is used, communication device 50 carries out data communication with each of portable terminal device 500, content reproduction device 600 and network 70 through wireless communication.

Portable terminal device 500 carries out data communication with content reproduction device 600 through wireless or wired connection. Network 70 is capable of data communication with telephone network 60 through wireless or wired connection. Therefore, portable terminal device 500 is capable of data communication with network 70 through telephone network 60.

Home network 501 further includes a recorder device 600A and a PC 600B.

Recorder device 600A is, but not limited to an HDD (Hard Disk Drive) recorder, and may be any device as long as it is capable of content reproduction. Recorder device 600A is connected with content reproduction device 600 through an HDMI cable. An HDMI cable is a cable in accordance with the HDMI (High-Definition Multimedia Interface) standard. Therefore, recorder device 600A and content reproduction device 600 are capable of data communication with each other. The data communication between recorder device 600A and content reproduction device 600 is performed by equipment control signals and a control protocol defined by HDMI-CEC (Consumer Electronics Control). The cable connecting recorder device 600A with content reproduction device 600 is not limited to an HDMI cable, and may be any cable as long as it is capable of data transmission.

PC 600B is a personal computer. PC 600B is connected with content reproduction device 600 through an HDMI cable. Therefore, PC 600B and content reproduction device 600 are capable of data communication with each other. The cable connecting PC 600B and content reproduction device 600 is not limited to an HDMI cable, and may be any cable as long as it is capable of data transmission.

Home network 501 further includes a content reproduction device 700A, and a content reproduction device 700B. Each of content reproduction device 700A and content reproduction device 700B may be any device as long as it is capable of content reproduction. Each of content reproduction device 700A and content reproduction device 700B is, for example, a television set, a PC, a television receiver with recording capability, an HDD recorder, or the like.

Communication device 50 carries out data communication with each of content reproduction devices 700A and 700B using wired or wireless technique.

Home network 501 further includes an illumination device 910, an illumination device 910A, and an air conditioning device 920. Illumination device 910 includes illumination capability, and data communication capability. Illumination device 910A has features similar to those of illumination device 910. Air conditioning device 920 is an air conditioner. Air conditioning device 920 adjusts the temperature, humidity, and the like in one's establishment to the specified value. Air conditioning device 920 has data communication capability. Communication device 50 carries out data communication with each of illumination device 910, illumination device 910A, and air conditioning device 920 using wired or wireless technique.

Each of the illumination device 910 and air conditioning device 920 carries out data communication with portable terminal device 500 through wireless connection.

Each of a plurality of devices carrying out communication with communication device 50 is capable of communication, via communication device 50, with another device that establishes communication with communication device 50.

Now, suppose that portable terminal device 500, content reproduction device 600, recorder device 600A, PC 600B, illumination device 910A and air conditioning device 920 are located in the same room. Illumination device 910A is located in a room differing from the room where illumination device 910 is installed.

Network system 1000 further includes a service server 800. Service server 800 is a personal computer, providing content, information associated with the content, and the like. The content includes, for example, motion pictures, still pictures, music data, and the like. Service server 800 stores a plurality of contents, and information of each of the plurality of contents. Service server 800 transmits or distributes in streaming form the relevant content in response to a request from an external device. It is to be noted that network system 1000 may share contents using a technique based on DLNA (Digital Living Network Alliance).

Service server 800 carries out data communication with network 70 through wireless or wired communication. Therefore, each of a plurality of devices establishing communication with communication device 50 can communicate with service server 800.

(Portable Terminal Device)

Portable terminal device 500 will be described in detail hereinafter.

Figure 2:
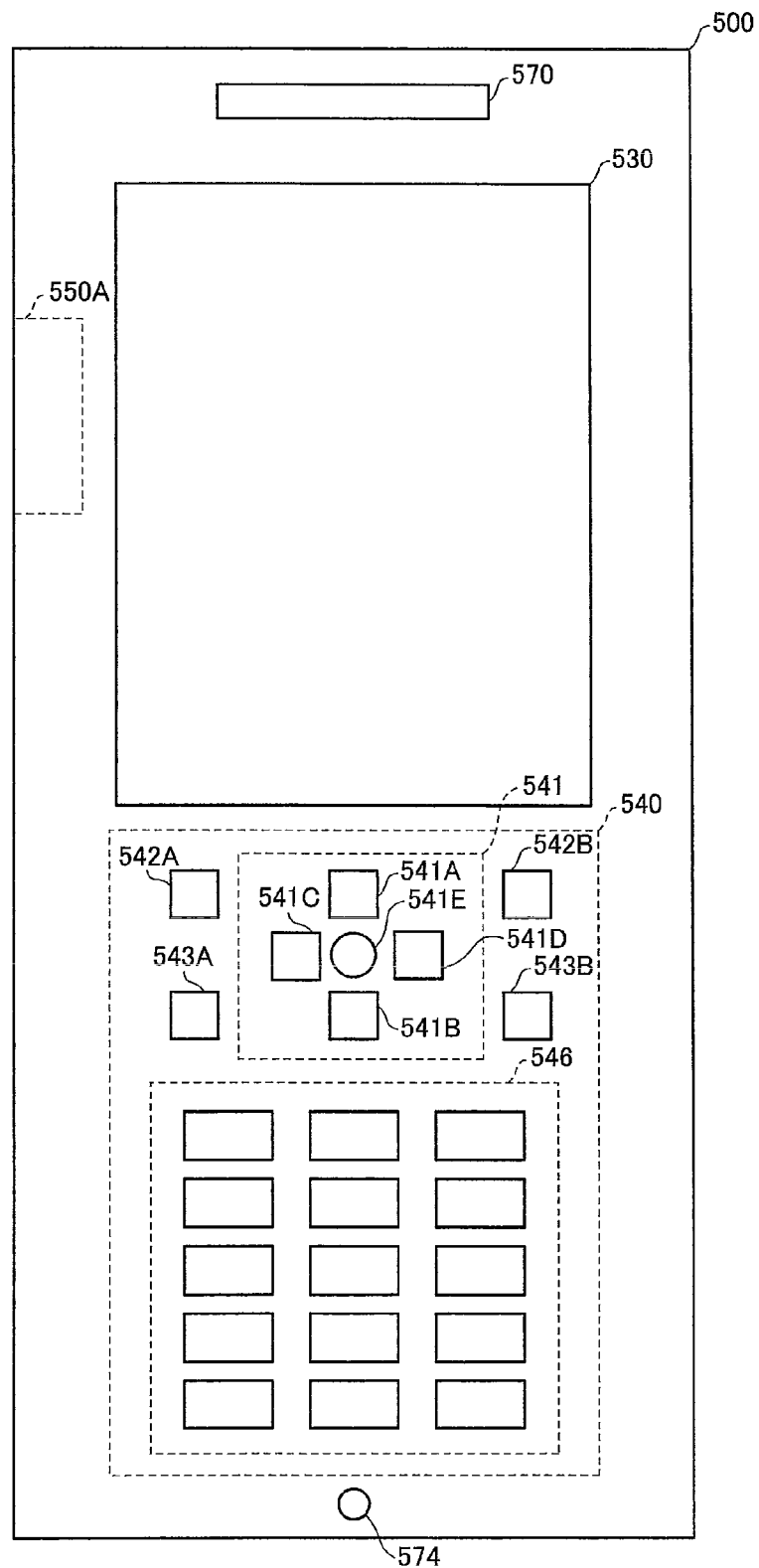
FIG. 2 is a front view of an appearance of a portable terminal device.

FIG. 2 shows the front view of an appearance of portable terminal device 500. Referring to FIG. 2, portable terminal device 500 includes a display unit 530, and an audio output unit 570.

Display unit 530 displays characters, images, and the like. Display unit 530 has a display screen on which texts, images, and the like are displayed. Display unit 530 is a device employing an LCD panel (Liquid Crystal Display Panel). Display unit 530 may be a device employing a panel based on a display scheme other than that cited above. The resolution at the display face of display unit 530 corresponds to, but not limited to, 480 dots (horizontal)×800 dots (vertical), and may take another resolution level.

Display unit 530 has a touch panel function to allow the user to enter information by directly touching the display screen. Display unit 530 transmits the position information corresponding to the touched area at the display screen by the user to a control unit 510 that will be described afterwards. Control unit 510 carries out a predetermined process based on the received position information.

Audio output unit 570 is a speaker providing an output of the sound of a telephone. Audio output unit 570 outputs sound based on audio data received from control unit 510 that will be described afterwards.

Input unit 540 includes a button group 541. Button group 541 includes direction buttons 541A, 541B, 541C, and 541D, as well as a determination button 541E. Direction buttons 541A, 541B, 541C, and 541D are buttons to move a target of movement in the image displayed at display unit 530 (for example, a cursor, or the like) vertically and horizontally according to a depressing operation of a short period of time (for example, less than 1 second) by the user (hereinafter, also referred to as a short depression operation). A button depression operation of a long period of time (for example, 1 second or more) by the user is also referred to as a long depression operation.

Determination button 541E functions to determine an item or the like selected by a short depression operation by the user, for example, of direction buttons 541A, 541B, 541C, and 541D.

Input unit 540 further includes feature buttons 542A, 542B, 543A and 543B. Each of feature buttons 542A, 542B, 543A and 543B functions to carry out an assigned process according to a short depression operation by the user.

Input unit 540 further includes a character button group 546. Character button group 546 includes 15 character buttons. Each of a plurality of character buttons included in character button group 546 functions to enter a number, character, or sign according to a short depression operation by the user.

Input unit 540 transmits a button signal corresponding to a button subjected to a short or long depression operation among the plurality of buttons therein to control unit 510 that will be described afterwards. Namely, input unit 540 is an interface to allow the user to operate portable terminal device 500. Hereinafter, an operation on input unit 540 or a touch operation on display unit 530 by the user is also referred to as an interface operation M.

Portable terminal device 500 further includes an audio input unit 574, and a recording medium insert region 550A. Audio input unit 574 is a microphone to collect sound. Recording medium insert region 550A is the region into which a recording medium that will be described afterwards is inserted in portable terminal device 500.

Figure 3:
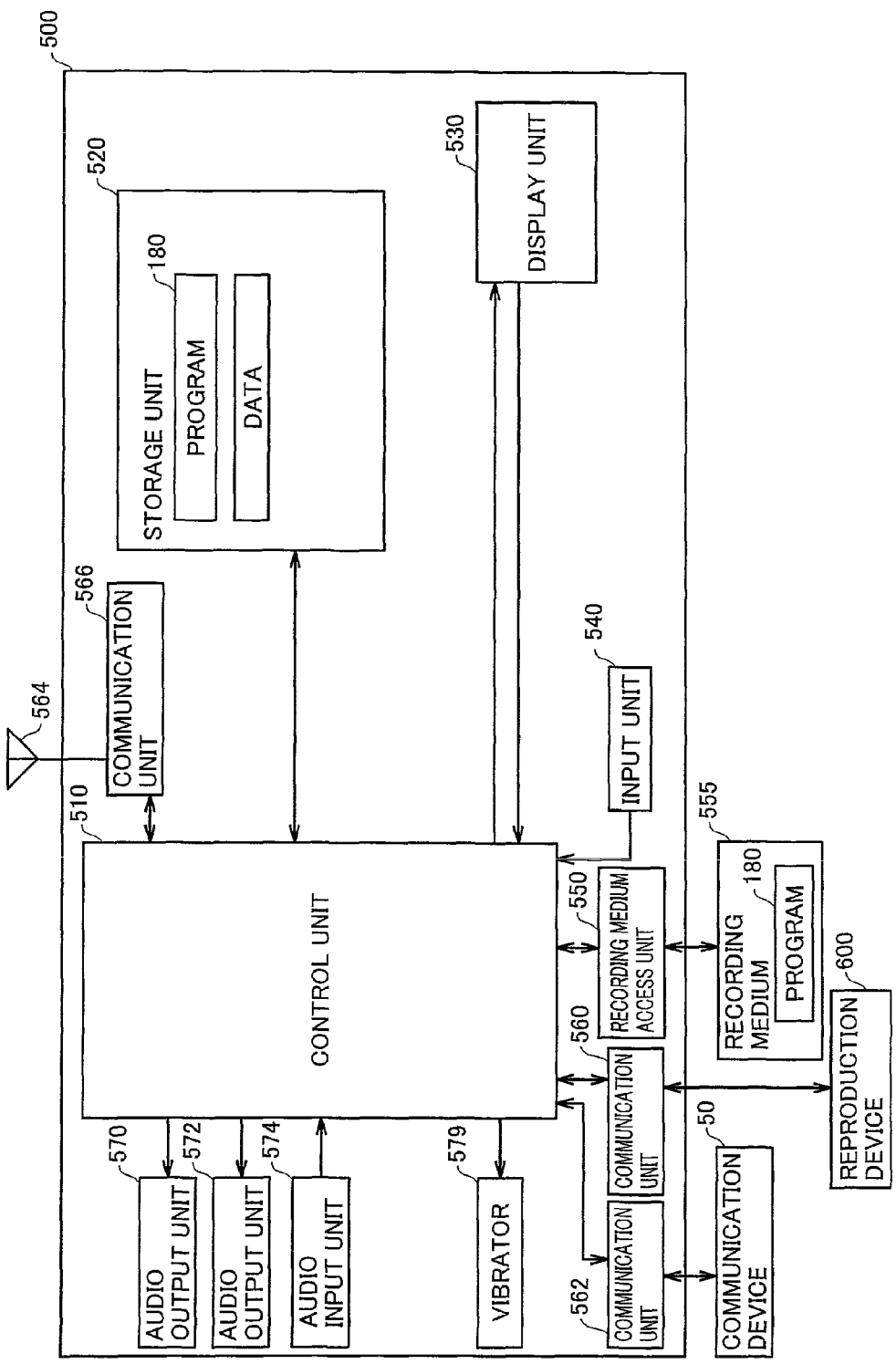
FIG. 3 is a block diagram representing the internal configuration of a portable terminal device.

FIG. 3 is a block diagram showing an internal configuration of portable terminal device 500. For the sake of illustration, a recording medium 555 is also depicted in FIG. 3. Recording medium 555 stores a program 180 that will be described afterwards. In other words, program 180 is available as a program product recorded on a medium or the like. Furthermore, recording medium 555 also is distributed as a program product.

Referring to FIG. 3, portable terminal device 500 further includes a control unit 510 and a storage unit 520.

Storage unit 520 is a memory storing data in a non-volatile manner Storage unit 520 has data accessed by control unit 510. Storage unit 520 is, for example, a flash memory. Storage unit 520 stores program 180 and other various data. Storage unit 520 may be a memory that stores data in a volatile manner.

Control unit 510 carries out various processing, operations, and the like with respect to each component in portable terminal device 500 according to program 180 stored in storage unit 520. Control unit 510 is, but not limited to a CPU (Central Processing Unit), and may be another circuit having processing capability.

Control unit 510 carries out data communication with display unit 530. Control unit 510 causes display unit 530 to display a generated image.

Portable terminal device 500 further includes an input unit 540 and a recording medium access unit 550.

Control unit 510 receives from input unit 540 a button signal corresponding to a button among the plurality of buttons in input unit 540 subjected to a long or short depression operation. Control unit 510 carries out a process according to the received button signal.

Recording medium access unit 550 is rendered data accessible with recording medium 555 when recording medium 555 is inserted (loaded) in portable terminal device 500 through recording medium insert region 550A. Accordingly, recording medium access unit 550 can read out a program 180 from recording medium 555 where program 180 is recorded.

Program 180 stored in recording medium 555 is read out by recording medium access unit 550 through an install process carried out by control unit 510. Control unit 510 causes program 180 to be stored in storage unit 520. Recording medium 555 is recorded with content data and the like. Content data includes, for example, music data, motion picture data, and the like.

Recording medium 555 is, but not limited to, an SD (Secure Digital) memory card, and may be another medium that can store data in a non-volatile manner.

Portable terminal device 500 further includes a communication unit 560, and a communication unit 562.

Communication unit 560 carries out data communication with control unit 510. Communication unit 560 also carries out data communication with content reproduction device 600 through wired or wireless connection.

Communication unit 560 includes the function of a communication interface for serial transfer, based on the standard of USB (registered trademark) (Universal Serial Bus) 2.0. The standard of the communication interface for serial transfer is not limited to USB 2.0, and may be another standard.

Communication unit 560 also carries out wireless communication based on the standard of Bluetooth (registered trademark). In addition, communication unit 560 carries out wireless communication based on infrared rays. Wireless communication is not limited to communication based on the standard of Bluetooth (registered trademark) or infrared rays. Communication based on another scheme may be employed. Communication unit 560 carries out data communication with content reproduction device 600 wirelessly according to a control instruction from control unit 510.

Communication unit 560 carries out data communication with each of illumination device 910 and air conditioning device 920 wirelessly.

Communication unit 562 carries out data communication with control unit 510. Communication unit 562 carries out data communication with communication device 50 using the aforementioned wired or wireless technique corresponding to communication device 50.

Portable terminal device 500 further includes an antenna 564 and a communication unit 566.

Antenna 564 is connected to communication unit 566. Communication unit 566 carries out wireless communication using antenna 564. Communication unit 566 carries out wireless communication with a base station nearby (not shown). The base station nearby establishes communication with telephone network 60. Therefore, communication unit 566 uses antenna 564 to establish communication with telephone network 60 via a base station nearby.

Portable terminal device 500 can also respond to processing by control unit 510 and communication unit 566 to download a program from network 70 through telephone network 60 and store the downloaded program in storage unit 520. In this case, the downloaded program is program 180. Control unit 510 carries out a predetermined process according to the program downloaded from network 70 (program 180).

Portable terminal device 500 further includes an audio output unit 572. Audio output unit 572 is a speaker provided at the outside region of portable terminal device 500. Audio output unit 572 outputs sound based on audio data received from control unit 510.

Control unit 510 carries out data communication with each of audio output unit 570 and audio input unit 574 set forth above. When control unit 510 transmits audio data to audio output unit 570, audio output unit 570 outputs sound based on the audio data received from control unit 510. When a user utters a sound towards audio input unit 574, audio input unit 574 converts the obtained sound into audio data, which is transmitted to control unit 510.

Portable terminal device 500 further includes a vibrator 579. Vibrator 579 responds to a control instruction from control unit 510 to vibrate by itself, causing portable terminal device 500 to vibrate. Vibrator 579 causes portable terminal device 500 to vibrate when a telephone call or electronic mail is received, for example, according to a control instruction from control unit 510.

(Content Reproduction Device)

Content reproduction device 600 will be described in detail hereinafter.

Figure 4:
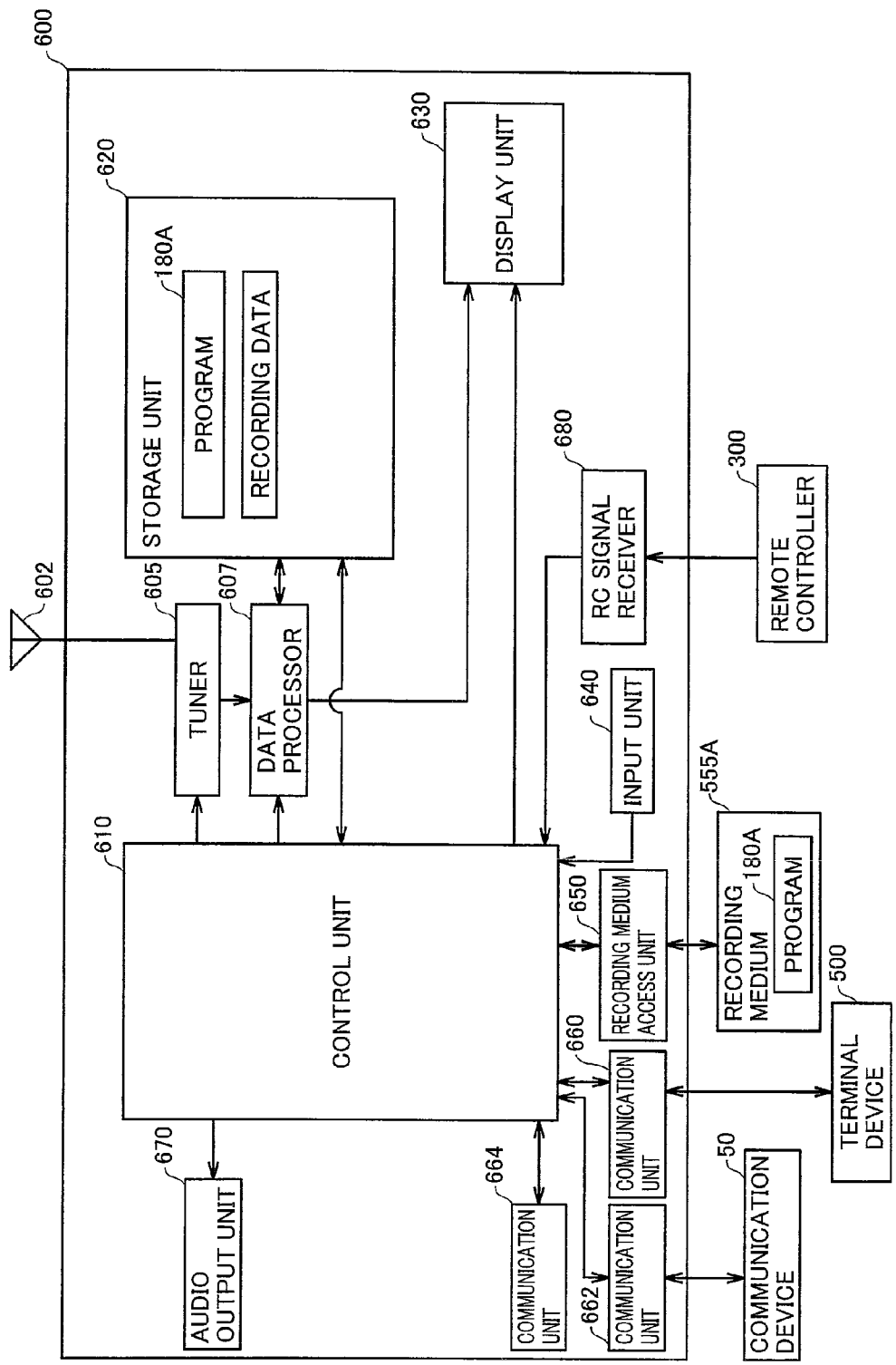
FIG. 4 is a block diagram representing an internal configuration of a content reproduction device.

FIG. 4 is a block diagram showing an internal configuration of content reproduction device 600. For the sake of convenience, FIG. 4 also illustrates a recording medium 555A. Recording medium 555A stores a program 180A that will be described afterwards. Program 180A is available as a program product recorded on a medium or the like. Moreover, recording medium 555A is also distributed as a program product.

Referring to FIG. 4, content reproduction device 600 includes a display unit 630. Display unit 630 has a display screen to display characters, images, and the like. Display unit 630 is a device based on an LCD panel (Liquid Crystal Display Panel). Display unit 630 may be a device based on a panel of a display scheme other than that described above.

The size of the display screen of display unit 630 is greater than the display screen of display unit 530. Further, the resolution of the display screen of display unit 630 is higher than that of the display screen of display unit 530. For example, the display screen of display unit 630 has a resolution of 1920 dots (vertical)×1080 dots (vertical). The display screen of display unit 630 is not limited to the resolution of 1920 dots (vertical)×1080 dots (vertical), and may be based on another resolution level.

Content reproduction device 600 further includes a control unit 610 and a storage unit 620.

Storage unit 620 stores data in a non-volatile manner Storage unit 620 is, but not limited to, a hard disk, data-accessed by control unit 610. Storage unit 620 may be a memory that stores data in a non-volatile manner. Storage unit 620 stores program 180A, recording data that will be described afterwards, and other various types of data. Storage unit 620 may be a memory storing data in a volatile manner. The recording data may be recorded on a device having a storage capacity, other than storage unit 620, such as an externally-provided HDD, BD (Blu-ray Disc), DVD (Digital Versatile Disk), an HDD recorder connected to HDMI, or the like.

Control unit 610 carries out various processing, computing, and the like on each component in content reproduction device 600 according to program 180A stored in storage unit 620. Control unit 610 is similar to control unit 510 set forth before, and detailed description thereof will not be repeated.

Content reproduction device 600 further includes an antenna 602, a tuner 605 and a data processor 607.

Antenna 602 is connected to tuner 605. Tuner 605 receives a broadcast signal of a frequency designated by control unit 610 via antenna 602. Tuner 605 receives broadcast signals based on digital broadcasting and broadcast signals based on analog broadcasting. Tuner 605 transmits the received broadcast signals to data processor 607.

Upon receiving a display instruction to display an image at display unit 630 from control unit 610, data processor 607 obtains image data from the received broadcast signals, and transmits relevant image data to display unit 630. Upon receiving image data, display unit 630 displays an image (motion picture or still picture) based on the image data. Hereinafter, an image based on broadcast signals received by tuner 605 and displayed at display unit 630 is also referred to as a TV image.

In the case where the broadcast signal received at data processor 607 is a signal based on analog broadcasting and a recording instruction to carry out a recording process is received from control unit 610, data processor 607 compresses the image data and audio data obtained from the broadcast signals to store the same in storage unit 620 as recording data. In the case where the broadcast signal received at data processor 607 is a signal based on digital broadcasting and a recording instruction to carry out a recording process is received from control unit 610, data processor 607 stores the image data and audio data obtained from the broadcast signals in storage unit 620 as recording data.

The recording data stored in storage unit 620 is, but not limited to, data compressed under the MPEG2 scheme, and may be data compressed according to another scheme. Another scheme includes, for example, H.264 scheme, and the like. Hereinafter, the recording data stored in storage unit 620 is also referred to as "content".

Control unit 610 carries out data communication with display unit 630. Control unit 610 causes display unit 630 to display a generated image.

Content reproduction device 600 further includes an input unit 640, and a recording medium access unit 650.

Input unit 640 includes a plurality of buttons not shown. The plurality of buttons are provided at the outside area of content reproduction device 600. When any of the plurality of buttons is depressed by the user, input unit 640 transmits to control unit 610 a button signal corresponding to the depressed button. Control unit 610 carries out a predetermined process based on the received button signal. Hereinafter, a button operation made by the user at input unit 640 is also referred to as an interface operation T.

Recording medium access unit 650 reads out a program 180A from recording medium 555A where program 180A is stored. Program 180A in recording medium 555A is read out by recording medium access unit 650 according to an install process by control unit 610. Control unit 610 stores program 180A in storage unit 620. Further, content data and the like are recorded in recording medium 555A. Content data includes, for example, music data, motion picture data, and the like.

Recording medium 555A is, but not limited to, an SD memory card, and may be another medium that can record data in a non-volatile manner.

Content reproduction device 600 also includes a communication unit 660 and a communication unit 662.

Communication unit 660 carries out data communication with control unit 610. Communication unit 660 carries out data communication with portable terminal device 500 through wired or wireless connection. Communication unit 660 has a configuration and function similar to those of communication unit 560 set forth above, and detailed description thereof will not be repeated.

Communication unit 662 carries out data communication with control unit 610. Communication unit 622 utilizes the aforementioned wired or wireless technique of communication device 50 to carry out data communication with communication device 50.

Content reproduction device 600 according to the present embodiment can also download a program through communication device 50 and communication unit 662 from network 70 and store the downloaded program in storage unit 620. In this case, the downloaded program is program 180A. Control unit 610 carries out a predetermined process according to the program downloaded from network 70 (program 180A).

Content reproduction device 600 also includes an RC signal receiver 680. RC signal receiver 680 receives a remote control signal, output from remote controller 300 (hereinafter, also referred to as an RC signal), to control content reproduction device 600. RC signal receiver 680 transmits the received RC signal to control unit 610. Control unit 610 carries out a corresponding process according to the received RC signal. The RC signal may be transmitted from portable terminal device 500.

Hereinafter, the remote control signal to control content reproduction device 600, transmitted from communication unit 560 of portable terminal device 500, is also called an RC signal. In this case, communication unit 660 receives the RC signal transmitted from portable terminal device 500, and transmits the received RC signal to control unit 610. Control unit 610 responds to the received RC signal to carry out a corresponding process.

Hereinafter, an operation mode of portable terminal device 500 capable of controlling content reproduction device 600, based on an RC signal transmitted from portable terminal device 500 to content reproduction device 600, is referred to as a remote control mode (hereinafter, also referred to as an RC mode). An operation mode of portable terminal device 500 capable of controlling a device other than content reproduction device 600 (for example, a recorder device, illumination device, air conditioning device) by an RC signal is also called an RC mode.

Content reproduction device 600 further includes an audio output unit 670. Audio output unit 670 is a speaker provided at an outer region of content reproduction device 600. Audio output unit 670 outputs sound based on the audio data received from control unit 610.

Content reproduction device 600 further includes a communication unit 664. Communication unit 664 carries out data communication with control unit 610. Communication unit 664 carries out data communication with an external device through wired connection. Communication unit 664 has a recorder device 600A and a PC 600B connected through an HDMI cable. Therefore, control unit 610 carries out data communication with each of recorder device 600A and PC 600B through communication unit 664. The cable connecting communication unit 664 with each of recorder device 600A and PC 600B is not limited to an HDMI cable, and may be any cable as long as it can transmit data. In HDMI, an equipment control signal called CEC (Consumer Electronics Control) and control command are prepared, allowing control of a device connected to the HDMI cable through the equipment control signal, control command, and the like.

Content reproduction device 600 receives the supply of an operating voltage for its own operation from a power source not shown. Content reproduction device 600 includes a main power switch and an image display power switch, not shown. Main power switch functions to switch between supplying or not supplying an operating voltage (hereinafter, also referred to as a main voltage) to operate at least respective components for content reproduction device 600 to receive an RC signal, and respective components for content reproduction device 600 to carry out communication with an external device. The image display power switch functions to switch between supplying or not supplying an operating voltage to operate respective components in order to display an image at display unit 630 (hereinafter, also referred to as an image display voltage).

The operation mode of content reproduction device 600 includes a normal mode and a standby mode. When the main power switch and image display power switch are on, content reproduction device 600 attains a normal mode. In this case, the main voltage and image display voltage are supplied to content reproduction device 600 in the normal operation mode. When the main power switch is on and the image display power switch is off, content reproduction device 600 attains a standby operation mode. In this standby mode, image display voltage is not supplied and main voltage is supplied to content reproduction device 600. Therefore, content reproduction device 600 in a standby operation mode cannot have an image displayed at display unit 630. In other words, content reproduction device 600 in a standby mode does not have an image displayed at display unit 630. On/off control of each of the main power switch and image display power switch is performed by control unit 610.

(Reproduction of Content)

The process for reproducing content (hereinafter, also referred to as a content reproduction process) at content reproduction device 600 will be described hereinafter. Hereinafter, the process carried out at portable terminal device 500 in the content reproduction process is also referred to as a content reproduction process M. Further, a process carried out by content reproduction device 600 in a content reproduction process is referred to as a content reproduction process T. Now, suppose that that content reproduction device 600 is in a standby mode. It is assumed that content reproduction device 600 in a standby operation mode is capable of wireless communication with an external device. It is also assumed that program 180 stored in storage unit 520 includes a remote control program (hereinafter, also referred to as an RC program). An RC program is directed to setting the operation mode of portable terminal device 500 at an RC mode by an execution through control unit 510.

Figure 5:
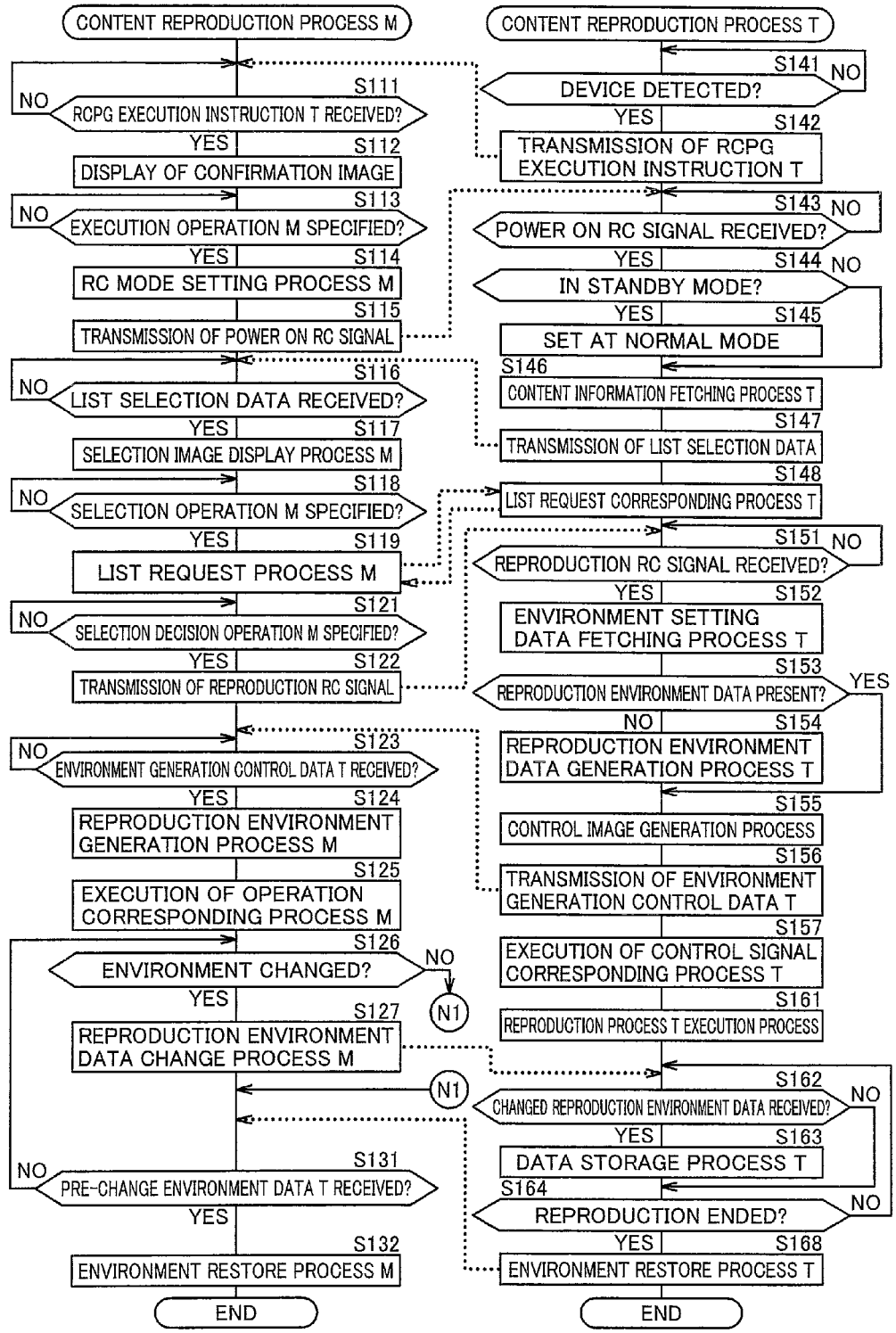
FIG. 5 is a flowchart of a content reproduction process M and a content reproduction process T.

FIG. 5 is a flowchart of a content reproduction process M and a content reproduction process T. In a content reproduction process T in FIG. 5, first the process of step S141 is performed.

At step S141, a determination is made as to whether a device capable of wireless communication has been detected or not. Specifically, control unit 610 detects whether there is a device capable of data communication through wireless communication. As used herein, wireless communication is a near-field wireless communication based on the standard of Bluetooth (registered trademark). When YES at step S141, control proceeds to step S142. When NO at step S141, the process of step S141 is performed again. Now, suppose that portable terminal device 500 is located at a site capable of wireless communication with content reproduction device 600. In this case, a YES determination is made at step S141 to proceed to step S142.

At step S142, control unit 610 transmits through wireless communication an RCPG execution instruction T to portable terminal device 500. This RCPG execution instruction T is directed to causing control unit 510 of portable terminal device 500 to execute an RC program. Then, the process of step of S142 ends.

In a content reproduction process M, first the process of step S111 is performed.

At step S111, control unit 510 determines whether an RCPG execution instruction T has been received or not. When YES at step S111, control proceeds to step S112. When NO at step S111, the process of step S111 is performed again. Now, assuming that RCPG execution instruction T has been received, control proceeds to step S112.

At step S112, control unit 510 generates a confirmation image MG100 set forth below to cause display unit 530 to display a confirmation image MG100. Then, the process of step S112 ends.

Figure 6:
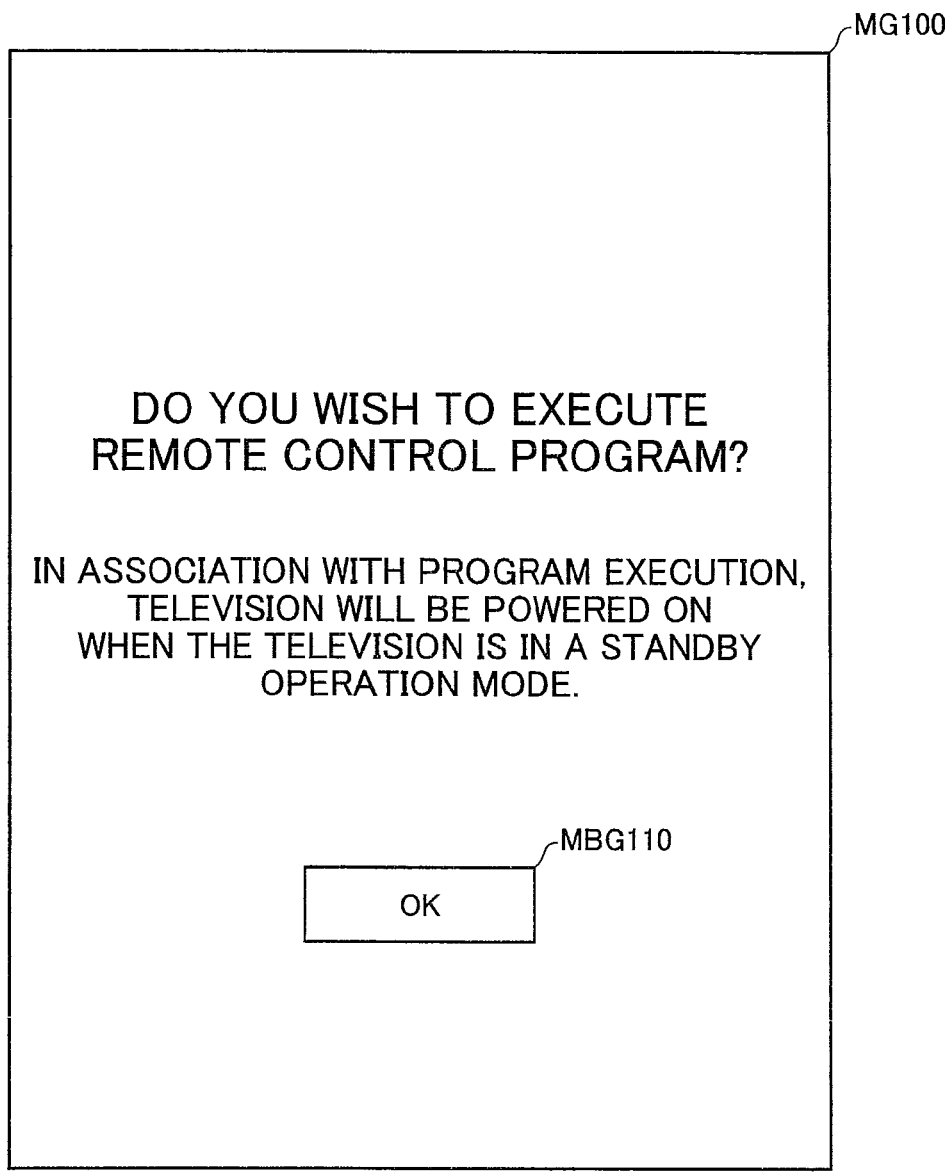
FIG. 6 represents a confirmation image, by way of example.

FIG. 6 shows a confirmation image MG100, by way of example. Referring to FIG. 6, a confirmation message to confirm whether an RC program is to be executed or not is displayed at confirmation image MG100. Confirmation image MG100 presents a message according to execution of the RC program informing that, when content reproduction device 600 (television) is in a standby operation mode, the operation mode of content reproduction device 600 (television) will be set to a normal mode (power turned on). A button image MBG110 is arranged in confirmation image MG100. Button image MBG110 functions to cause control unit 510 to execute an RC program, when depressed.

Referring to FIG. 5 again, in a content reproduction process M, control proceeds to step S113, subsequent to the process of step S112.

At step S113, control unit 510 determines whether there is an execution operation M or not. As used herein, an execution operation M is an interface operation M for a depression process of button image MBG110. When YES at step S113, control proceeds to step S114. When NO at step S113, the process of step S113 is performed again. Assuming that there was an execution operation M, control proceeds to step S114.

At step S114, an RC mode setting process M is performed. In an RC mode setting process M, control unit 510 executes an RC program. Then, control unit 510 sets the operation mode of portable terminal device 500 at an RC mode. Then, control proceeds to step S115.

At step S115, control unit 510 transmits a power ON RC signal to content reproduction device 600. A power ON RC signal functions to set the operation mode of content reproduction device 600 at a normal mode. Then, the process of step S115 ends. The transmission process of a power ON RC signal may be performed when an image to confirm transmission of a power ON RC signal is displayed at display unit 530 and an interface operation M to transmit a power ON RC signal is specified.

In a content reproduction process T, control proceeds to step S143, subsequent to the process of step S142.

At step S143, control unit 610 determines whether a power ON RC signal has been received or not. When YES at step S143, control proceeds to step S144. When NO at step S143, the process of step S143 is performed again. Now, assuming that a power ON RC signal has been received, control proceeds to step S144.

At step S144, control unit 610 determines whether its own content reproduction device 600 is in a standby operation mode or not. When YES at step S144, control proceeds to step S145. When NO at step S144, control proceeds to step S146. Assuming that the operation mode of content reproduction device 600 is a standby mode, control proceeds to step S145. A NO determination made at step S144 means that content reproduction device 600 is in a normal mode.

At step S145, control unit 610 turns ON the aforementioned image display power switch, and sets the operation mode of content reproduction device 600 at a normal mode. Accordingly, display unit 630 can display an image. Then, control proceeds to step S146.

At step S146, a content information fetching process T is performed. This content information fetching process T is directed to fetching data representing content information (hereinafter, also referred to as content information data), and generating a content information data table from the plurality of fetched content information data.

The content information data according to the present embodiment includes content related data. Content related data indicates information related to corresponding content.

FIG. 7 shows content related data CTD100, by way of example. Referring to FIG. 7, "content ID (identification data)" in content related data CTD100 is an ID to identify the content. "File name" is the file name of the content. "Title" is the title of the content. "Category" is the category to which the content belongs. "Time (minute)" is the reproduction time of the content. "Subject" is the plot of the content. "Allowed reproduction control" refers to reproduction control allowed for the content. "Prohibited reproduction control" refers to reproduction control prohibited against the content.

The content information data of the present embodiment further includes environment data. Environment data indicates environment information to establish an environment suitable for reproducing the corresponding content. Namely, environment information indicated in environment data corresponds to information to establish an environment in accordance with the content. Environment information includes information of the temperature, humidity, light intensity, volume, brightness of the screen, and the like.

FIG. 8 shows environment data EVD200, by way of example. Referring to FIG. 8, in environment data EVD200, "content ID" is an ID to identify the content. "Recommended temperature" is the temperature suitable for watching the corresponding content. "Recommended humidity" is the humidity suitable for watching the corresponding content. "Recommended light intensity" is the intensity of light suitable for watching the corresponding content. "Recommended volume" is the sound volume suitable for the corresponding content. "Recommended screen brightness" is the brightness of the screen suitable for reproducing and displaying a corresponding content.

The environment information shown in the environment data is set to comply with the intention of the content producer, for example. In the case where the content is a video suitable to watch in a well-lit room (for example, sports video), the value of "recommended light intensity" indicated in the environment data is set to a high value (for example, 500 lux). In the case where the content is a video suitable to be watched in a dark room (for example, a suspense film), the value of recommended light intensity in the environment data is set to a low value (for example, 100 lux).

In the present embodiment, it is assumed that content information data containing content related data and environment data is added to the content received by a device through broadcast signals, through a network, and the like. Therefore, when each of recorder device 600A, PC 600B, content reproduction device 700A, and content reproduction device 700B in FIG. 1 is to store content, each device stores content information data added to the relevant content in correspondence with the content. The content information data includes content related data and environment data.

It is also assumed that service server 800 stores each of a plurality of contents in association with the content information data including content related data and environment data, corresponding to each relevant content.

In a content information fetching process T at step S146, control unit 610 fetches content information data stored in each device by communicating with a plurality of devices in home network 501 and service server 800. Now, suppose that the devices communicating with control unit 610 are recorder device 600A, PC 600B, content reproduction device 700A, content reproduction device 700B, and service server 800.

Control unit 610 generates a content information data table from a plurality of content related data included in each of the plurality of fetched content information data and information of the device from which the content information data was fetched. Control unit 610 causes the plurality of fetched content information data, and the generated content information data table to be stored in storage unit 620.

It is assumed that the content related data and environment data included in one of the plurality of fetched content information data are content related data CTD100 of FIG. 7 and environment data EVD200 of FIG. 8, respectively. Then, the process of step S146 ends. Now, suppose that the generated content information data table is a content information data table TD300 set forth below.

FIG. 9 shows a content information data table TD300, by way of example. Content information data table TD300 includes a plurality of content location information data. Referring to FIG. 7, in content information data table TD300, "number" is a number to identify content location information data. "Content ID" is an ID to identify the content. "Title" is the title of the content. Now, suppose that, when "title" is "net album", the corresponding content is a photographic image, for example.

"Content form" indicates the form of the corresponding content. In the case where the "content form" item is "recorded", the corresponding content is recorded content (hereinafter, also referred to as "recording content"). In the case where the "content form" item is "Internet (VOD (Video on Demand))", the corresponding content is content distributed in a streaming form from a device capable of communication (for example, service server 800) according to "location information" that will be described afterwards. In the case where the "content form" item is "Internet (DLMV)", the corresponding content is video content that can be downloaded from a communication capable device by "location information". It is to be noted that the corresponding content may be video content downloaded from a communication capable device by "location information", when the "content form" item indicates "Internet (DLMV)". In the case where the "content form" item indicates "Internet (DL)", the corresponding content is content that can be downloaded from a communication capable device by "location information".

"Device type label" is the designation of the type of the device storing the corresponding content. Device type label "HDREC-1" is the type designation of recorder device 600A, for example. Device type label "PC-1" is the type designation of, for example, content reproduction device 700A. "Location information" is the information to identify the site where the corresponding content is stored. "HDMI-1" for "location information" indicates that the corresponding content is stored in recorder device 600A connected to content reproduction device 600 through an HDMI cable. The URL (Uniform Resource Locator) "http:/111.222.33.02/" for "location information" indicates that the corresponding content is stored in, for example, content reproduction device 700A. The URL "http://www.bb7.com/" for "location information" indicates that the corresponding content is stored in service server 800, for example. The URL "http://www.pic7.com/" for "location information" indicates that the corresponding content is stored in service server 800, for example. Namely, it is assumed that service server 800 is a server providing two different web sites. In this case, communication with service server 800 is allowed by URL "http://www.bb7.com/" or "http://www.pic7.com/" standing for the location information.

Referring to FIG. 5 again, in a content reproduction process T, control proceeds to step S147 after the process of step S146.

At step S147, control unit 610 transmits list selection data to portable terminal device 500. As used herein, list selection data is generated by control unit 610 based on all the types of content forms shown in the content information data table generated by a content information fetching process T. Let the generated content information data table be content information data table TD300 of FIG. 9. In this case, the transmitted list selection data is equivalent to list selection data TD305 set forth below. Then, the process of step S147 ends.

FIG. 10 shows list selection data TD305, by way of example. With reference to FIG. 10, "content form" in list selection data TD305 is similar to that described with reference to FIG. 9, and description thereof will not be repeated.

Referring to FIG. 5 again, in a content reproduction process M, control proceeds to step S116 after the process of step S115.

At step S116, control unit 510 determines whether list selection data has been received or not. When YES at step S116, control proceeds to step S117. When NO at step S116, the process of step S116 is performed again. Assuming that list selection data TD305 of FIG. 10 has been received, control proceeds to step S117.

At step S117, a selection image display process M is performed. In a selection image display process M, control unit 510 generates a selection image based on the received list selection data and causes display unit 530 to display the selection image. Let the received list selection data be list selection data TD305 of FIG. 10. In this case, it is assumed that selection image MG200 set forth below is displayed at display unit 530.

Figure 11:
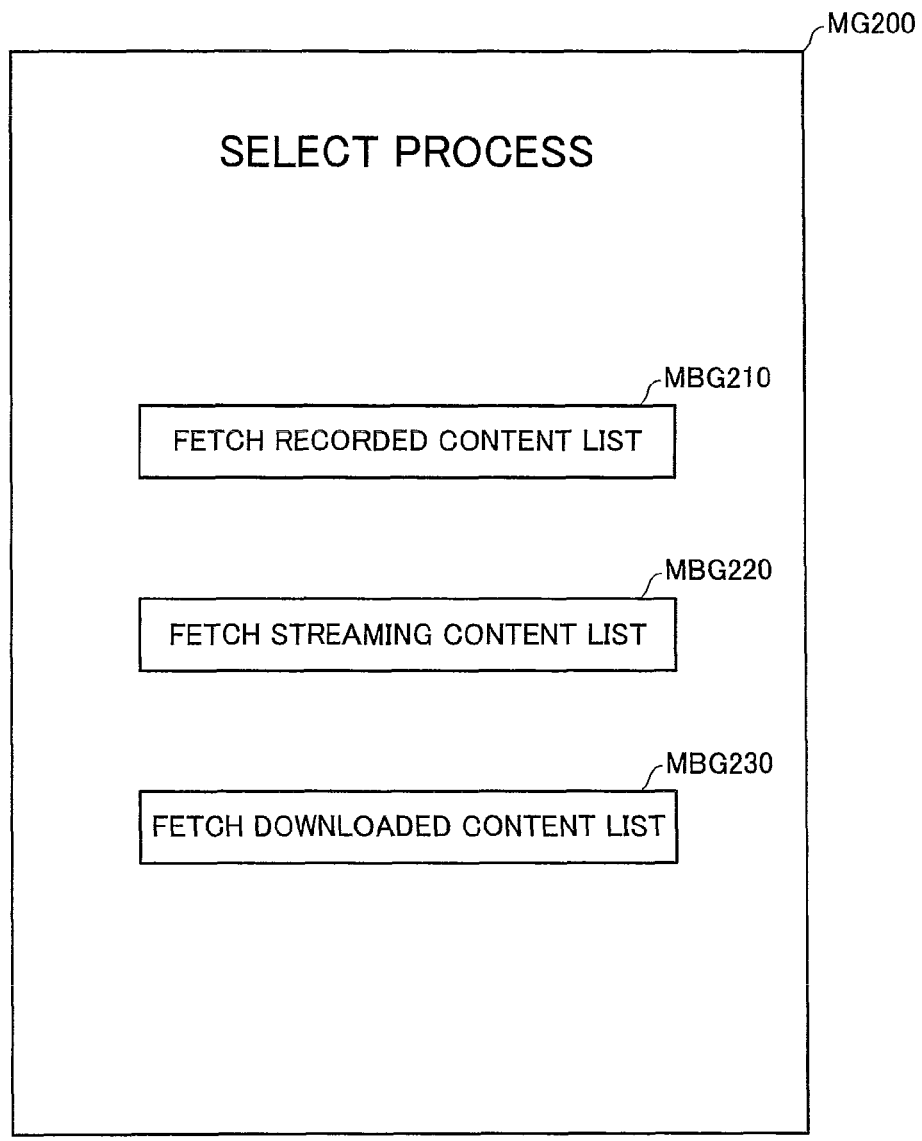
FIG. 11 shows a selection image, by way of example.

FIG. 11 shows a selection image MG200, by way of example. Referring to FIG. 11, selection image MG200 has button images MBG210, MBG220 and MBG230 arranged.

Button image MBG210 is generated when "recording" is displayed in the received list selection data. Button image MBG210 is directed to obtaining a list of recorded content titles in response to a depression process. Button image MBG220 is generated when at least one of "Internet (VOD)" and "Internet (DLMV)" is indicated in the received list selection data. Button image MBG220 is directed to obtaining a title list of contents capable of streaming reproduction (hereinafter, also referred to as "streaming content") in response to a depression process. Button image MBG230 is generated when "Internet (DL)" is indicated in the received list selection data. Button image MBG230 is directed to obtaining a title list of content that can be downloaded, in response to a depression process.

Selection image MG200 may have a button image arranged to set the operation mode of content reproduction device 600 in a normal mode to a standby mode.

Referring to FIG. 5 again, control proceeds to step S118 after the process of step S117.

At step S118, control unit 510 determines whether a selection operation M is specified or not. A selection operation M is an interface operation M to depress any of button images MBG210, MBG220 and MBG230. When YES at step S118, control proceeds to step S119. When NO at step S118, the process of step S118 is performed again. Now, assuming that a selection operation M is specified, control proceeds to step S119. Let the specified selection operation M be an interface operation M for a depression process of button image MBG220.

At step S119, a list request process M is performed. In a list request process M, control unit 510 transmits a list request instruction corresponding to the specified select operation M to content reproduction device 600. In the case where the specified select operation M is an interface operation M for a depression process of button image MBG220, control unit 510 transmits to content reproduction device 600 a list request instruction of the titles of streaming contents.

In a content reproduction process T, control proceeds to step S148 after the process of step S147.

At step S148, a list request corresponding process T is performed. In a list request corresponding process T, control unit 610 transmits to portable terminal device 500 content list data corresponding to the list request instruction received from portable terminal device 500.

Let the received list request instruction be a list request instruction of the title of streaming contents. In this case, the content list data transmitted by control unit 610 is equivalent to data indicating titles with "Internet (VOD)" and "Internet (DLMV)" for the "content form" items in content information data table TD300 of FIG. 9. Namely, the transmitted content list data is equivalent to content list data TD310 set forth below. Then, the process of step S148 ends.

FIG. 12 shows content list data TD310, by way of example. Respective items in content list data TD310 of FIG. 12 are similar to those described with reference to FIG. 9, and description detailed thereof will not be repeated.

Referring to FIG. 5 again in a list request process M, control unit 510 responds to reception of content list data to generate a content list image based on the received content list data, and causes display unit 530 to display the generated content list image. Let the received content list data be content list data TD310 shown in FIG. 12. In this case, a content list image MG200A set forth below is displayed at display unit 530. Then, the process of step S119 ends.

Figure 13:
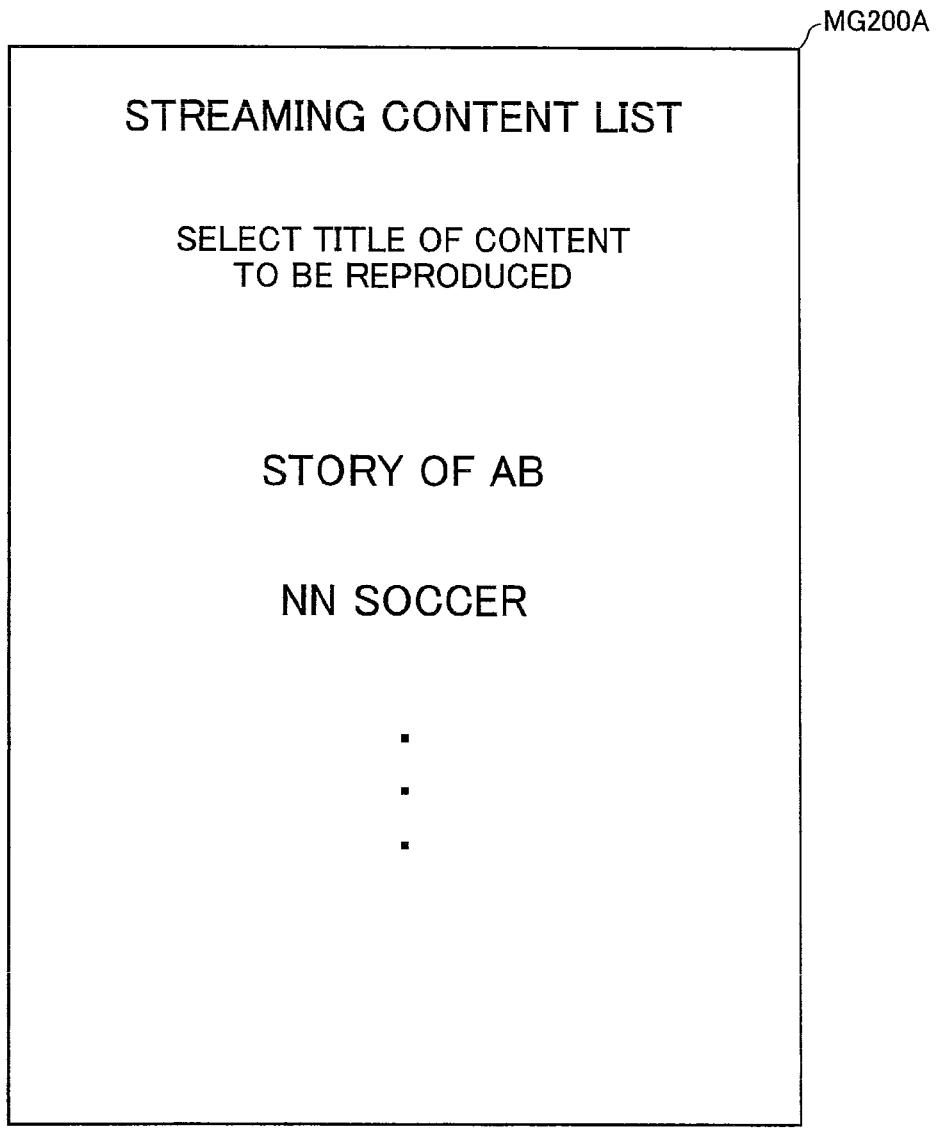
FIG. 13 shows a content list image, by way of example.

FIG. 13 shows a content list image MG200A, by way of example. Referring to FIG. 13, a plurality of titles shown in content list data TD310 are displayed in content list image MG200A.

When the performed selection operation M is an interface operation M for a depression process of button image MBG210 or MBG230 shown in FIG. 11, a list request process M and a list request corresponding process T are carried out, similar to those set forth above. Therefore, detailed description thereof will not be repeated.

Referring to FIG. 5 again, control proceeds to step S121 after the process of step S119.

At step S121, control unit 510 determines whether a selection confirming operation M is specified or not. A selection confirming operation M is an interface operation to select any of the plurality of titles indicated in content list image MG200A and ascertain the selection. A selection confirming operation M includes setting one of the titles at a selected state by operating direction buttons 541A, 541B, and the like, followed by depressing determination button 541E. When YES at step S121, control proceeds to step S122. When NO at step S121, the process of step S121 is performed again. Now, assuming that a selection confirming operation is specified, control proceeds to step S122.

At step S122, control unit 510 transmits a reproduction signal RC to content reproduction device 600A. A reproduction RC signal is directed to reproducing content. The transmitted reproduction RC signal includes a content ID corresponding to the title selected by a selection confirming operation M. Let the title selected by a selection confirming operation M be "Story of AB". In this case, the transmitted reproduction RC signal includes content ID "MV201", based on content list data TD310 of FIG. 12. Then, the process of step S122 ends.

In a content reproduction process T, control proceeds to step S151 after the process of step S148.

At step S151, control unit 610 determines whether a reproduction RC signal is received or not. When YES at step S151, control proceeds to step S152. When NO at step S151, the process of step S151 is performed again. Now, assuming that a reproduction RC signal including content ID "MV201" is received, control proceeds to step S152.

Let illumination device 910 of the present embodiment be controllable by an RC signal transmitted from portable terminal device 500. Illumination device 910 can have the light intensity of illumination be altered in 5 stages, as shown in an illumination data table LD400 set forth below. The level of light intensity that can be altered by illumination device 910 is not limited to 5 stages. Illumination data table LD400 is prestored in storage unit 620.

FIG. 14 shows an illumination data table LD400, by way of example. Referring to FIG. 14, "illumination level" in illumination data table LD400 is the light intensity level of the lighting that can be set at illumination device 910. The illumination level includes L1 to L5. Illumination level L5 is the brightest level.

The position suitable for watching a video displayed at content reproduction device 600 is also referred to as the best watching position. The best watching position is located facing and apart from the display screen of display unit 630 of content reproduction device 600 by a predetermined distance. Let the predetermined distance be 2 meters, by way of example. In the present embodiment, it is assumed that the user watches a video displayed on the display screen of display unit 630 of content reproduction device 600 at the best watching position.

"Light intensity (lux)" in illumination data table LD400 indicates the light intensity at the best watching position from the lighting by illumination device 910 installed in a room of light intensity "0" and set at a corresponding illumination level. For example, the light intensity from the lighting by illumination device 910 having the illumination level set at L3 in a room of light intensity "0" is 300 lux at the best watching position.

The image for portable terminal device 500 to control illumination device 910 through an RC signal is equivalent to a control image MG300A set forth below. Illumination device 910 includes a normal mode and a standby mode as the operation mode. Illumination device 910 in a normal operation mode emits light. Illumination device 910 in a standby operation mode does not emit light. Illumination device 910 is capable of receiving an RC signal and capable of communication with an external device irrespective of whether in a normal operation mode or standby operation mode. Further, illumination device 910 can notify an external device of its own operation mode (normal mode or standby mode) and illumination level through communication.

Figure 15:
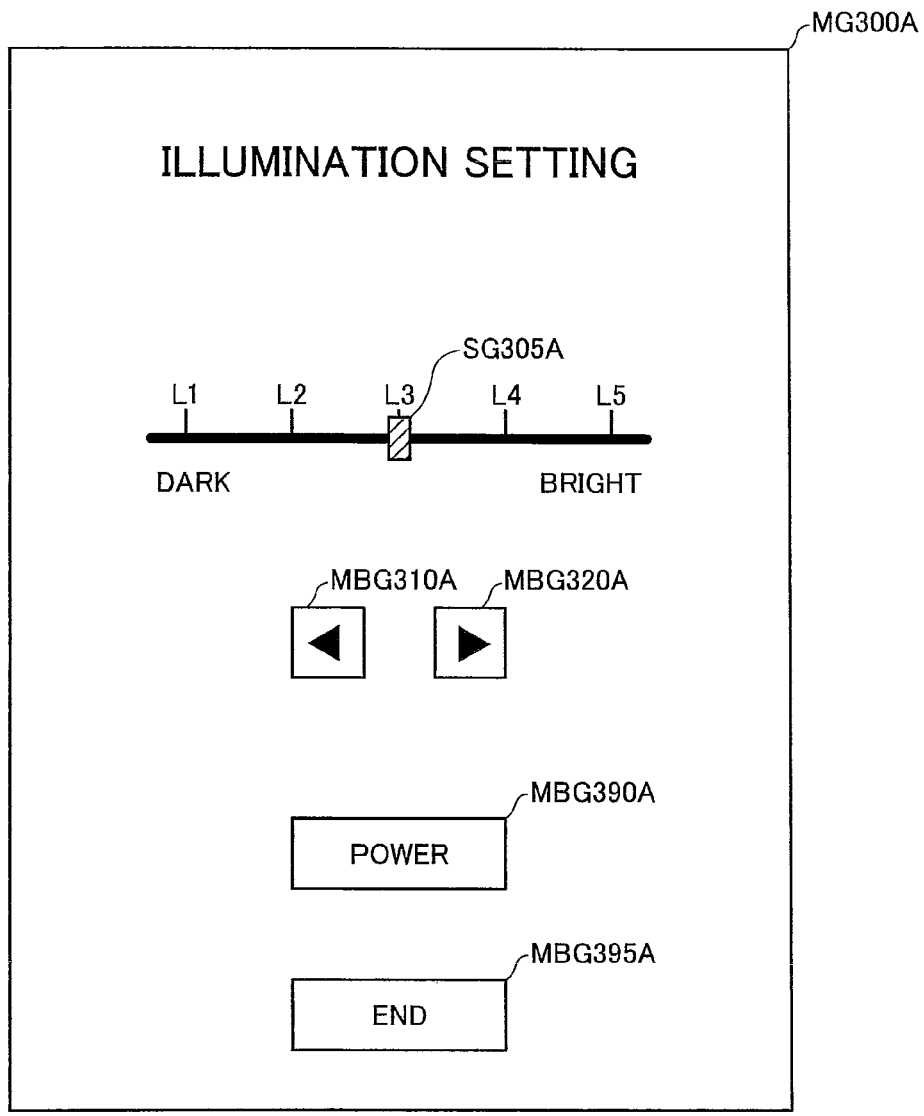
FIG. 15 shows a control image, by way of example.

FIG. 15 shows a control image MG300A, by way of example. Referring to FIG. 15, control image MG300A shows a slide bar SG305A. Slide bar SG305A is displayed below any of character strings L1, L2, L3, L4, and L5 indicating the illumination level. The event of slide bar SG305A displayed below character string L3 implies that the illumination level is set at L3.

Control image MG300A also has button images MBG310A and MBG320A arranged. Button image MBG310A functions to transmit an RC signal to lower the set illumination level by one stage, in response to a depression process. For example, a depression process of button image MBG310A when the illumination level is set at L3 causes the illumination level to be set to L2. Button image MBG320A functions to transmit an RC signal to raise the set illumination level by one stage, in response to a depression process. For example, a depression process of button image MBG320A when the illumination level is set at L3 causes the illumination level to be set to L4.

Control image MG300A also has button images MBG390A and MBG395A arranged. Button image MBG390A functions to transmit an RC signal to switch the operation mode of illumination device 910 to a standby mode or normal mode (hereinafter, also referred to an LT power RC signal), in response to a depression process. When illumination device 910 in a normal operation mode receives an LT power RC signal, the operation mode is set to a standby mode. When illumination device 910 in a standby operation mode receives an LT power RC signal, the operation mode is set to a normal mode.

Button image MBG395A functions to end control of illumination device 910, in response to a depression process.

Figure 16:
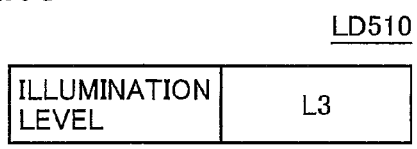
FIG. 16 shows illumination setting data, by way of example.

As used herein, the setting data of the illumination device is also referred to as illumination setting data. When the illumination level is set as shown in control image MG300A, the illumination setting data of illumination device 910 is equivalent to illumination setting data LD510 set forth below. FIG. 16 shows illumination setting data LD510, by way of example.

It is assumed that air conditioning device 920 of the present embodiment is controllable by an RC signal transmitted from portable terminal device 500. The image for portable terminal device 500 to control air conditioning device 920 by an RC signal is equivalent to a control image MG300B set forth below. Here, air conditioning device 920 includes a normal mode and a standby mode as the operation mode. Air conditioning device 920 in a normal operation mode carries out an operation for air conditioning. Air conditioning device 920 in a standby operation mode does not carry out an operation for air conditioning. Air conditioning device 920 is capable of receiving an RC signal and capable of communication with an external device irrespective of whether in a normal operation mode or standby operation mode. Air conditioning device 920 can notify an external device of its own operation mode (normal mode or standby mode) and various setting information through communication.

Figure 17:
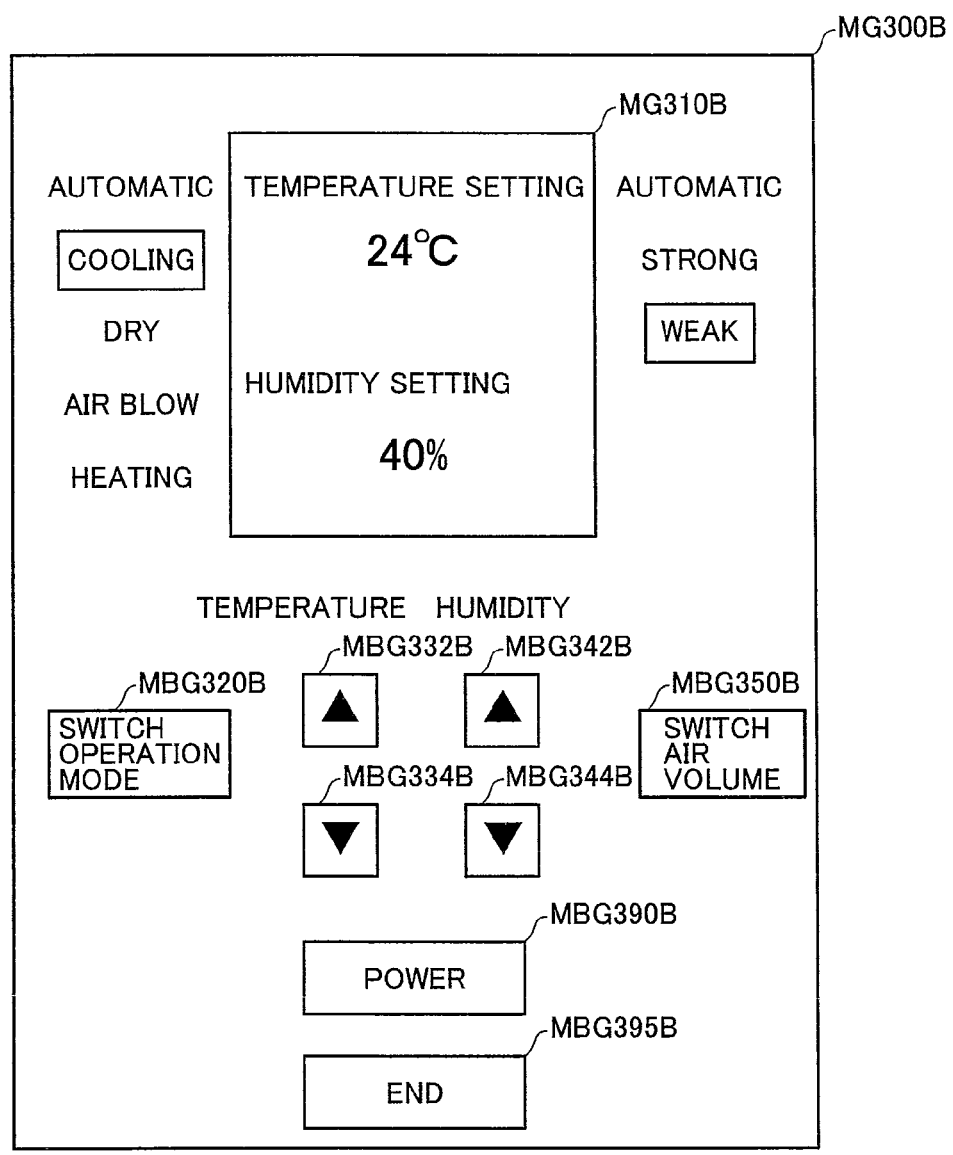
FIG. 17 shows a control image, by way of example.

FIG. 17 shows a control image MG300B, by way of example. Referring to FIG. 17, a setting state display image MG310B is arranged in control image MG300B. Setting state display image MG310B provides the display of the temperature setting and humidity setting.

Control image MG300B further has button images MBG320B, MBG332B, MBG334B, MBG342B, MBG344B, and MBG350B arranged. Button image MBG320B functions to transmit an RC signal to switch the operation mode of air conditioning device 920 in response to a depression process. The operation mode includes, for example, five types, i.e. automatic, cooling, dry, air blow, and heating. In control image MG300B, the character string surrounded by a rectangle among the character strings of automatic, cooling, dry, air blow, and heating is the operation mode that is currently set.

Button images MBG332B and MBG334B function to transmit an RC signal to alter the temperature setting in response to a depression process. Button image MBG332B functions to transmit an RC signal to raise the temperature setting by one degree in response to a depression process. Button image MBG334B functions to transmit an RC signal to lower the temperature setting by one degree in response to a depression process.

Button images MBG342B and MBG344B function to transmit an RC signal to alter the humidity setting in response to a depression process. Button image MBG342B functions to transmit an RC signal to raise the humidity setting by 1% in response to a depression process. Button image MBG344B functions to transmit an RC signal to lower the humidity setting by 1% in response to a depression process. Button image MBG350B functions to transmit an RC signal to switch the air volume mode, in response to a depression process. Let the air volume mode include three types, i.e. automatic, strong, and weak. In control image MG300B, the character string surrounded by a rectangle among "automatic", "strong" and "weak" is the air volume mode that is currently set.

Control image MG300B also has button images MBG390B and MBG395B arranged. Button image MBG390B functions to transmit an RC signal to switch the operation mode of air conditioning device 920 to a standby mode or normal mode (hereinafter, also referred to as an AR power RC signal) in response to a depression process. When air conditioning device 920 in a normal operation mode receives an AR power RC signal, the operation mode is set to a standby mode. When air conditioning device 920 in a standby mode receives an AR power RC signal, the operation mode is set to a normal mode.

Button image MBG395B functions to end the control of air conditioning device 920 in response to a depression process.

As used herein, the setting data of the air conditioning device is also referred to as air adjustment setting data. When respective items shown in control image MG300B are set, the air adjustment setting data of air conditioning device 920 is equivalent to air adjustment setting data ACD520 set forth below.

FIG. 18 shows air adjustment setting data ACD520, by way of example.

It is assumed that content reproduction device 600 of the present embodiment can have the volume of sound output from audio output unit 670 altered in, but not limited to, 51 stages, as shown in a volume data table VTD410 set forth below. Volume data table VTD410 is prestored in storage unit 620.

FIG. 19 shows a volume data table VTD410, by way of example. Referring to FIG. 19, "volume value" in volume data table VTD410 represents the volume of sound output from audio output unit 670 in numeric, under control of control unit 610. In content reproduction device 600, "volume value" is set in the range of 0 to 50.

In volume data table VTD410, "volume (decibel)" is the volume of the sound output from audio output unit 670, at the aforementioned best watching position. For example, the volume of the sound output from audio output unit 670 of content reproduction device 600 that is set at the volume value of "15" is equivalent to 40 decibels at the best watching position.

It is assumed that content reproduction device 600 of the present embodiment can have the brightness of the image displayed at the display screen of display unit 630 to be altered in, but not limited to, 5 stages, as shown in a screen brightness data table LTD420 set forth below. Screen brightness data table LTD420 is prestored in storage unit 620.

FIG. 20 shows a screen brightness data table LTD420, by way of example. Referring to FIG. 20, "screen brightness" in screen brightness data table LTD420 indicates the brightness of the screen that can be set at content reproduction device 600. "Light intensity (lux)" in screen brightness data table LTD420 is the intensity of light at the best watching position when content reproduction device 600 is installed in a room of light intensity "0", and a white image is displayed entirely on the display screen of display unit 630 at content reproduction device 600 set at a corresponding "screen brightness". For example, when a white image is displayed all over the display screen of display unit 630 at content reproduction device 600 having the "screen brightness" set to "normal" in a room of light intensity "0", the light intensity at the best watching position is 400 lux.

The image for portable terminal device 500 to control the "volume value" and "screen brightness" of content reproduction device 600 by an RC signal is equivalent to a control image MG300C set forth below.

FIG. 21 shows a control image MG300C, by way of example. Referring to FIG. 21, control image MG300C includes a volume value setting display image MG310C, and button images MBG322C and MBG324C. Volume value setting display image MG 310C shows the volume value that is set. Volume value setting display image MG310C shows, by way of example, that the volume value is set at "16". Button image MBG322C functions to transmit an RC signal to decrement the set volume value by "1" in response to a depression process. Button image MBG324C functions to transmit an RC signal to increment the set volume value by 1 in response to a depression process. For example, when button image MBG324C is depressed when the volume value is set at 16, the volume value is set to 17.

Control image MG300C further has button images MBG331C, MBG332C, MBG333C, MBG334C, and MBG335C arranged. Button image MBG331C functions to transmit an RC signal to set the "screen brightness" to "very dark" in response to a depression process. Button image MBG332C functions to transmit an RC signal to set the "screen brightness" to "dark" in response to a depression process. Button image MBG333C functions to transmit an RC signal to set the "screen brightness" to "normal" in response to a depression process.

Button image MBG334C functions to transmit an RC signal to set the "screen brightness" to "bright" in response to a depression process. Button image MBG335C functions to transmit an RC signal to set the "screen brightness" to "very bright" in response to a depression process. The "screen brightness" that is currently set is indicated by any of button images MBG331C, MBG332C, MBG333C, MBG334C, and MBG335C surrounded by a dotted frame. Control image MG300C shows that the set "screen brightness" is "bright".

Control image MG300C further has a button image MBG395C arranged. Button image MBG395C functions to end the control by content reproduction device 600 in response to a depression process.

In content reproduction device 600, the setting data of the sound volume and screen brightness is also referred to as reproduction device setting data. The reproduction device setting data is stored in storage unit 620. As shown in control image MG300C, when the volume value and screen brightness are set, the reproduction device setting data is equivalent to reproduction data setting data VLTD530 set forth below. FIG. 22 represents reproduction data setting data VLTD530, by way of example.

Referring to FIG. 5, an environment setting data fetching process T is performed at step S152. In an environment setting data fetching process T, control unit 610 communicates with illumination device 910 and air conditioning device 920 in home network 501 to fetch the illumination level of illumination device 910 and various setting information of air conditioning device 920. Then, control unit 610 causes the illumination setting data indicating the fetched illumination level, and the fetched air adjustment setting data indicating various setting information of air conditioning device 920 to be stored in storage unit 620.

Let the obtained illumination setting data and air adjustment set data be illumination set data LD510 of FIG. 16 and air adjustment setting data ACD520 of FIG. 18, respectively. In this case, illumination setting data LD510 and air adjustment setting data ACD520 are stored in storage unit 620.

Control unit 610 reads out the reproduction device setting data stored in storage unit 620 and causes a copied version of the reproduction device setting data read out from storage unit 620 to be stored as pre-change reproduction device setting data into storage unit 620. Let the reproduction device setting data read out be reproduction device setting data VLTD530 of FIG. 22. In this case, the pre-change reproduction device setting data that is a copied version of reproduction device setting data VLTD530 is stored in storage unit 620. The setting information indicated by pre-change reproduction device setting data is identical to the setting information indicated by reproduction device setting data VLTD530. Then, control proceeds to step S153.

At step S153, control unit 610 determines whether reproduction environment data that will be described afterwards and indicated by the content ID of the content that is to be reproduced is stored in storage unit 620 or not. Reproduction target content is identified by the content ID included in the received reproduction RC signal. When YES at step S153, control proceeds to step S155 that will be described afterwards. When NO at step S153, control proceeds to step S154. Now, assuming that the reproduction environment data indicated by the content ID of the reproduction target content is not stored in storage unit 620, control proceeds to step S154.

At step S154, a reproduction environment data generation process T is performed. In a reproduction environment data generation process T, control unit 610 reads out from storage unit 620 the content related data and environment data indicated by the content ID in the received reproduction RC signal. Control unit 610 generates reproduction environment data from the information indicated by the content related data and environment data read out. Control unit 610 stores the generated reproduction environment data into storage unit 620. Then, the process of step S154 ends.

Now, suppose that the content ID included in the received reproduction RC signal is "MV201". Let the content related data and environment data read out be content related data CTD100 of FIG. 7 and environment data EVD200 of FIG. 8, respectively. Control unit 610 generates reproduction environment data TD600 from the information indicated by content related data CTD100 and environment data EVD200. A method of generating reproduction environment data TD600 will be described hereinafter.

FIG. 23 shows reproduction environment data TD600, by way of example. In reproduction environment data TD600 of FIG. 23, "reproduction control" indicates reproduction control allowed on the content identified by the content ID. Control unit 610 writes the control indicated in the "allowed reproduction control" item shown in content related data CTD100 in the "reproduction control" item of reproduction environment data TD600.

In reproduction environment data TD600, "sound volume control" is the sound volume value to be set at content reproduction device 600. Control unit 610 selects the volume value corresponding to the recommended volume shown in environment data EVD200 from volume data table VTD410 of FIG. 19, stored in storage unit 620. Control unit 610 writes the selected volume value into the "volume control" item.

Since the recommended volume indicated by environment data EVD200 is 60 decibels, the selected volume value is "20". In the case where the value of the recommended volume value (for example, 59 decibels) is absent from volume data table VTD 410, a volume value corresponding to the volume closest to the value of the recommended volume in volume data table VTD 410 is selected.

In reproduction environment data TD600, "screen brightness control" refers to the screen brightness to be set at content reproduction device 600. Control unit 610 selects the "screen brightness" corresponding to the recommended screen brightness indicated by environment data EVD200 from screen brightness data table LTD420 of FIG. 20, stored in storage unit 620. Control unit 610 writes the selected "screen brightness" into the "screen brightness control" item.

Since the recommended screen brightness indicated by environment data EVD200 is 400 lux, the selected "screen brightness" is "normal". In the case where the value of the recommended screen brightness (for example, 399 lux) is absent from screen brightness data table LTD420, the "screen brightness" (for example, "normal") corresponding to the intensity value (for example, 400 lux) closest to the value of the recommended screen brightness (for example, 399 lux) in screen brightness data table LTD420 is selected.

In reproduction environment data TD600, "illumination device control" refers to the illumination level to be set at illumination device 910. Control unit 610 selects the illumination level corresponding to the recommended light intensity indicated by environment data EVD200 from illumination data table LD400 of FIG. 14, stored in storage unit 620. Then, control unit 610 writes the selected illumination level into the "illumination device control" item.

Since the recommended light intensity shown in environment data EVD400 is 400 lux, the selected illumination level is L4. When the value of the recommended light intensity (for example, 399 lux) is absent from illumination data table LD400, an illumination level (for example, L4) corresponding to the intensity level (for example, 400 lux) closest to the value of the recommended light intensity value (for example, 399 lux) is selected.

In reproduction environment data TD600, "air conditioning device control" refers to the information set for air conditioning device 920. The items in "air conditioning device control" include the temperature setting, humidity setting, operation mode, and air volume mode, from the top. Control unit 610 writes the recommended temperature (for example, 26 degrees) indicated by environment data EVD200 into the column corresponding to the temperature setting of the "air conditioning device control" item. Further, control unit 610 writes the recommended humidity (for example 40%) indicated by environment data EVD200 into the column corresponding to the humidity setting in the "air conditioning device control" item. Moreover, control unit 610 writes "automatic" into respective columns of the operation mode and air volume mode in the "air conditioning device control" item. Thus, reproduction environment data TD600 is generated.

Referring to FIG. 5 again, control proceeds to step S155 after the process of step S154.

At step S155, a control image generation process is performed. In a control image generation process, control unit 610 generates an image to control reproduction of reproduction target content using the title of the reproduction target content identified by the content ID included in the received reproduction RC signal and the reproduction environment data indicating the reproduction target content ID. Hereinafter, the content ID included in the received reproduction RC signal is also referred to as a reproduction target content ID. Control unit 610 generates a remote control program displaying the generated image, when executed.

Now, suppose that the title of the reproduction target content is "Story of AB". Let the reproduction target content ID be "MV201". Further, let the reproduction environment data indicating the reproduction target content ID be reproduction environment data TD600 of FIG. 23. In this case, a control image MG300D set forth below is generated. A method of generating control image MG300D will be described hereinafter. The generated control image MG300D serves to provide a display at display unit 530 of portable terminal device 500.

Figure 24:
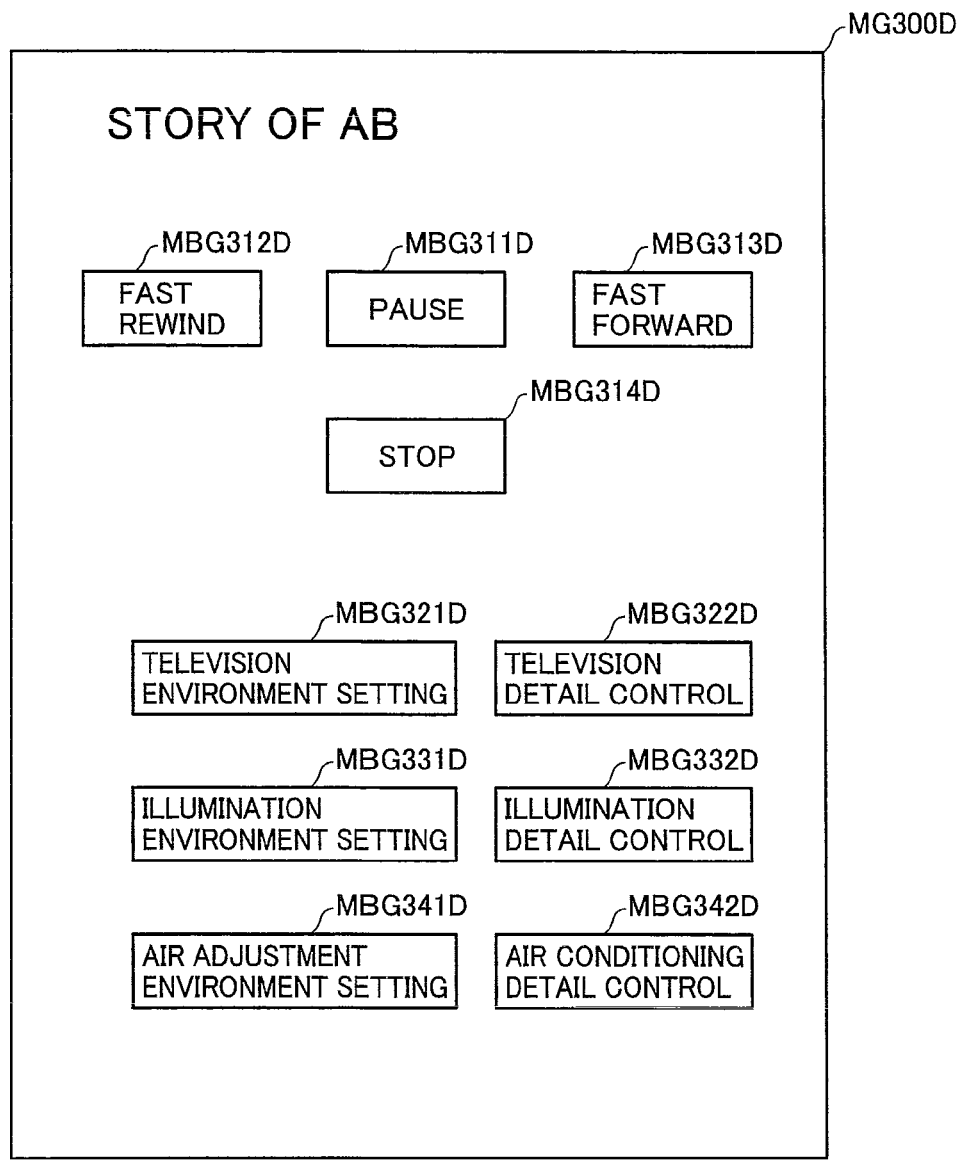
FIG. 24 shows a control image, by way of example.

FIG. 24 shows a control image MG300D, by way of example. Referring to FIG. 24, control unit 610 causes the title of the reproduction target content (Story of AB) to be displayed in control image MG300D.

Control unit 610 arranges button images MBG311D, MBG312D, MBG313D, and MBG314D in control image MG300D from the control information in the "reproduction control" item shown in reproduction environment data TD600.

Button image MBG311D functions to transmit an RC signal to temporarily stop the reproduction target content that is reproduced, in response to a depression process. The character string "pause" indicated in button image MBG311D is changed to the character string "play" when the reproduction target content currently reproduced is temporarily stopped. Button image MBG311D in a state having the character string "play" displayed functions to transmit an RC signal to play the reproduction target content that is temporarily stopped.

Button image MBG312D functions to transmit an RC signal to fast-rewind the reproduction target content that is reproduced, in response to a depression process. Button image MBG313D functions to transmit an RC signal to fast-forward the reproduction target content that is reproduced, in response to a depression process. Button image MBG314D functions to transmit an RC signal to stop the reproduction target content that is reproduced, in response to a depression process.

When information is written in at least one of the "sound volume control" item and "screen brightness control" item in reproduction environment data TD600, control unit 610 arranges button images MBG321D and MBG322D in control image MG300D.

Button image MBG321D functions to transmit an RC signal to set the sound volume value of content reproduction device 600 (hereinafter, also referred to as a volume control RC signal) at the sound volume value "20" indicated in the "sound volume control" item shown in reproduction environment data TD600. Further, button image MBG321D functions to transmit an RC signal to set the screen brightness of content reproduction device 600 (hereinafter, also referred to as a brightness control RC signal) at "normal" indicated in the "screen brightness control" item shown in reproduction environment data TD600. In other words, button image MBG321D functions to transmit a sound volume control RC signal and a brightness control RC signal in response to a depression process.

Button image MBG322D functions to cause control image MG300C of FIG. 21 to be displayed at display unit 530 in response to a depression process. In other words, button image MBG322D is directed to allowing change in the volume value and screen brightness by an operation at portable terminal device 500.

When information is written in the "illumination device control" item in reproduction environment data TD600, control unit 610 arranges button images MBG331D and MBG332D in control image MG300D. Button image MBG331D functions to transmit an RC signal to set the illumination level of illumination device 910 (hereinafter, also referred to as an illumination control RC signal) at L4 indicated in the "illumination device control" item shown in reproduction environment data TD600. Button image MBG332D functions to cause control image MG300A of FIG. 15 to be displayed at display unit 530 in response to a depression process. In other words, button image MBG332D functions to allow portable terminal device 500 to carry out detailed control on illumination device 910.

Control unit 610 arranges button images MBG341D and MBG342D in control image MG300D when information is written in the "air conditioning device control" item in reproduction environment data TD600. Button image MBG341D also functions to transmit an RC signal to set the temperature setting of air conditioning device 920 (hereinafter, also referred to as a temperature setting RC signal) at a temperature setting (26° C.) indicated in the "air conditioning device control" item shown in reproduction environment data TD600, in response to a depression process. Button image MBG341D functions to transmit an RC signal to set the humidity setting of air conditioning device 920 (hereinafter, also referred to as a humidity setting RC signal) at a humidity setting (40° C.) indicated in the "air conditioning device control" item shown in reproduction environment data TD600.

Moreover, button image MBG341D functions to transmit an RC signal to set the operation mode of air conditioning device 920 (hereinafter, also referred to as operation mode setting RC signal) at "automatic" indicated in the "air conditioning device control" item shown in reproduction environment data TD600, in response to a depression process. Further, button image MBG341D functions to transmit an RC signal to set the air volume mode of air conditioning device 920 (hereinafter, also referred to as an air volume mode setting RC signal) at "automatic" indicated in the "air conditioning device control" item shown in reproduction environment data TD600, in response to a depression process. Namely, button image MBG341D functions to transmit a temperature setting RC signal, humidity setting RC signal, operation mode setting RC signal and air volume mode setting RC signal, in response to a depression process.

Button image MBG342D functions to cause control image MG300B of FIG. 17 to be displayed at display unit 530, in response to a depression process. Namely, button image MBG342D functions to allow portable terminal device 500 to carry out detailed control on air conditioning device 920. Thus, control image MG300D is generated as set forth above.

Referring to FIG. 5 again, in the control image generation process of step S155, control unit 610 generates a remote control program to display a control image MG300D (hereinafter, also referred to as a content reproduction control RC program) in response to execution. The content reproduction control RC program includes the data of RC signals used according to depression of each of the plurality of button images arranged in control image MG300D. Control unit 610 causes the generated content reproduction control RC program to be stored into storage unit 620. Then, control proceeds to step S156.

Now, suppose that an illumination control remote control program (hereinafter, also referred to as an illumination control RC program), an air adjustment remote control program (hereinafter, also referred to as an air adjustment RC program), and a reproduction device control remote control program (hereinafter, also referred to as a reproduction device control RC program) are prestored in storage unit 620.

The illumination control RC program is directed to controlling illumination device 910. When the illumination control RC program is executed, control image MG300A of FIG. 15 is displayed. An illumination control RC program includes the data of RC signals used according to depression of each of the plurality of button images arranged in control image MG300A.

An air adjustment RC program is directed to controlling air conditioning device 920. When the air adjustment RC program is executed, control image MG300B of FIG. 17 is displayed. The air adjustment RC program includes the data of RC signals used according to depression of each of the plurality of button images arranged in control image MG300B.

A reproduction device control RC program is directed to controlling the "volume value" and "screen brightness" of content reproduction device 600. When a reproduction device control RC program is executed, control image MG300C of FIG. 21 is displayed. The reproduction device control RC program includes the data of RC signals used according to depression of each of the plurality of button images arranged in control image MG300A.

At step S156, control unit 610 transmits environment generation control data T to portable terminal device 500 by near-field wireless communication using communication unit 660. The transmitted environment generation control data T includes reproduction environment data indicating the reproduction target content ID and a content reproduction control RC program, an illumination control RC program, an air adjustment RC program, and a reproduction device control RC program. Let the reproduction environment data indicating the reproduction target content ID be reproduction environment data TD600 of FIG. 23.

The illumination control RC program, air adjustment RC program, and reproduction device control RC program may be prestored in storage unit 520 of portable terminal device 500. In this case, the transmitted environment generation control data T includes reproduction environment data indicating the reproduction target content ID and a content reproduction control RC program. Then, control proceeds to step S157.

At step S157, control unit 610 executes a control signal corresponding process T. The control signal corresponding process T is performed independent of other processes. Then, the process of step S157 ends.

In a control signal corresponding process T, control unit 610 performs a process corresponding to an RC signal received as a control signal.

In a content reproduction process M, control proceeds to step S123, after the process of step S122.

At step S123, control unit 510 determines whether environment generation control data T is received or not. When YES at step S123, control unit 510 causes the received environment generation control data T to be stored in storage unit 520, and proceeds to step S124. When NO at step S123, the process of step S123 is performed again.

Now, suppose that environment generation control data T including reproduction environment data indicating the reproduction target content ID and content reproduction control RC program, illumination control RC program, air adjustment RC program and reproduction device control RC program has been received. In this case, control unit 510 causes the reproduction environment data and content reproduction control RC program, illumination control RC program, air adjustment RC program and reproduction device control RC program in the received environment generation control data T to be stored in storage unit 520, and proceeds to step S124. In the case where the reproduction environment data and content reproduction control RC program are already stored in storage unit 520, control unit 510 causes overwriting such that the received latest reproduction environment data and content reproduction control RC program are written in storage unit 520.

At step S124, a reproduction environment generation process M is performed. In a reproduction environment generation process M, control unit 510 executes a content reproduction control RC program. By an execution of the content reproduction control RC program, control unit 510 causes a control image corresponding to the content reproduction control RC program to be displayed at display unit 530. Then, control unit 510 transmits to a corresponding device an RC signal related to the reproduction environment data corresponding to the control image displayed at display unit 530.

Let the control image corresponding to the content reproduction control RC program be control image MG300D of FIG. 24. Further, let the reproduction environment data corresponding to control image MG300D be reproduction environment data TD600 of FIG. 23. In this case, control unit 510 transmits to content reproduction device 600 a volume control RC signal and a brightness control RC signal.

The transmitted volume control RC signal is directed to setting the volume value of content reproduction device 600 at "20", as set forth above. Further, the transmitted brightness control RC signal is directed to setting the brightness of the screen of content reproduction device 600 at "normal", as set forth above.

Further, control unit 510 transmits an illumination control RC signal to illumination device 910. The illumination control RC signal is directed to setting the illumination level of illumination device 910 at L4, as set forth above. Control unit 510 also transmits the aforementioned temperature setting RC signal, humidity setting RC signal, operation mode setting RC signal, and an air volume mode setting RC signal to air conditioning device 920.

The process of transmitting an RC signal corresponding to the control image displayed at display unit 530 may be carried out when the button image corresponding to the RC signal, arranged in the control image, is subjected to a depression process. Then, the process of step S124 ends.

When a volume control RC signal and brightness control RC signal are received at content reproduction device 600, control unit 610 sets the volume value of content reproduction device 600 at "20" in a control signal corresponding process T carried out independent of other processes. Further, control unit 610 sets the brightness of the screen of content reproduction device 600 at "normal".

Illumination device 910 sets the illumination level of illumination device 910 at L4 in response to receiving an illumination control RC signal. In this case, illumination device 910 outputs light of an intensity corresponding to illumination level L4.

Air conditioning device 920 sets the temperature setting of air conditioning device 920 at 26° C. in response to receiving a temperature setting RC signal. Further, air conditioning device 920 sets the humidity setting of air conditioning device 920 at 40% in response to receiving a humidity setting RC signal. Further, air conditioning device 920 sets its operation mode at "automatic" in response to receiving an operation mode setting RC signal. Further, air conditioning device 920 sets the air volume mode of air conditioning device 920 at "automatic" in response to receiving an air volume mode setting RC signal. In this case, air conditioning device 920 sets the temperature and humidity at 26° C. and 40%, respectively, in the room where air conditioning device 920 is installed.

Thus, by execution of a process corresponding to a received RC signal at each of content reproduction device 600, illumination device 910, and air conditioning device 920, the environment for the user to watch reproduction target content at the aforementioned best watching position is set to an environment suitable for watching the reproduction target content.

In a content reproduction process T, control proceeds to step S161, after the process of step S157.

At step S161, an execution process of a reproduction process T is performed. In the execution process of a reproduction process T, control unit 610 executes a reproduction process T. A reproduction process T is performed independent of other processes. Then, the process of step S161 ends.

In a reproduction process T, control unit 610 requests the reproduction target content from the device storing the relevant reproduction target content according to the location information indicated in the content information data table generated by a content information fetching process T of step S146. The device requested of reproduction target content transmits the reproduction target content to content reproduction device 600. Control unit 610 causes reproduction while receiving the reproduction target content, and causes display unit 630 to display the image of the reproduction target content that is reproduced. Control unit 610 also outputs the sound of the reproduction target content that is reproduced, from audio output unit 670 at the volume of the set volume value. The reproduction process T ends in accordance with the completion of a reproduction of the reproduction target content.

Let the content information data table be content information data table TD300 of FIG. 9. Further, let the reproduction target content be the content with MV201 as the content ID. In this case, control unit 610 requests the reproduction target content from service server 800. Service server 800 responds to the request of reproduction target content to cause the reproduction target content to be distributed in streaming form to content reproduction device 600. Control unit 610 reproduces the reproduction target content while receiving the content, and causes the image of the reproduction target content that is reproduced to be displayed at display unit 630. The brightness of the reproduction target content image displayed at display unit 630 is "normal", set by the process set forth above. Control unit 610 outputs the sound of the reproduction target content that is reproduced, from audio output unit 670 at the volume of the volume value "20" set by the process set forth above.

In a content reproduction process M, control proceeds to step S125, after the process of step S124.

At step S125, control unit 510 executes an operation corresponding process M. An operation corresponding process M is performed independent of other processes. Then, the process of step S125 ends.

In an operation corresponding process M, control unit 510 performs a process corresponding to the operation carried out at portable terminal device 500. Specifically, control unit 510 determines whether a button image arranged in a control image displayed at display unit 530 is subjected to a depression process or not. When a depression operation is conducted, control unit 510 performs a process allocated to the depressed button image.

Let the control image displayed at display unit 530 be control image MG300D of FIG. 24. In this case, when an interface operation M for a depression process of button image MBG311D is specified, control unit 510 transmits to content reproduction device 600 an RC signal to temporarily stop the reproduction target content reproduced at content reproduction device 600 (hereinafter, also referred to as a temporarily stopping RC signal). Upon receiving a temporarily stopping RC signal, control unit 610 at content reproduction device 600 in a control signal corresponding process M performed independent of other processes temporarily stops the reproduction target content that is reproduced.

Further, when an interface operation M for a depression process of button image MBG322B, for example, is specified, control unit 510 executes a reproduction device control RC program to cause control image MG300C of FIG. 21 to be displayed at display unit 530. Moreover, when an interface operation M for a depression process of button image MBG322C, for example, is specified, control unit 510 transmits to content reproduction device 600 an RC signal to decrement the set volume value by 1 (hereinafter, also referred to as a volume value down RC signal). Upon receiving the volume value down RC signal, control unit 610 at content reproduction device 600 in a control signal corresponding process T, carried out independent of other processes, decrements the volume value of the sound of the reproduction target content that is reproduced by 1. When an interface operation M for a depression process of button image MBG395C is specified, control unit 510 terminates the reproduction device control RC program, and causes display unit 530 to display control image MG300D of FIG. 24.

Moreover, when an interface operation M for a depression process of button image MBG332D, for example, is specified, control unit 510 causes display unit 530 to display control image MG300A of FIG. 15 in response to execution of an illumination control RC program. When an interface operation M for a depression process of button image MBG320A, for example, is specified, control unit 510 transmits to illumination device 910 an RC signal to raise the illumination level (hereinafter, also referred to as an illumination level up RC signal) by one stage. Upon receiving an illumination level up RC signal, illumination device 910 raises the set illumination level by one stage. When an interface operation M for a depression process of button image MBG395A is specified, control unit 510 terminates the illumination control RC program, and causes display unit 530 to display control image MG300D of FIG. 24.

When an interface operation M for a depression process of button image MBG342D, for example, is specified, control unit 510 executes an air adjustment RC program to cause display unit 530 to display control image MG300B of FIG. 17. Further, when an interface operation M for a depression process of button image MBG332B, for example, is specified, control unit 510 transmits to air conditioning device 920 an RC signal (hereinafter, also referred to as a setting temperature up RC signal) to raise the temperature setting by one degree. Upon receiving a setting temperature up RC signal, air conditioning device 920 raises the temperature setting by one degree. When an interface operation M for a depression process of button image MBG395B is specified, control unit 510 terminates the air adjustment RC program, and causes display unit 530 to display control image MG300D of FIG. 24.

Referring to FIG. 5 again, control proceeds to step S126, after the process of step S125.

At step S126, a determination is made as to whether the environment has been changed or not. Specifically, control unit 510 determines whether the environment generated by the reproduction environment generation process M of step S124 is changed or not. When an RC signal is transmitted in an operation corresponding process M, control unit 510 determines that the environment generated at a reproduction environment generation process M has been changed. When YES at step S126, control proceeds to step S127. When NO at step S126, control proceeds to step S131. Now, suppose that the environment has not been changed. In this case, control proceeds to step S131 that will be described afterwards.

In a content reproduction process T, control proceeds to step S162, after the process of step S161.

At step S162, control unit 610 determines whether changed reproduction environment data has been received or not. When YES at step S162, control proceeds to step S163. When NO at step S162, control proceeds to step S164. Now, assuming that the environment has not been changed, control proceeds to step S164.

At step S164, control unit 610 determines whether reproduction of the reproduction target content has ended or not. By receiving from portable terminal device 500 an RC signal to stop reproduction of the reproduction target content, control unit 610 determines that reproduction of the reproduction target content has ended even in the case where control unit 610 has stopped the reproduction of the reproduction target content. When YES at step S164, control proceeds to step S168. When NO at step S164, the process of step S162 is performed again.

At step S168, an environment restore process T is performed. An environment restore process T is directed to restoring the setting of content reproduction device 600 to that prior to change of the setting of content reproduction device 600 caused by reproduction of the reproduction target content, in the environment in which the content was reproduced. In an environment restore process T, control unit 610 uses the pre-change reproduction device setting data stored in storage unit 620 to change the setting at content reproduction device 600. The setting information indicated by the pre-change reproduction device setting data is identical to the setting information indicated by reproduction device setting data VLTD530 of FIG. 22. In the present case, control unit 610 sets the volume value of content reproduction device 600 to "16". Further, control unit 610 sets the screen brightness of content reproduction device 600 to "bright". By the relevant setting, the setting of the volume value and the screen brightness of content reproduction device 600 attains the setting prior to reproducing the content.

In an environment restore process T, control unit 610 transmits to portable terminal device 500 pre-change environment data T including the illumination setting data and air adjustment setting data. Let the illumination setting data and air adjustment setting data be illumination setting data LD510 of FIG. 16 and air adjustment setting data ACD520 of FIG. 18, respectively. In this case, control unit 610 transmits to portable terminal device 500 pre-change environment data T including illumination setting data LD510 and air adjustment setting data ACD520. Then, the process of step S168 ends, and the content reproduction process T is terminated.

At step S131 of a content reproduction process M, control unit 510 determines whether pre-change environment data T has been received or not. When YES at step S131, control proceeds to step S132. When NO at step S131, the process of step S126 is performed again. Now, assuming that pre-change environment data T including illumination setting data LD510 and air adjustment setting data ACD520 has been received, control proceeds to step S132.

At step S132, an environment restore process M is performed. An environment restore process M is directed to restoring the setting of an external device (for example, illumination device 910, air conditioning device 920) to that prior to change of the setting of the external device caused by reproducing the reproduction target content, in the environment in which the reproduction target content was reproduced. In an environment restore process M, control unit 510 uses the illumination setting data and air adjustment setting data included in the received pre-change environment data T to perform a process to restore the setting of the external device.

Specifically, control unit 510 generates and transmits to illumination device 910 an illumination setting restore RC signal based on the information indicated by the illumination setting data.

Further, control unit 510 generates, based on the information indicate by the air adjustment setting data, a temperature setting restore RC signal, a humidity setting restore RC signal, an operation mode setting restore RC signal and an air volume mode setting restore RC signal and transmits the generated temperature setting restore RC signal, humidity setting restore RC signal, operation mode setting restore RC signal and air volume mode setting restore RC signal to air conditioning device 920.

Now, suppose that the illumination setting data included in pre-change environment data T received is equivalent to illumination setting data LD510. In this case, the illumination setting restore RC signal transmitted to illumination device 910 is equivalent to an RC signal to set the illumination level of illumination device 910 at L3. Upon receiving the illumination restore RC signal, illumination device 910 sets its illumination level at L3. In this case, illumination device 910 outputs lighting of an intensity corresponding to illumination level L3.

Let the air adjustment setting data included in pre-change environment data T received be air adjustment setting data ACD520. In this case, the temperature setting restore RC signal transmitted to air conditioning device 920 is equivalent to an RC signal to set the temperature setting of air conditioning device 920 at 24° C. The humidity setting restore RC signal transmitted to air conditioning device 920 is equivalent to an RC signal to set the humidity setting of air conditioning device 920 at 40%. Further, the operation mode setting restore RC signal transmitted to air conditioning device 920 is equivalent to an RC signal to set the operation mode of air conditioning device 920 at "cooling". The air volume mode setting restore RC signal transmitted to air conditioning device 920 is equivalent to an RC signal to set the air volume mode of air conditioning device 920 at "weak".

Upon receiving a temperature setting restore RC signal, air conditioning device 920 sets its temperature setting at 24° C. Further, upon receiving a humidity setting restore RC signal, air conditioning device 920 sets its humidity setting at 40%. Moreover, upon receiving a set operation mode restore RC signal, air conditioning device 920 sets its operation mode at "cooling". Furthermore, upon receiving an air volume mode setting restore RC signal, air conditioning device 920 sets its air volume mode at "weak". Thus, the process of step S132 is completed, and the content reproduction process M ends.

By the processes set forth above, the settings of illumination device 910 and air conditioning device 920, identified as external devices, are restored to the settings prior to the change of the setting caused by reproducing the reproduction target content. Namely, by the environment restore process T performed at content reproduction device 600 and the environment restore process M performed at portable terminal device 500, the environment of reproducing the reproduction target content is restored to the environment prior to the change of the environment caused by reproduction of the reproduction target content.

Next, a process of reproducing any content once reproduced at content reproduction device 600 will be described hereinafter. Let the reproduction target content be the content with MV201 as the content ID. Now, suppose that the content of content ID "MV201" has already been reproduced once at content reproduction device 600. It is assumed that reproduction environment data TD600 of FIG. 23 is stored in storage unit 620 of content reproduction device 600 by the process of step S154.

Further, it is assumed that the processes of steps S111-S122 are performed in a manner likewise of the processes set forth above in a content reproduction process M. Further, it is assumed that the processes of steps S141-S152 are performed in a manner likewise of that described above.

At step S153, a process similar to that described above is performed, so that detailed description thereof will not be repeated. Now, suppose that reproduction environment data TD600 is stored in storage unit 620 of content reproduction device 600. Namely, reproduction environment data TD600 indicating the content ID "MV201" of the reproduction target content is stored in storage unit 620. In this case, a YES determination is made at step S153, and control proceeds to step S155.

At step S155, A process similar to that set forth above is performed. Therefore, detailed description thereof will not be repeated. In a content reproduction process T, the process of steps S155 and et seq. is performed in a manner similar to that described above in a content reproduction process T. In a content reproduction process M, the process of steps S123 and et seq. is performed in a manner similar to that described above.

Therefore, when the content that has already been reproduced once is to be reproduced, the process of generating reproduction environment data is dispensable.

The reproduction environment data generated by a reproduction environment data generation process T of step S154 may also indicate the information of "category" represented by the content related data. In this case, a determination can be made at step S153 as to whether reproduction environment data indicating the "category" of the reproduction target content is stored in storage unit 620 or not. In this case, reproduction environment data indicating a category identical to that of the reproduction target content will be transmitted to portable terminal device 500. As a result, execution of the process set forth above will result in generation of the same content reproduction environment, when the content of the same category is to be reproduced.

The process when the environment generated by the reproduction environment generation process M of step S124 in FIG. 5 is changed will be described hereinafter.

Now, suppose that an operation to change the environment generated by a reproduction environment generation process M is performed at portable terminal device 500 during reproduction of the reproduction target content.

In this case, a determination is made at step S126 of FIG. 5 that the environment generated by reproduction environment generation process M has been changed, and control proceeds to step S127.

At step S127, a reproduction environment data change process M is performed. In a reproduction environment data change process M, control unit 510 changes each information in the reproduction environment data in response to an operation made to change the environment generated by the reproduction environment generation process M. Then, control unit 510 transmits the changed reproduction environment data (hereinafter, also referred to as changed reproduction environment data) to content reproduction device 600.

Now, suppose that reproduction environment data TD600 of FIG. 23 is stored in storage unit 520 by the process of step S123. Let the operation to change the environment generated by the reproduction environment generation process M include operations MA, MB and MC set forth below. Let operation MA be an interface operation M for a depression process of button image MBG332C under the state where a control image MG300CS set forth below is displayed at display unit 530. Let control image MG300CS be a control image indicating "20" for the set volume value, indicated by volume value setting display image MG 310C. In this case, control unit 510 decrements the volume value indicated by reproduction environment data TD600 by "1" to become "19".

Let operation MB be an interface operation M for a depression process of button image MBG310A under the state where a control image MG300AS set forth below is displayed at display unit 530. Suppose that control image MG300AS has a slide bar SG305A displayed below a character string L4 in control image MG300A of FIG. 15. In this case, control unit 510 lowers the illumination level indicated by reproduction environment data TD600 by one stage to L3.

Let operation MC be an interface operation M for a depression process of button image MBG332B under the state where a control image MG300BS set forth below is displayed at display unit 530. Suppose that control image MG300BS shows 26° C. for the temperature setting indicated by a setting state display screen MG310B in control image MG300B of FIG. 17. In this case, control unit 510 raises the setting temperature indicated by reproduction environment data TD600 by 1 degree to become 27° C.

By the processes set forth above, reproduction environment data TD600 becomes equivalent to changed reproduction environment data TD600A set forth below. FIG. 25 shows changed reproduction environment data TD600A, by way of example.

Referring to FIG. 5 again, in a reproduction environment data changing process M of step S127, changed reproduction environment data TD600A is transmitted to content reproduction device 600. Thus, the process of step S127 ends, and control proceeds to step S131 set forth above.

At step S162 in a content reproduction process T, control unit 610 determines whether changed reproduction environment data has been received or not. Now, assuming that changed reproduction environment data TD600A of FIG. 25 has been received, control proceeds to step S163.

At step S163, a data storage process T is performed. In a data storage process T, control unit 610 causes the received changed reproduction environment data to be stored in storage unit 620 as the reproduction environment data. When reproduction environment data indicating a content ID identical to that indicated by the changed reproduction environment data is stored in storage unit 620, control unit 610 overwrites the data with the changed reproduction environment data as the new reproduction environment data. By a data storage process T, suppose that changed reproduction environment data TD600A of FIG. 25 is stored in storage unit 620 as the reproduction environment data. In a manner similar to that set forth above, the process of steps S164 and et seq. is performed, and the content reproduction process T ends. Further, a process of steps S131 and et seq. is performed in a manner similar to that set forth above, and the content reproduction process M ends.

It is assumed that a process to reproduce the content identified by a content ID identical to that indicated by the changed reproduction environment data is to be performed.

In a content reproduction process M of FIG. 5, it is assumed that the process of steps S111-S122 is performed in a manner similar to that described above. In a content reproduction process T, it is assumed that the process of steps S141-S152 is performed in a manner similar to that described above.

Let the reproduction target content be one with a content ID "MV201". Suppose that changed reproduction environment data TD600A of FIG. 25 is stored as the reproduction environment data in storage unit 620 of content reproduction device 600. In this case, a YES determination is made at step S153, and control proceeds to step S155.

In a content reproduction process T, the process of steps S155 and et seq. is performed, similar to that described above. Further, in a content reproduction process M, the process of steps S123 and et seq. is performed, similar to that described above. By these processes, in the case where the environment generated by a reproduction environment generation process M is changed during reproduction of the reproduction target content, a changed environment is generated when the same reproduction target content is to be reproduced again.

Therefore, there can be provided an advantage that, when the environment is changed during reproduction of the reproduction target content, and the reproduction target content having the environment changed during reproduction is to be reproduced, the reproduction target content can be watched under the changed environment.

As set forth above, environment data is set in correspondence, for each content in the present embodiment. The environment data indicates the temperature, humidity, light intensity, volume, screen brightness and the like, suitable for the corresponding content. From the information indicated by the environment data corresponding to the content to be reproduced, content reproduction device 600 generates the data (environment generation control data T) to control illumination device 910, air conditioning device 920, content reproduction device 600 and the like to generate a reproduction environment suitable for generating the content. Content reproduction device 600 transmits environment generation control data T to portable terminal device 500.

Portable terminal device 500 controls illumination device 910, air conditioning device 920, content reproduction device 600 and the like, based on environment generation control data T received to generate a reproduction environment suitable for the content to be reproduced at content reproduction device 600.

Therefore, there can be provided an advantage of allowing generation of an environment corresponding to the type of relevant content.

In the present embodiment, an environment suitable for the reproduction target content is generated during reproduction of the reproduction target content, and when reproduction of the reproduction target content is stopped or ended, the environment is restored to the environment prior to being changed by reproduction of the reproduction target content. Therefore, the user does not have to carry out an operation to restore the environment to that prior to reproduction of the reproduction target content. Thus, there can be provided an advantage of improving the convenience of the user watching the reproduction target content.

The present embodiment also provides the advantage that, when the environment has been changed during reproduction of the reproduction target content, and the reproduction target content having the environment changed during reproduction is to be reproduced, the reproduction target content can be watched in the changed environment.

Second Embodiment

A process of utilizing the information on the occasion of stopping a content reproduction operation will be described hereinafter.

The network system of the present embodiment differs from network system 1000 of FIG. 1 in that illumination device 910, illumination device 910A, and air conditioning device 920 are absent. The remaining elements are similar to those of network system 1000, and detailed description thereof will not be repeated. The configuration of each of portable terminal device 500 and content reproduction device 600 is similar to that described above in the first embodiment. Therefore, detailed description thereof will not be repeated.

(Process on Occasion of Stopping Content)

A process to stop the reproducing content at content reproduction device 600 will be described hereinafter. Now, suppose that content is currently being reproduced at content reproduction device 600. The content reproduced at content reproduction device 600 is also referred to as reproduction content T. Let reproduction content T be video content with sound. In this case, it is assumed that an image of reproduction content T (hereinafter, also referred to as a content image T) is displayed at display unit 630 of content reproduction device 600. It is also assumed that the sound of reproduction content T (hereinafter, also referred to as reproduction sound T) is output from audio output unit 670.

It is assumed that portable terminal device 500 is set at an RC mode. It is also assumed that a control image MG400 set forth below is displayed at display unit 530 of portable terminal device 500.

Figure 26:
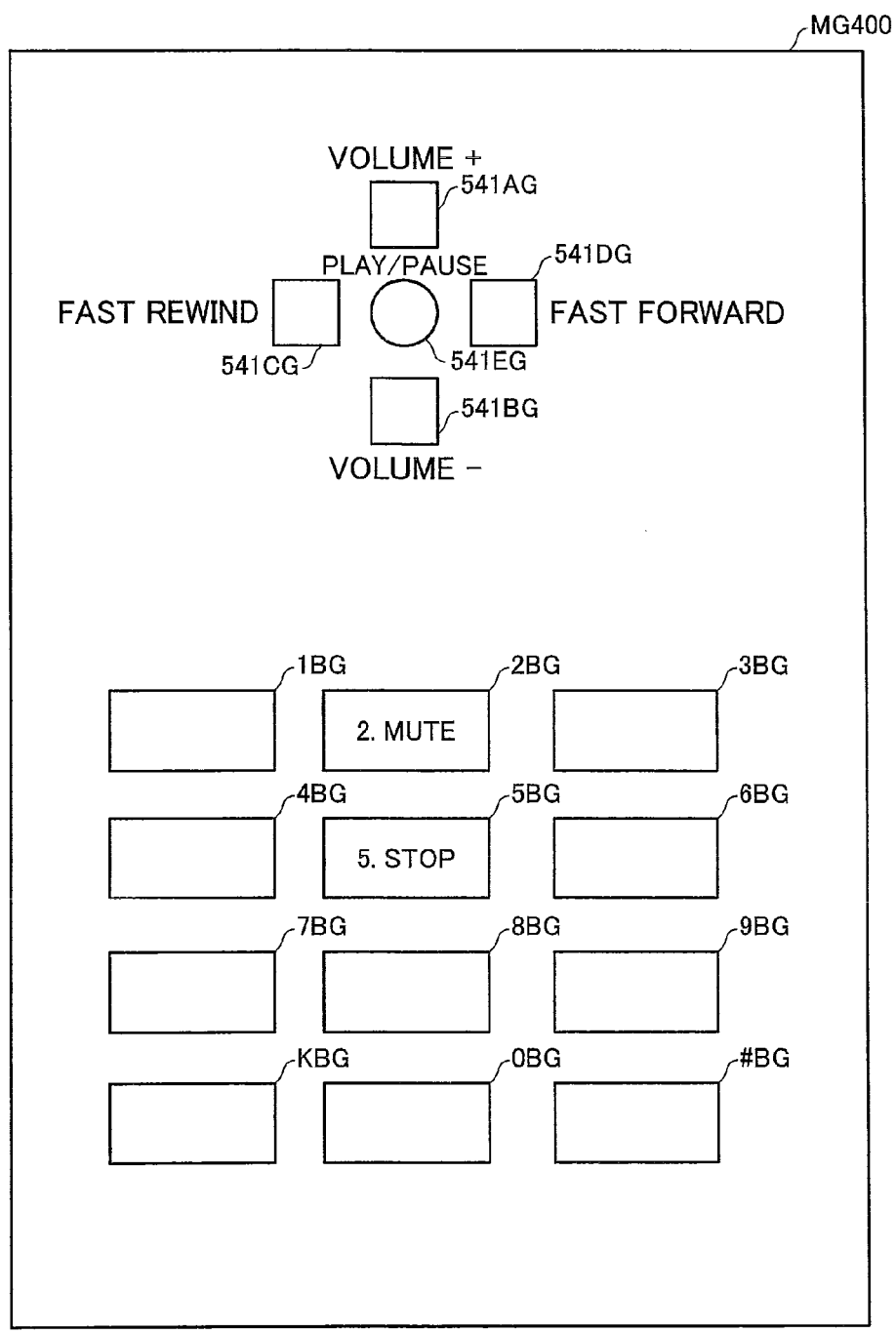
FIG. 26 shows a control image, by way of example.

FIG. 26 shows a control image MG400, by way of example. Hereinafter, the state in which portable terminal device 500 takes an RC operation mode and control image MG400 is displayed at display unit 530 is called an MCTC state.

Referring to FIG. 26, a determination button image 541EG corresponding to determination button 541E is displayed in control image MG400.

In an MCTC state, determination button 541E corresponding to determination button image 541EG functions to transmit an RC signal to reproduce the content to content reproduction device 600, when depressed, in the event of a content not reproduced, or reproduction of the content is at pause at content reproduction device 600. In an MCTC state, determination button 541E corresponding to determination button image 541EG functions to transmit to content reproduction device 600, when content is reproduced at content reproduction device 600, an RC signal to temporarily stop the content reproduced (hereinafter, also referred to as a pause RC signal), when depressed.

In control image MG400, direction button images 541AG, 541BG, 541CG and 541DG corresponding to direction buttons 541A, 541B, 541C and 541D, respectively, are displayed.

In an MCTC state, direction button 541A corresponding to direction button image 541AG functions to transmit to content reproduction device 600 an RC signal to increase the volume of reproduction sound T, when depressed. In an MCTC state, direction button 541B corresponding to direction button image 541BG functions to transmit to content reproduction device 600 an RC signal to lower the volume of reproduction sound T, when depressed.

In an MCTC state, direction button 541C corresponding to direction button image 541CG functions to transmit to content reproduction device 600 an RC signal to fast-rewind reproduction content T, when depressed. In an MCTC state, direction button 541D corresponding to direction button image 541DG functions to transmit to content reproduction device 600 an RC signal to fast-forward reproduction content T, when depressed.

In control image MG400, character button images 1BG, 2BG, 3BG, 4BG, 5BG, 6BG, 7BG, 8BG, 9BG, KBG, OBG and #BG are also displayed. Each of character button images 1BG, 2BG, 3BG, 4BG, 5BG, 6BG, 7BG, 8BG, 9BG, KBG, OBG and #BG corresponds to one of the plurality of character buttons included in character button group 546. For example, character button image 2BG corresponds to a character button to enter numeric "2". For example, character button image 5BG corresponds to a character button to enter numeric "5".

In an MCTC state, the character button corresponding to character button image 2BG functions to transmit to content reproduction device 600 an RC signal to set the volume value of reproduction sound T to "0", when depressed. The character button corresponding to character button image 5BG functions to transmit to content reproduction device 600 an RC signal to stop reproduction of reproduction content T (hereinafter, also referred to as a stop RC signal), when depressed.

In an MCTC state, the character button corresponding to each of character button images 1BG, 3BG, 4BG, 6BG, 7BG, 8BG, 9BG, KBG, OBG and #BG is an invalid button. An invalid button, even when depressed, does not cause a process to be performed.

Now, suppose that a stop operation M was specified at portable terminal device 500 in an MCTC state. A stop operation M is directed to stopping reproduction of content T currently reproduced. Specifically, a stop operation M is equivalent to depressing a character button corresponding to character button image 5BG at portable terminal device 500 in an MCTC state. In this case, a stop control process M is performed at portable terminal device 500. At content reproduction device 600, a stop control corresponding process T is performed. A stop control corresponding process T is performed when reproduction content T is reproduced at content reproduction device 600. A stop control corresponding process T is performed independent of other processes.

It is assumed that content related data corresponding to reproduction content T is stored in storage unit 620 of content reproduction device 600. Content related data is stored in storage unit 620 by a process similar to that of step S146 of FIG. 5, as described in the first embodiment. Let the content related data corresponding to reproduction content T be information indicating data corresponding to each of the plurality of items in content related data CTD100 of FIG. 7.

It is assumed that storage unit 620 stores information of the type label of the device storing reproduction content T (hereinafter, also referred to as a type label information and location information are similar to "device type label" and "location information", respectively, described with reference to FIG. 9. Therefore, detailed description thereof will not be repeated. It is assumed that the type label information and location information corresponding to reproduction content T are fetched from the device storing reproduction content T, when content reproduction device 600 receives reproduction content T, to be stored in storage unit 620. It is also assumed that storage unit 620 stores the sound volume data indicating the volume value of reproduction sound T. Every time a process to change the volume value is performed, control unit 610 alters the volume value indicated by the volume data to the changed volume value.

Let control unit 610 of content reproduction device 600 perform a time and date monitor process T to monitor the current time and date. A time and date monitor process T is performed independent of other processes. Further, it is assumed that control unit 610 performs a reproduction position monitor process T. A reproduction position monitor process T is performed when reproduction content T is reproduced at content reproduction device 600 to monitor the time indicating the position of the current point of time in reproduction content T currently reproduced (hereinafter, also referred to as a reproduction position time). The reproduction position time is the elapsed time from the start of reproduction content T. Therefore, when reproduction content T is being reproduced, the reproduction position time varies according to the elapse of time. A reproduction position monitor process T is performed independent of other processes.

Figure 27:
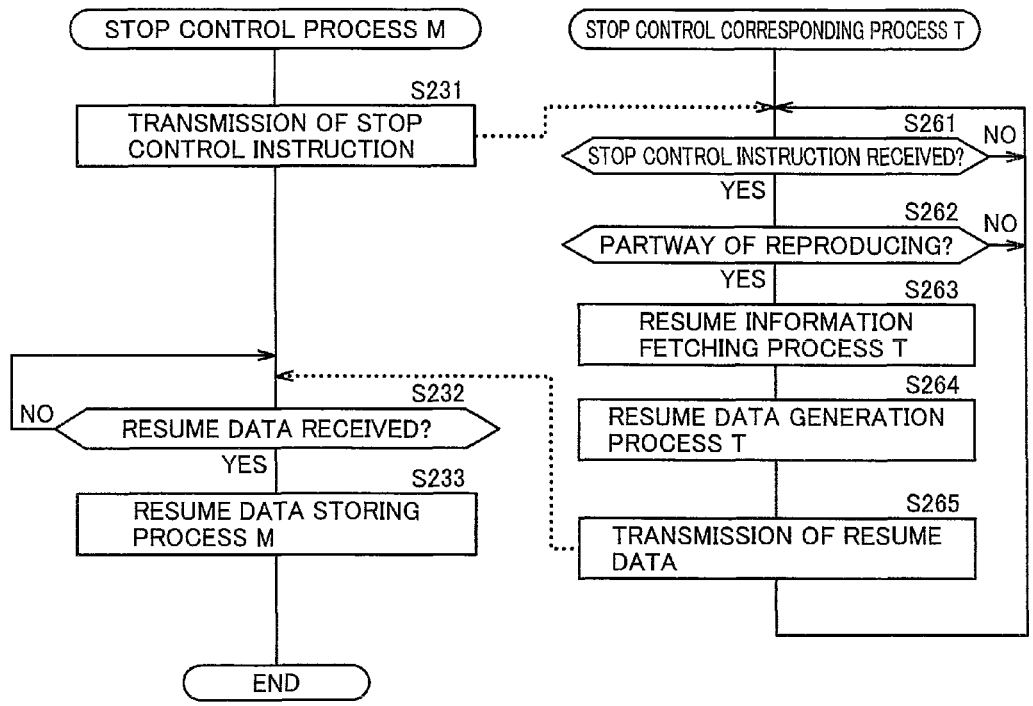
FIG. 27 is a flowchart of a stop control process M and a stop control corresponding process T.

FIG. 27 is a flowchart of a stop control process M and a stop control corresponding process T. In a stop control process M, the process of step S231 is first performed.

At step S231, control unit 510 transmits to content reproduction device 600 a stop RC signal as a stop control instruction. Then, the process of step S231 ends.

In a stop control corresponding process T, first the process of step S261 is performed.

At step S261, control unit 610 determines whether a stop RC signal as a stop control instruction has been received or not. When YES at step S261, control proceeds to step S262. When NO at step S261, the process of step S261 is performed again. Now, assuming that a stop RC signal as a stop control instruction has been received, control proceeds to step S262.

At step S262, control unit 610 determines whether a stop RC signal as a stop control instruction has been received or not during reproduction of reproduction content T. When YES at step S262, control proceeds to step S263. When NO at step S262, the process of step S261 is performed again. Now, assuming that a stop RC signal has been received during reproduction of reproduction content T, control proceeds to step S263.

At step S263, a resume information fetching process T is performed. In a resume information fetching process T, the time and date monitored in a time and date monitor process T are fetched by control unit 610. The time and date fetched in a resume information fetching process T are also referred to as the obtained time and date. Control unit 610 also fetches the reproduction position time monitored in a reproduction position monitoring process T. Hereinafter, the reproduction position time obtained in a resume information fetching process T is also referred to as the obtained reproduction position time.

Control unit 610 reads out the content related data, volume data, type label information, and location information, corresponding to reproduction content T, from storage unit 620 to obtain the content related data, volume data, type label information, and location information, corresponding to reproduction content T. Then, control proceeds to step S264.

At step S264, a resume data generation process T is performed. In a resume data generation process T, control unit 610 generates the resume data from the obtained content related data, volume data, type label information, and location information, as well as the obtained time and date, and obtained reproduction position time. Let the volume value indicated by the volume data be "20", by way of example. Let the obtained time and date be "Jan. 10, 2008, 19:20 and 30 seconds", by way of example. Let the obtained reproduction position time be "20 minutes and 10 seconds", by way of example. Now, suppose that that the generated resume data is equivalent to resume data TD700 set forth below. Then, the process of step S264 ends.

FIG. 28 shows resume data TD700, by way of example. Referring to FIG. 28, "reproduction stop time" in resume data TD700 represents the time when reproduction content T was stopped. Namely, "reproduction stop time" represents the obtained time. The items of "content ID", "title", "time" and "content form" have already been described with reference to FIGS. 7 and 9. Therefore, detailed description thereof will not be repeated. "Volume value" is the volume value at the point of time when reproduction of reproduction content T was stopped. Namely, "volume value" represents the volume value indicated by the volume data read out. "Stop time" represents the time indicating the position where reproduction was stopped in reproduction content T whose reproduction was stopped. Namely, "stop time" indicates the obtained reproduction position time.

In resume data TD700, the items of "device type label" and "location information" have already been described with reference to FIG. 9. Therefore, description thereof will not be repeated. Device type label "PC-1" represents the type label of content reproduction device 700A, for example. The "location information" item of "http://111.222.33.02/mv131.mpg" indicates that the corresponding content is stored in, for example, content reproduction device 700A. "Mv131.mpg" is the file name of the corresponding reproduction content T.

Referring to FIG. 27 again, control proceeds to step S265, after the process of step S264.

At step S265, control unit 610 transmits the generated resume data to portable terminal device 500. Then, the process of step S261 is performed again. Let the transmitted resume data be resume data TD700 of FIG. 28.

In a stop control process M, control proceeds to step S232, after the process of step S231.

At step S232, control unit 510 determines whether resume data has been received or not. When YES at step S232, control proceeds to step S233. When NO at step S232, the process of step S232 is performed again. Now, assuming that resume data TD700 has been received, control proceeds to step S233.

At step S233, a resume data storing process M is performed. In a resume data storing process M, control unit 510 causes the received resume data (hereinafter, also referred to as reception resume data) to be stored in storage unit 520. Hereinafter, the resume data stored in storage unit 520 is also referred to as a resume data table. When one resume data is stored in storage unit 520, the resume data table is equivalent to data including one resume data.

When a resume data table is already stored in storage unit 520, control unit 510 adds the received resume data to the stored resume data table. In this case, the resume data table is equivalent to a table including a plurality of resume data.

In the case where a resume data table is stored in storage unit 520 and the reception resume data indicates a content ID identical to the content ID indicated by any of the one or more resume data included in the resume data table, an update process M set forth below is performed. Hereinafter, the resume data indicating a content ID indicated by reception resume data among the one or more resume data in the resume data table is also referred to as update target resume data.

In an update process M, control unit 510 erases the update target resume data from the one or more resume data in the resume data table, and adds the reception resume data into the resume data table. Namely, the update target resume data is updated.

In the case where the resume data table stored in storage unit 520 includes a plurality of resume data, control unit 510 rearranges the plurality of resume data such that the resume data indicating the latest reproduction stop time among the plurality of resume data is located at the topmost position in the resume data table, i.e. to be arranged in time sequence. Then, a stop control process M ends.

By performing a stop control process M and stop control corresponding process T of FIG. 27 set forth above on each of a plurality of different reproduction contents, a resume data table set forth below will be stored in storage unit 520.

FIG. 29 shows a resume data table TD700A, by way of example. Resume data table TD700A includes a plurality of resume data. Referring to FIG. 29, "number" in resume data table TD700A is the number to identify one resume data. Each of the items in resume data table TD700A has already been described with reference to FIG. 28. Therefore, detailed description thereof will not be repeated. Device type label "HDREC-B" represents the type label of content reproduction device 700B of FIG. 1, for example. The location information of URL "http:/111.222.33.11/mv101.mpg" indicates that the content with the file name "mv101.mpg" is stored in content reproduction device 700B, for example. Namely, URL "http:/111.222.33.11/mv101.mpg" standing for the location information serves to identify content reproduction device 700B. URL "http://www.bb7.com/vod/mv201.mpg" standing for "location information" indicates that the content with the file name "mv201.mpg" is stored in service server 800, for example.

URL "http://111.222.33.11/mv101.mpg" standing for the location information serves to identify where the content with the file name "mv101.mpg" is located.

(Reproduction of Content Whose Reproduction is Stopped)

A process (hereinafter, also referred to as a continuation reproduction process) to restart reproduction of content whose reproduction has been stopped partway (hereinafter, also referred to as partway stop content) from the position where reproduction was stopped partway in content reproduction device 600 will be described hereinafter. In a continuation reproduction process, the process performed at portable terminal device 500 is also referred to as a continuation reproduction process M. Further, in a continuation reproduction process, the process carried out at content reproduction device 600 is also referred to as a continuation reproduction process T. Let resume data table TD700A of FIG. 29 be stored in storage unit 520 of portable terminal device 500. It is assumed that control unit 610 of content reproduction device 600 is performing the above-described time and date monitor process T.

Figure 30:
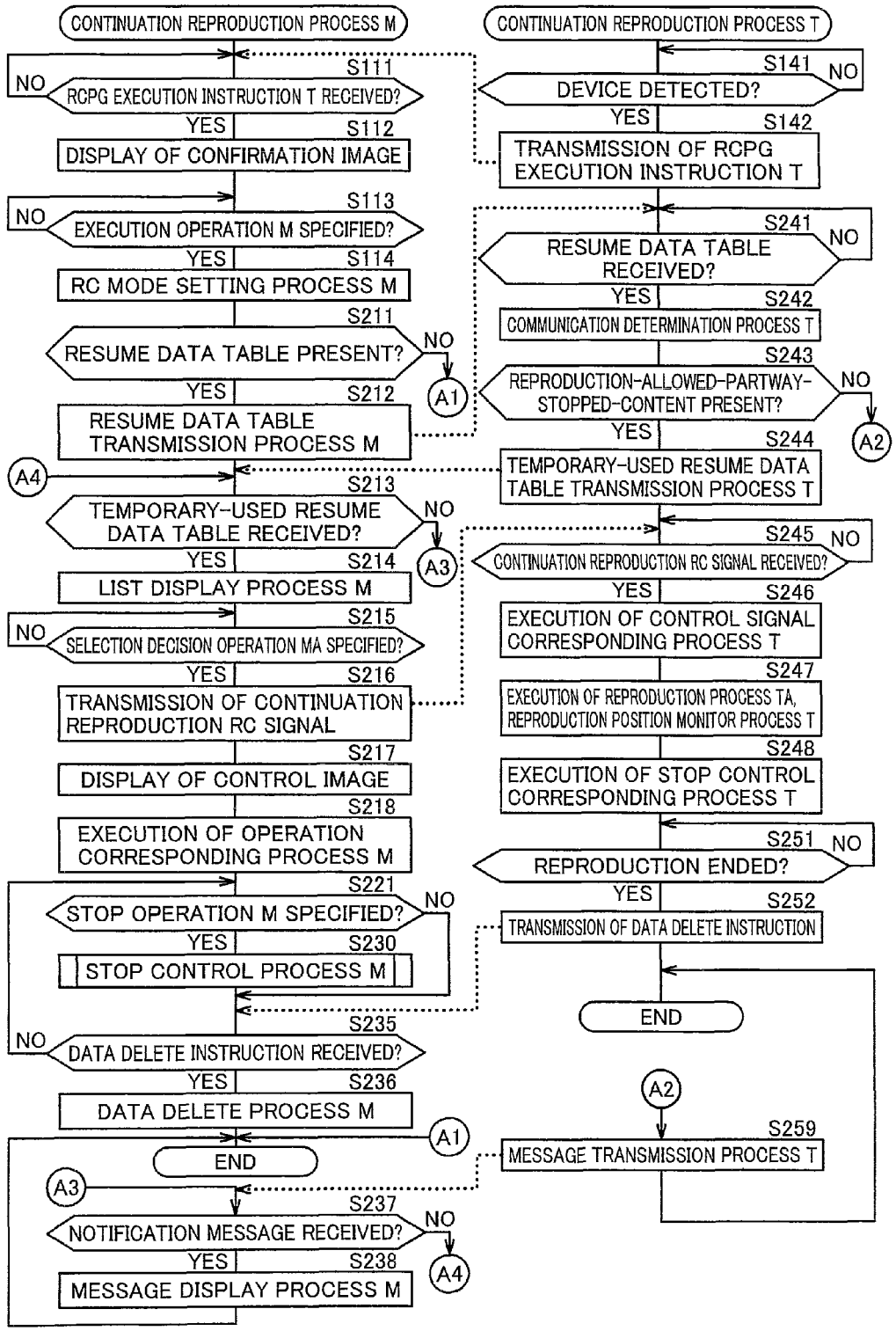
FIG. 30 is a flowchart of a continuation reproduction process M and a continuation reproduction process T.

FIG. 30 is a flowchart of a continuation reproduction process M and a continuation reproduction process T. In FIG. 30, the processes of steps with numbers identical to those of FIG. 5 are similar to those described with reference to FIG. 5, and detailed description thereof will not be repeated. The processes differing from those in FIG. 5 will be mainly described hereinafter.

Referring to FIG. 30, in a continuation reproduction process T, the processes of steps S141 and S142 are performed. The processes of steps S141 and S142 are similar to those described in the first embodiment, and detailed description thereof will not be repeated. By these processes, an RCPG execution instruction T is transmitted to portable terminal device 500.

In a continuation reproduction process M, the processes of steps S111, S112, S113 and S114 are performed. The processes of steps S111, S112, S113 and S114 are similar to those described in the first embodiment, and detailed description thereof will not be repeated. By these processes, the operation mode of portable terminal device 500 is set at an RC mode. Then, control proceeds to step S211.

In a continuation reproduction process M, steps S111-S114 do not have to be performed. In other words, control unit 510 of portable terminal device 500 in an RC operation mode may perform the processes of steps S211 and et seq. in a continuation reproduction process M. In this case, steps S141 and S142 do not have to be carried out in a continuation reproduction process T.

At step S211, control unit 510 determines whether a resume data table is stored in storage unit 520. When YES at step S211, control proceeds to step S212. When NO at step S211, this continuation reproduction process M ends. Now, assuming that resume data table TD700A of FIG. 29 is stored in storage unit 520, control proceeds to step S212.

At step S212, a resume data table transmission process M is performed. In a resume data table transmission process M, control unit 510 transmits the resume data table stored in storage unit 520 to content reproduction device 600. Let the transmitted resume data table be resume data table TD700A. Then, the process of step S212 ends.

In a continuation reproduction process T, control proceeds to step S241, after the process of step S142.

At step S241, control unit 610 determines whether a resume data table has been received or not. When YES at step S241, control unit 610 stores the received resume data table in storage unit 620. Control proceeds to step S242. When NO at step S241, the process of step S241 is performed again. Now, assuming that resume data table TD700A has been received, control proceeds to step S242. The resume data table received at control unit 610 is a resume data table used temporarily. Hereinafter, the resume data table received at control unit 610 is also referred to as a temporary-used resume data table.

At step S242, a communication determination process T is performed. In a communication determination process T, control unit 610 determines whether communication is allowed with the device identified by the location information indicated by each of the one or more resume data in the temporary-used resume data table stored in storage unit 620. Moreover, control unit 610 determines whether access can be gained to the content whose location is identified by the location information indicated by each of the one or more resume data in the temporary-used resume data table.

Hereinafter, the location information identifying a device that is not capable of communication is referred to as disallowed communication location information, and the location information identifying the location of content that cannot be accessed is referred to as disallowed access location information.

When control unit 610 is capable of communication with at least one device and can access the content stored in the relevant communication allowed device, control unit 610 determines that there is partway stopped content that can be reproduced (hereinafter, also referred to as reproduction-allowed-partway-stopped-content). When there is no device capable of communication or no content that can be accessed, control unit 610 determines that there is no reproduction-allowed-partway-stopped-content.

In the case where there is disallowed communication location information among the one or more location information indicated by the one or more resume data in the temporary-used resume data table, control unit 610 adds the character string "(disallowed communication)" to the resume data indicating the disallowed communication location information included in the temporary-used resume data table to update the temporary-used resume data table. In addition, when there is disallowed access location information among the one or more location information indicated by the one or more resume data in the temporary-used resume data table, control unit 610 adds the character string "(no content)" to the resume data indicating the disallowed access location information included in the temporary-used resume data table to update the temporary-used resume data table.

When the temporary-used resume data table includes one resume data and that resume data indicates disallowed communication location information or disallowed access location information, control unit 610 deletes the temporary-used resume data table stored in storage unit 620. Even if the temporary-used resume data table stored in storage unit 620 is deleted, there is the original resume data table stored in storage unit 520 of portable terminal device 500.

Let the temporary-used resume data table be resume data table TD700A. In this case, control unit 610 determines whether communication is capable with the device identified by the location information indicated by each of the plurality of resume data included in resume data table TD700A. Further, control unit 610 determines whether access is allowed to the content whose location is identified by the location information indicated by each of the plurality of resume data included in resume data table TD700A.

Let control unit 610 be disallowed of communicate with a device (for example, content reproduction device 700A) identified by URL "http://111.222.33.02/mv131.mpg" standing for the location information, indicated by the resume data with number "4" in resume data table TD700A. In this case, control unit 610 adds the character string "(disallowed communication)" to the "location information" item in the resume data with number "4" in resume data table TD700A.

In addition, let control unit 610 be disallowed of access to the content whose location is identified by URL "http://111.222.33.11/mv121.mpg" standing for the location information, indicated by the resume data with number "2" in resume data table TD700A. In this case, control unit 610 adds the character string "(no content)" to the "location information" item in the resume data with number "2" in resume data table TD700A. By the processes set forth above, resume data table TD700A will become equivalent to a resume data table TD700B set forth below. FIG. 31 shows a resume data table TD700B, by way of example.

In the case where communication with a device (content reproduction device 700A) identified by URL "http://111.222.33.02/mv131.mpg" indicated by the resume data with number "4" is not allowed, portable terminal device 500 identifies the state of disallowed communication with content reproduction device 700A. A disallowed communication state with content reproduction device 700A includes, for example, the state where the main power of content reproduction device 700A is OFF. Further, In the case where the content having its location identified by URL "http://111.222.33.11/mv121.mpg" indicated by the resume data with number "2" cannot be accessed, a state is identified in which the content with the file name "mv121.mpg" has been deleted from the device (content reproduction device 700B) identified by URL "http://111.222.33.11/mv121.mpg". Then, the process of step S242 ends.

Referring to FIG. 30 again, control proceeds to step S243, after the process of step S242. At step S243, a determination is made as to whether there is reproduction-allowed-partway-stopped-content.

Specifically, when communication is allowed with at least one device and the content stored in the relevant communication allowed device can be accessed in a communication determination process T, control unit 610 determines that there is reproduction-allowed-partway-stopped-content. When there is no device capable of communication or no content that can be accessed in a communication determination process T, control unit 610 determines that that there is no reproduction-allowed-partway-stopped-content. When YES at step S243, control proceeds to step S244. When NO at step S243, control proceeds to step S259 that will be described afterwards. Now, assuming that there is reproduction-allowed-partway-stopped-content, control proceeds to step S244.

At step S244, a temporary-used resume data table transmission process T is performed. In a temporary-used resume data table transmission process T, control unit 610 transmits the temporary-used resume data table stored in storage unit 620 to portable terminal device 500. Let the transmitted temporary-used resume data table be resume data table TD700B of FIG. 31. Then, the process of step S244 ends.

In a continuation reproduction process M, control proceeds to step S213, after the process of step S212.

At step S213, control unit 510 determines whether a temporary-used resume data table is received or not. When YES at step S213, control proceeds to step S214. When NO at step S213, control proceeds to step S237 that will be described afterwards. Now, assuming that resume data table TD700B is received as a temporary-used resume data table, control proceeds to step S214. It is to be noted that control unit 510 does not perform a process of storing resume data table TD700B that is the temporary-used resume data table received from content reproduction device 600 into storage unit 520. Therefore, in storage unit 520, resume data table TD700A is stored.

Namely, the resume data table (for example, resume data table TD700A) stored in storage unit 520 of portable terminal device 500, prior to execution of a continuation reproduction process M, is the original resume data table. Hereinafter, the resume data table stored in storage unit 520 prior to execution of a continuation reproduction process M is also referred to as the original resume data table.

At step S214, a list display process M is performed. In a list display process M, control unit 510 generates a list image displaying information indicated by the received temporary-used resume data table, and causes display unit 530 to display the generated list image. The generated list image shows the reproduction stopped date, the content title and the remaining time. Each of the reproduction stopped date, the content title and the remaining time will be described in detail afterwards.

When there is resume data indicating the character string "(disallowed communication)" in the "location information" item in the plurality of resume data included in the temporary-used resume data table, control unit 510 displays a character string "(disallowed communication)" at the right side of the title indicated by the relevant resume data in the generated list image. When there is resume data indicating the character string "(no content)" in the "location information" item among the plurality of resume data in the temporary-used resume data table, control unit 510 displays the character string "(no content)" at the right side of the title indicated by the relevant resume data in the generated list image. Hereinafter, the resume data indicating the character string "(no content)" in the "location information" item among the plurality of resume data included in the temporary-used resume data table is also referred to as "delete notification resume data".

When there is resume data indicating the character string "(disallowed communication)" or "(no content)" in the "location information" item among the plurality of resume data in the temporary-used resume data table, control unit 510 displays the background of the title indicated by the relevant resume data in gray in the generated list image. A title displayed with a gray background refers to a title that cannot be selected.

When there is any delete notification resume data in the plurality of resume data included in the temporary-used resume data table, control unit 510 deletes the resume data corresponding to the delete notification resume data from the plurality of resume data in the original resume data table stored in storage unit 520 to update the original resume data table. By such a process, the original resume data table is qualified as a resume data table reflecting the presence/absence of content at the current point of time. Then, the process of step S214 ends.

Let the temporary-used resume data table be resume data table TD700B. Further, let the original resume data table be resume data table TD700A. In this case, the generated list image in a list display process M becomes equivalent to a list image MG450 set forth below.

Resume data table TD700B that is a temporary-used resume data table includes delete notification resume data (the resume data with number "2"). Accordingly, the resume data with number "2" included in resume data table TD700A that is the original resume data table is deleted by the process set forth above. Thus, resume data table TD700A that is the original resume data table is updated. By this process, resume data table TD700A is qualified as a resume data table reflecting the presence/absence of content at the current point of time.

Figure 32:
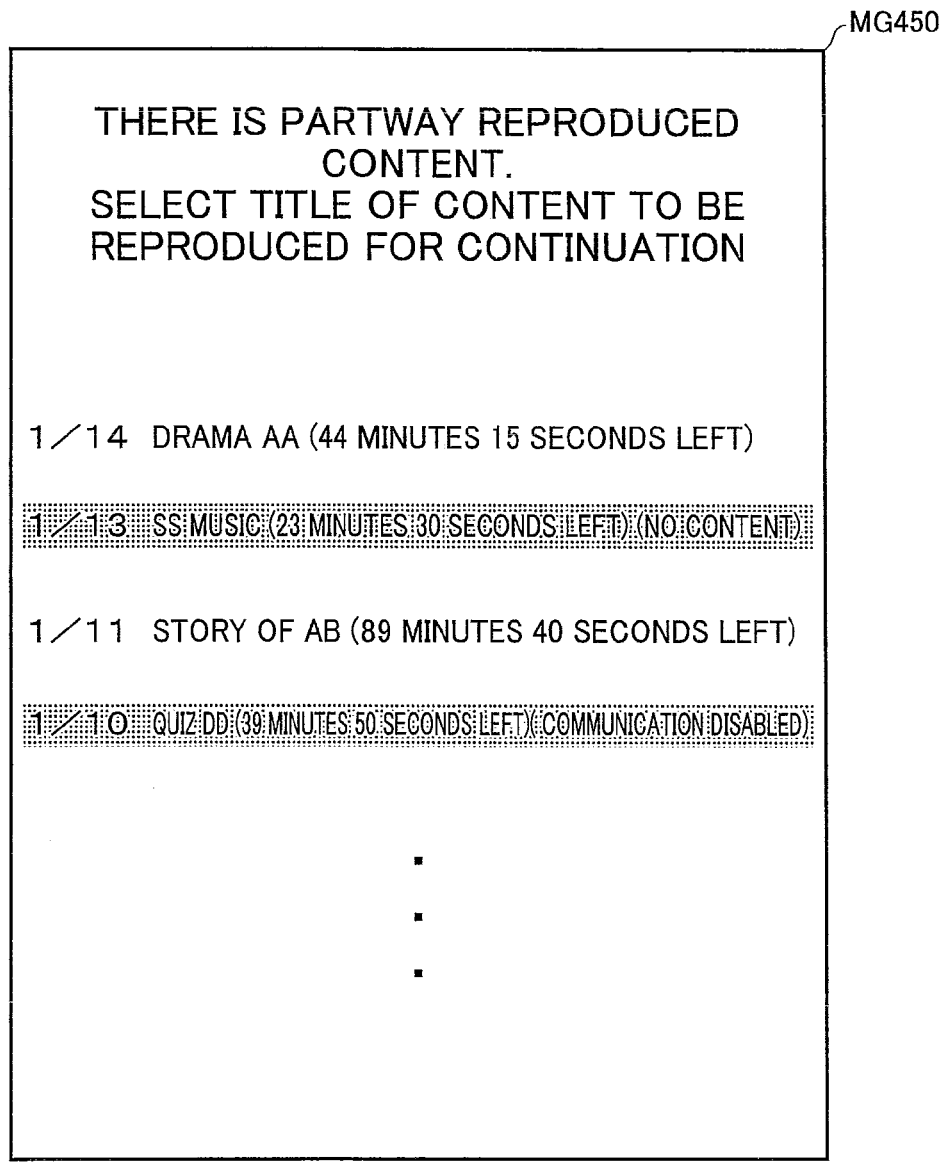
FIG. 32 shows a list image, by way of example.

FIG. 32 shows a list image MG450, by way of example. Referring to FIG. 32, list image MG450 shows a plurality of titles indicated by resume data table TD700B that is the temporary-used resume data table. The reproduction stopped date and remaining time are displayed at the left side and right side, respectively, of each title.

The reproduction stopped date is the date of the reproduction stopped time and date indicated by resume data table TD700B, and the remaining time is the time starting from the position where reproduction of the corresponding content has been stopped until the end of the relevant content. The remaining time is calculated by subtracting "stopped time" indicated by resume data table TD700B from the "time" indicated in resume data table TD700B.

The character string "(disallowed communication)" is displayed at the right side of the title corresponding to the resume data with number "4" including the character string "(disallowed communication)" in the "location information" item among the plurality of resume data included in resume data table TD700B. The background of the relevant title is displayed in gray. The character string "(no content)" is displayed at the right side of the title corresponding to the resume data with number "2" including the character string "(no content)" in the "location information" item among the plurality of resume data included in resume data table TD700B. The background of the relevant title is displayed in gray. A title having its background displayed in gray refers to a title that cannot be selected.

By displaying the character string "(disallowed communication)" at the right side of the title, content reproduction device 600 indicates that communication was disallowed with the device storing the content of the relevant title. The display of the character string "(no content)" at the right side of the title indicates that the content with the relevant title has been deleted from the device.

The display of the character string "(disallowed communication)" in the list image displayed at display unit 530 allows the user to readily know that communication with the device storing the corresponding content was disallowed. Further, the display of the character string "(no content)" in the list image displayed at display unit 530 allows the user to readily know that the corresponding content has been deleted.

Referring to FIG. 30 again, in a continuation reproduction process M, control proceeds to step S215, after the process of step S214.

At step S215, control unit 510 determines whether a selection decision operation MA has been specified or not. A selection decision operation MA is an interface operation M to select any of the plurality of titles displayed at the list image in display unit 530 and designate the decision. A title having its background displayed in gray in the list image cannot be selected. Now, suppose that the list image displayed at display unit 530 is list image MG450. A selection decision operation MA includes an operation to render a title in a selected state by operating direction button 541A, 541B, and the like, and then depressing determination button 541E.

When YES at step S215, control proceeds to step S216. When NO at step S215, the process of step S215 is performed again. Now, assuming that a selection decision operation MA was specified, control proceeds to step S216.

At step S216, control unit 510 transmits a continuation reproduction RC signal to content reproduction device 600. A continuation reproduction RC signal functions to reproduce the content whose reproduction was stopped partway. The transmitted continuation reproduction RC signal includes a content ID corresponding to the title selected by a selection decision operation MA. Let the title selected by a selection decision operation MA be "drama AA". In this case, the transmitted continuation reproduction RC signal includes a content ID "MV101" from resume data table TD700B that is the temporary-used resume data table. Then, the process of step S216 ends.

In a continuation reproduction process, T control proceeds to step S245, after the process of step S244.

At step S245, control unit 610 determines whether a continuation reproduction RC signal has been received or not. When YES at step S245, control proceeds to step S246. When NO at step S245, the process of step S245 is performed again. Assuming that a continuation reproduction RC signal including a content ID "MV101" has been received, control proceeds to step S246. Hereinafter, the resume data indicating a content ID included in the continuation reproduction RC signal, among the plurality of resume data included in the temporary-used resume data table stored in storage unit 620, is also referred to as "continuation reproduction used resume data".

At step S246, control unit 610 executes a control signal corresponding process T, similar to step S157 of FIG. 5. A control signal corresponding process T is performed independent of other processes. Then, control proceeds to step S247.

In a control signal corresponding process T, control unit 610 performs a process corresponding to an RC signal identified as the received control signal.

At step S247, control unit 610 executes a reproduction process TA. A reproduction process TA is performed independent of other processes. Simultaneous to execution of a reproduction process TA, control unit 610 executes the above-described reproduction position monitor process T. As described above, a reproduction position monitor process T serves to monitor the reproduction position time indicating the position of the current point of time in reproduction content T that is reproduced. A reproduction position monitor process T is performed independent of other processes. Then, the process of step S247 ends.

In a reproduction process TA, control unit 610 requests the device identified by the location information indicated by the continuation-reproduction-use resume data for the reproduction-allowed-partway-stopped-content starting from the position of the stopped time indicated by the continuation-reproduction-use resume data until the end, in the reproduction-allowed-partway-stopped-content identified by the content ID indicated by the continuation-reproduction-use resume data.

Let the continuation-reproduction-use resume data be the resume data with number "1" included in resume data table TD700B of FIG. 31. Let the device identified by URL "http://111.222.33.11/mv101.mpg" standing for the location information indicated by the resume data with number "1" be content reproduction device 700B. In this case, control unit 610 requests content reproduction device 700B for the data of the reproduction-allowed-partway-stopped-content from the position corresponding to an elapse of 15 minutes and 45 seconds from the beginning until the end in the reproduction-allowed-partway-stopped-content of content ID "MV101".

Content reproduction device 700B transmits the requested content data to content reproduction device 600. Control unit 610 receives the data of the requested content while reproducing the same, and causes the image of the reproducing content to be displayed at display unit 630. By such a process, the reproduction-allowed-partway-stopped-content can be reproduced from the position where reproduction was stopped partway in the reproduction-allowed-partway-stopped-content at content reproduction device 600.

In a reproduction process TA, control unit 610 outputs the sound of the reproduction-allowed-partway-stopped-content that is currently reproduced from audio output unit 670 at the volume level of the volume value ("20") indicated by the continuation-reproduction-use resume data. The volume value indicated by the continuation-reproduction-use resume data corresponds to the volume value at the point of time of the reproduction of the reproduction-allowed-partway-stopped-content being stopped. A reproduction process TA is terminated in accordance with the end of reproducing the reproduction-allowed-partway-stopped-content.

Control proceeds to step S248, after the process of step S247.

At step S248, control unit 610 executes a stop control corresponding process T of FIG. 27 set forth above. A stop control corresponding process T is performed independent of other processes. Then, the process of step S248 ends.

In a continuation reproduction process M, control proceeds to step S217, after the process of step S216.

At step S217, control unit 510 causes control image MG400 of FIG. 26 to be displayed at display unit 530. Namely, control image MG400 is displayed at display unit 530 of portable terminal device 500 in an RC operation mode. Then, control proceeds to step S218.

At step S218, control unit 510 executes an operation corresponding process MA. An operation corresponding process MA is performed independent of other processes. Then, the process step S218 ends.

In an operation corresponding process MA, control unit 510 performs a process corresponding to the operation carried out at portable terminal device 500. Specifically, when a button corresponding to a button image arranged in control image MG400 displayed at display unit 530 is depressed, control unit 510 performs a process assigned to the depressed button.

For example, when determination button 541E corresponding to determination button image 541EG is depressed at portable terminal device 500, control unit 510 based on an operation corresponding process MA transmits to content reproduction device 600 an RC signal to temporarily stop (hereinafter, also referred to as a temporary-stop RC signal) the reproduction of the reproduction-allowed-partway-stopped-content reproduced by a reproduction process TA. Upon receiving a temporary-stop RC signal at content reproduction device 600, control unit 610 temporarily stops the reproduction target content that is currently reproduced in a control signal corresponding process T performed independent of other processes.

Following the process of step S218, control proceeds to step S221.

At step S221, control unit 510 determines whether a stop operation M set forth above is specified or not. A stop operation M is directed to stopping the reproduction of allowed-partway-stopped-content that is currently reproduced. Specifically, a stop operation M is directed to depressing a character button corresponding to character button image 5BG at portable terminal device 500 in the aforementioned MCTC state. When YES at step S221, control proceeds to step S230. When NO at step S221, control proceeds to step S235 that will be described afterwards. Now, assuming that a stop operation M is specified, control proceeds to step S230.

At step S230, a stop control process M of FIG. 27 is performed.

Referring to FIG. 27 again, a process similar to that described above is performed at step S231. Therefore, detailed description thereof will not be repeated. By this process, a stop RC signal identified as a stop instruction is transmitted to content reproduction device 600.

At step S261 in a stop control corresponding process T, a process similar to that described above is performed. Therefore, detailed description thereof will not be repeated. Now, assuming that a stop RC signal is received at a stop control instruction, control proceeds to step S262.

At step S262, a process similar to that described above is performed. Therefore, detailed description thereof will not be repeated. Now, assuming that a stop RC signal that is a stop control instruction is received during reproduction of the reproduction-allowed-partway-stopped-content, control proceeds to step S263.

At step S263, a process similar to that described in a resume information fetching process T is performed, provided that reproduction content T is replaced with the reproduction-allowed-partway-stopped-content. Therefore, detailed description thereof will not be repeated.

At step S264, a process similar to that set forth above is performed. Therefore, detailed description thereof will not be repeated. By this process, resume data corresponding to reproduction-allowed-partway-stopped-content is generated.

By step S264 set forth above, the generated resume data is transmitted to portable terminal device 500.

At step S232 of a stop control process M, a process similar to that set forth above is performed. Therefore, detailed description thereof will not be repeated. Assuming that resume data corresponding to reproduction-allowed-partway-stopped-content is received, control proceeds to step S233. Let the received resume data be content ID "MV101".

At step S233, a resume data storing process M similar to that described above is performed. Therefore, detailed description thereof will not be repeated. Now, suppose that resume data table TD700A is stored as the original resume data table in storage unit 520. In this case, the update target resume data is equivalent to the resume data with number "1" indicated by the content ID "MV 101" indicated by the reception resume data, among the plurality of resume data in resume data table TD700A.

In this case, control unit 510 in a resume data storing process M erases the update target resume data from the plurality of resume data included in resume data, table TD700A, and adds the reception resume data into resume data table TD700A. Namely, the update target resume data has been updated.

Thus, this stop control process M ends, returning to a continuation reproduction process M of FIG. 30. Control proceeds to step S235 that will be described afterwards.

Referring to FIG. 30 again, in a continuation reproduction process T, control proceeds to step S251, after the process of step S241.

At step S251, control unit 610 determines whether the reproduction of the reproduction-allowed-partway-stopped-content has been completed up to the end of the reproduction-allowed-partway-stopped-content reproduced in a reproduction process TA. When YES at step S251, control proceeds to step 252. When NO at step S251, the process of step S251 is performed again. Now, assuming that reproduction of the reproduction-allowed-partway-stopped-content has ended, control proceeds to step S252.

At step S252, control unit 610 transmits a data delete instruction to portable terminal device 500. A data delete instruction is to delete resume data corresponding to the reproduction-allowed-partway-stopped-content whose reproduction has ended. The transmitted data delete instruction includes the content ID of the reproduction-allowed-partway-stopped-content having reproduction ended. Thus, the continuation reproduction process T ends.

In a continuation reproduction process M, control proceeds to step S232 when the aforementioned stop control process M ends.

At step S235, control unit 510 determines whether a data delete instruction has been received or not. When YES at step S235, control proceeds to step S236. When NO at step S235, the process of step S221 is performed again. Assuming that a data delete instruction has been received, control proceeds to step S236.

At step S236, a data delete process M is performed. In a data delete process M, control unit 510 deletes the resume data indicating the content ID included in the received data delete instruction from the plurality of resume data included in the resume data table that is the original resume data table stored in storage unit 520.

Let the resume data table that is the original resume data table stored in storage unit 520 be resume data table TD700A of FIG. 29. Let the content ID included in the data delete instruction be "MV 101". In this case, control unit 510 deletes the resume data with number "1" included in resume data table TD700A. Then, the stop control process M ends.

The process when a determination is made that there is no device capable of communication or there is no content that can be accessed in a communication determination process T at step S242 of FIG. 30 will be described hereinafter. In this case, a NO determination is made at step S243, and control proceeds to step S259.

At step S259, a message transmission process T is performed. In a message transmission process T, control unit 610 transmits a notification message to portable terminal device 500. The transmitted notification message is, for example, "current state: reproduction target content cannot be reproduced." Then, the continuation reproduction process T ends.

In a continuation reproduction process M, control proceeds to step S237 when NO at step S213.

At step S237 control unit 510 determines whether a notification message has been received or not. When YES at step S237, control proceeds to step S238. When NO at step S237, the process of step S213 is performed again. Assuming that a notification message has been received, control proceeds to step S238.

At step S238, a message display process P is performed. In a message display process M, control unit 510 displays the received notification message at display unit 530 for a predetermined time (for example 5 seconds). Then, the continuation reproduction process M ends.

In the present embodiment, the resume data directed to causing the partway stop content whose reproduction has been stopped partway to be reproduced starting from the position where reproduction was stopped is stored in storage unit 520 of portable terminal device 500. By using the resume data stored in storage unit 520, the partway stopped content can be reproduced at content reproduction device 600 starting from the position where reproduction was stopped in the partway stopped content.

When the partway stopped content is reproduced, the sound of the partway stopped content is output at the volume of the volume value corresponding to that at the point of time when reproduction was stopped. Therefore, the user does not have to take the trouble to adjust the volume at the time of reproducing the partway stopped content. In other words, the user's convenience is improved.

In the present embodiment, resume data corresponding to partway stopped content is stored in portable terminal device 500. The content identified by the resume data is the partway-stopped content that is the target of reproduction. By transmitting the resume data to content reproduction device 600, the partway stopped content that is the target of reproduction can be reproduced.

Thus, there is provided the advantage of allowing the reproduction target content to be reproduced readily.

In the present embodiment, resume data corresponding to partway stopped content is stored in portable terminal device 500. Therefore, when there are a plurality of users with a plurality of different portable terminal devices 500, reproduction of partway stopped content can be conducted at one content reproduction device 600 according to the resume data stored in each portable terminal device 500. In other words, there can be provided an advantage that the content for each user can be readily managed without having to monitor the device ID and the like of a plurality of portable terminal devices 500 at content reproduction device 600.

In the present embodiment, resume data corresponding to partway stopped content is stored in portable terminal device 500. Therefore, when reproduction of content is stopped at a content reproduction device 600 installed in a certain room, the content can be reproduced, starting from the position where reproduction was stopped, using a content reproduction device 600 installed at another room. Namely, there can be provided an advantage of improving the degree of freedom of the place where the user with a portable terminal device 500 can view the content.

Third Embodiment

A process to control a device connected on a network will be described hereinafter.

The network system of the present embodiment is similar to network system 1000 of FIG. 1. Therefore, detailed description thereof will not be repeated. The configuration of each of portable terminal device 500 and content reproduction device 600 is similar to that described in the first embodiment. Therefore, detailed description thereof will not be repeated. Moreover, the feature of each of illumination device 910, illumination device 910A, and air conditioning device 920 is similar to that described in the first embodiment. Therefore, detailed description thereof will not be repeated.

Each of illumination device 910, illumination device 910A, and air conditioning device 920 includes a normal mode and a standby mode for the operation mode. Each of illumination device 910, illumination device 910A, and air conditioning device 920 can receive an RC signal and is capable of communication with an external device irrespective of whether the operation mode is a normal mode or a standby mode. Moreover, each of illumination device 910, illumination device 910A, and air conditioning device 920 can notify an external device of its own operation mode (normal mode or standby mode) by communication.

In the present embodiment, it is assumed that content reproduction device 700A and content reproduction device 700B are a television receiver and an HDD recorder, respectively. Content reproduction device 700A includes a normal mode and a standby mode for the operation mode, likewise of content reproduction device 600.

Each of recorder device 600A, content reproduction device 700B and PC 600B includes a normal mode and a standby mode for the operation mode. Each of recorder device 600A, content reproduction device 700B and PC 600B can receive an RC signal and is capable of communication with an external device irrespective of whether the operation mode is a normal mode or a standby mode. Moreover, each of recorder device 600A, content reproduction device 700B and PC 600B can notify an external device of its own operation mode (normal mode or standby mode) by communication.

Further, by pre-programmed recording, in the case where recorder device 600A is in a normal operation mode, an external device can be notified of the state of "during pre-programmed recording" through communication. When recorder device 600A ends a recording process under preprogrammed recording when in a normal operation mode, the operation mode of recorder device 600A automatically attains a standby mode.

Content reproduction device 600 is capable of communication with each of recorder device 600A, PC 600B, content reproduction device 700A, content reproduction device 700B, illumination device 910, illumination device 910A, and air conditioning device 920. Content reproduction device 600 can obtain the state of each of recorder device 600A, PC 600B, content reproduction device 700A, content reproduction device 700B, illumination device 910, illumination device 910A, and air conditioning device 920 through communication.

By way of example, suppose that content reproduction device 600, recorder device 600A, PC 600B, illumination device 910 and illumination device 910A are installed in a living room. Content reproduction device 700A is installed in a bedroom, by way of example. Illumination device 910A is installed at a hallway, by way of example.

Let the device type label of content reproduction device 600 be TV-1, recorder device 600A be HDREC-1, PC 600B be PC-1, content reproduction device 700A be TV-A, content reproduction device 700B be HDREC-B, illumination device 910 be LIGHT-1, illumination device 900A be LIGHT-2, and air conditioning device 920 be AIR-CNT-1.

(Identification of Device with High Control Frequency on Hourly Basis)

A control device identification process M performed when a plurality of types of devices are controlled by RC signals through a portable terminal device 500 in an RC operation mode will be described hereinafter. A control device identification process M is directed to identifying the device with the highest frequency of being controlled by portable terminal device 500 in an RC operation mode, in each of a plurality of time zones that are preset. A control device identification process M is performed independent of other processes. Portable terminal device 500 in an RC operation mode is in a state controllable of any of content reproduction device 600, recorder device 600A, PC 600B, content reproduction device 700A, content reproduction device 700B, illumination device 910, illumination device 910A, and air conditioning device 920.

It is assumed that control unit 510 of portable terminal device 500 in an RC operation mode performs a time and date monitor process M monitoring the current time and date. A time and date monitor process M is performed independent of other processes.

In a control device identifying process M, an hourly control device count table is used. This hourly control device count table is used to count a device controlled by portable terminal device 500 in an RC operation mode at each of a plurality of preset time zones. The hourly control device count table is prestored in storage unit 520. The hourly control device count table corresponding to the case where a control device identifying process M is not carried out a single time is equivalent to an hourly control device count table MT800 set forth below.

FIG. 33 shows an hourly control device count table MT800, by way of example. Referring to FIG. 33, "time zone" represents a preset time zone. For example, the time zone 7:0-11:59 represents the time zone from 7:00 A.M. to 11:59 A.M. TV-1, HDREC-1 and TV-A . . . represent the device type label. In hourly control device count table MT800, a count value is indicated in each of all the cells identified by a device type label and a time zone.

In hourly control device count table MT800, the count value 0 indicated in the cell specified by device type label TV-1 and time zone 7:00-11:59 implies that the number of times content reproduction device 600 of device type label TV-1 has been controlled by an RC signal is "0". In the case where a control device identifying process M is not carried out a single time, the count value "0" is displayed in all the cells specified by a device type label and time zone in hourly control device count table MT800.

Figure 34:
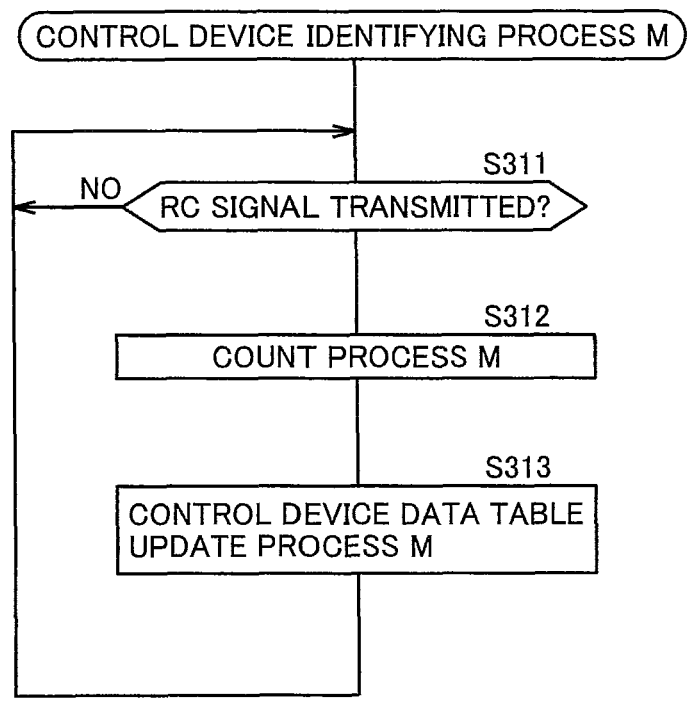
FIG. 34 is a flowchart of a control device identifying process M.

FIG. 34 is a flowchart of a control device identifying process M. Referring to FIG. 34, first the process of step S311 is performed in a control device identifying process M.

At step S311, control unit 510 determines whether an RC signal has been transmitted or not. When YES at step S311, control proceeds to step S312. When NO at step S311, the process of step S311 is performed again.

Now, suppose that portable terminal device 500 in an RC operation mode is in a controllable state with content reproduction device 600, by way of example. Suppose that, in response to an interface operation M performed at portable terminal device 500, control unit 510 transmits to content reproduction device 600 an RC signal to set the operation mode of content reproduction device 600 at a normal mode. In this case, a YES determination is made at step S311, and control proceeds to step S312.

At step S312, a count process M is performed. In a count process M, control unit 510 identifies the time zone corresponding to the current time monitored by time and date monitor process M, among the plurality of time zones in the hourly control device count table. Then, control unit 510 increments by 1 the count value in the cell specified by the identified time zone and the device type label of the device that is the destination of the transmitted RC signal in the hourly control device count table stored in storage unit 520.

Now, suppose that the hourly control device count table is hourly control device count table MT800 of FIG. 33. Let the current time and date be Jan. 14, 2008, 19:20, by way of example. Suppose that an RC signal to set the operation mode of content reproduction device 600 to a normal mode is transmitted to content reproduction device 600.

In this case, time zone identified by control unit 510 is the time zone "19:00-19:59". Control unit 510 increments by one the count value in the cell identified by the time zone "19:00-19:59" and the device type label "TV-1" of content reproduction device 600. Then, the process of step S312 ends.

Now, suppose that the processes of steps S311 and S312 have been performed several times. Let the hourly control device count table stored in storage unit 520 be an hourly control device count table MT800A set forth below.

FIG. 35 shows an hourly control device count table MT800A, by way of example. Referring to FIG. 35, respective items in hourly control device count table MT800A are similar to those in hourly control device count table MT800 of FIG. 33. Therefore, detailed description thereof will not be repeated. The count value 64 in the cell specified by device type label TV-1 and time zone 7:00-11:59 in hourly control device count table MT800A indicates that content reproduction device 600 with device type label TV-1 has been controlled 64 times by an RC signal.

Referring to FIG. 34 again, control proceeds to step S313, after the process of step S312. Now, suppose that an hourly control device data table is prestored in storage unit 520. The hourly control device data table shows the device that has been most frequently controlled in each of a plurality of preset time zones.

At step S313, a control device data table update process M is performed. In a control device data table update process M, control unit 510 updates the hourly control device data table based on the hourly control device count table. The method for updating the hourly control device data table will be described afterwards. Now, suppose that the hourly control device count table is an hourly control device count table 800A. In this case, the hourly control device data table subsequent to update through a control device data table update process M is equivalent to an hourly control device data table MD810 set forth below. Then, the process of step S3111 is performed again.

FIG. 36 represents an hourly control device data table MD810. Referring to FIG. 36, "time zone" in hourly control device data table MD810 is similar to that described with reference to FIG. 33, and detailed description thereof will not be repeated. "Device type label" indicates the device that has been most frequently controlled in the corresponding time zone. "Site" is the place where the device with the corresponding "device type label" is placed. It is assumed that storage unit 520 has stored therein the site of each of content reproduction device 600, recorder device 600A, PC 600B, content reproduction device 700A, content reproduction device 700B, illumination device 910, illumination device 910A, and air conditioning device 920 in correspondence with respective device type labels. For example, suppose that content reproduction device 600 with the device type label TV-1 is placed in the living room. In this case, the site "living room" is stored in correspondence with the device type label TV-1 in storage unit 520.

The hourly control device data table corresponding to the case where a control device data table updating process M is not carried out a single time is equivalent to a data table absent of information of "device type label" and "site" in hourly control device data table MD810.

A process of control unit 510 updating the hourly control device data table based on hourly control device count table MT800A will be described hereinafter.

In a control device data table update process M, control unit 510 writes the device type label TV-A with the highest count value in the time zone "6:00-6:59" in hourly control device count table MT800A in association with the time zone "6:00-6:59" indicated in the hourly control device data table. Further, control unit 510 writes the site "bedroom" corresponding to the device type label TV-A, stored in storage unit 520, in association with the time zone "6:00-6:59" in the hourly control device data table.

In the case where there are a plurality of device type labels with the highest count values in the hourly control device count table, control unit 510 writes the device type label appearing at the leftmost side, for example, into the hourly control device data table. The device with a device type label appearing more further to the left has been detected more previously, for example, in the search process performed at portable terminal device 500.

The above-described process will be performed similarly for the other time zones. Thus, the hourly control device data table is updated.

Hourly control device data table MD810 indicates that the device that has been most frequently controlled by portable terminal device 500 in an RC operation mode in the time zone: "6:00-6:59" is content reproduction device 700A with the device type label TV-A located in the bedroom.

In a control device identifying process M, the hourly control device count table and hourly control device data table are updated, as set forth above, every time portable terminal device 500 in an RC operation mode transmits an RC signal directed to controlling a device.

(Process in Standby Mode Transition)

The process performed in the transition of the operation mode of content reproduction device 600 from a normal mode to a standby mode will be described hereinafter. Now, suppose that a TV image based on broadcast signals is displayed at display unit 630 of content reproduction device 600. Further, suppose that the sound of the TV image (hereinafter, also referred to as TV sound T) is output from audio output unit 670.

Now, suppose that that portable terminal device 500 is set at the RC operation mode. Moreover, suppose that display unit 530 of portable terminal device 500 in an RC operation mode displays a control image MG400A set forth below.

Figure 37:
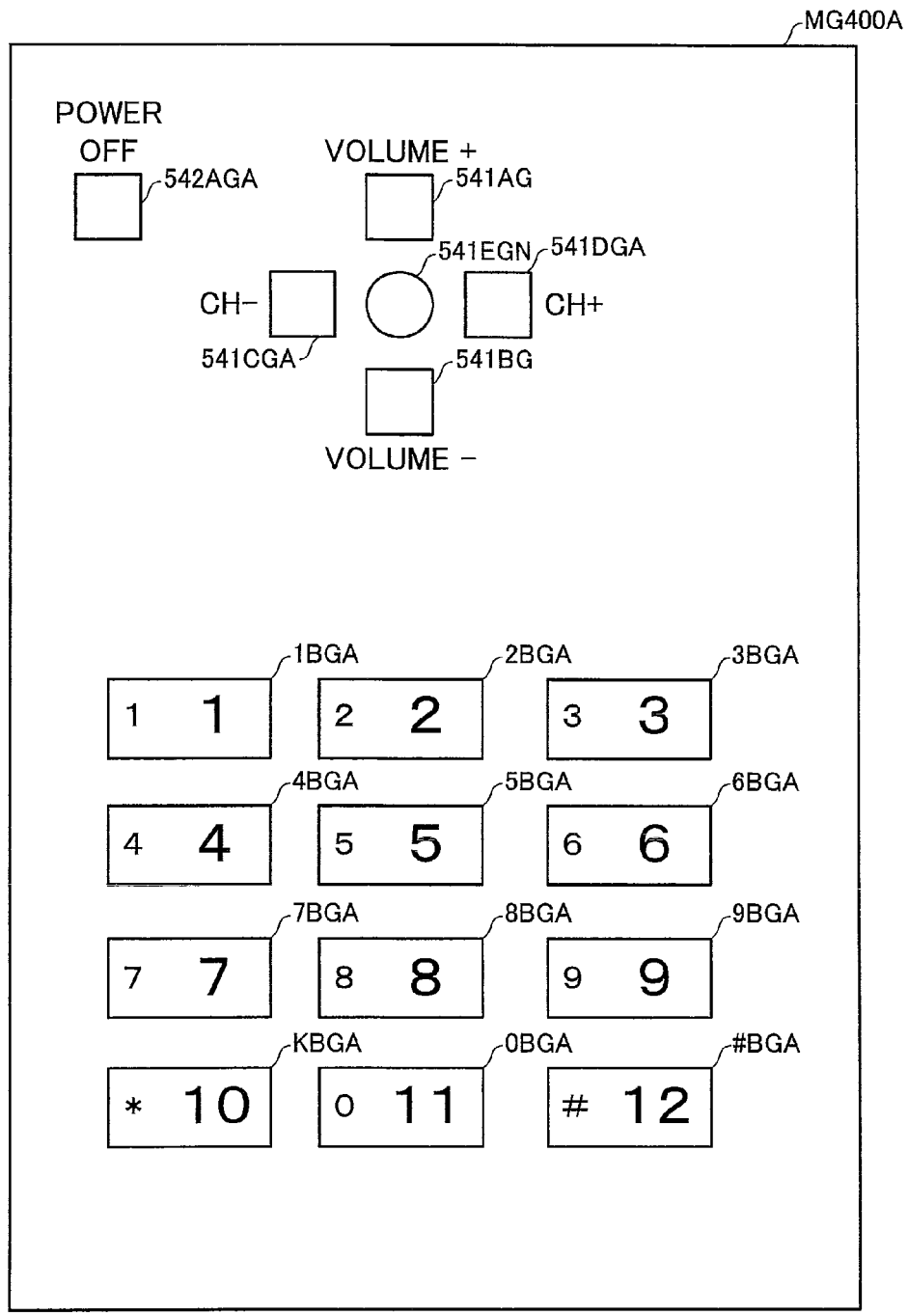
FIG. 37 represents a control image, by way of example.

FIG. 37 shows a control image MG400A, by way of example. Hereinafter, the state of portable terminal device 500 in an RC operation mode and having control image MG400A displayed at display unit 530 is referred to as an MCTA state.

Referring to FIG. 37, a button image 542AGA corresponding to a feature button 542A is displayed in control image MG400A.

In an MCTA state, feature button 542A corresponding to button image 542AGA functions to transmit an RC signal to set the operation mode of content reproduction device 600 at a standby mode (hereinafter, also referred to as a TV power OFF RC signal), when depressed.

Control image MG400A also displays direction button images 541AG, 541BG, 541CGA and 541DGA as well as determination button image 541EGN corresponding to direction buttons 541A, 541B, 541C and 541D as well as determination button 541E, respectively.

In an MCTA state, direction button 541A corresponding to direction button image 541AG functions to transmit to content reproduction device 600 an RC signal to increase the volume of TV sound T, when depressed. In an MCTA state, direction button 541B corresponding to direction button image 541BG functions to transmit to content reproduction device 600 an RC signal to lower the volume of TV sound T, when depressed.

In an MCTA state, direction button 541C corresponding to direction button image 541CGA functions to transmit to content reproduction device 600 an RC signal to decrement by 1 the channel number of the TV image displayed at display unit 630 of content reproduction device 600, when depressed. In an MCTA state, direction button 541D corresponding to direction button image 541DGA functions to transmit to content reproduction device 600 an RC signal to increment by 1 the channel number of the TV image displayed at display unit 630 of content reproduction device 600, when depressed.

In an MCTA state, determination button 541E corresponding to determination button image 541EGN is qualified as an invalid button. An invalid button, even when depressed, does not cause a process to be performed.

Control image MG400A also displays character button images 1BGA, 2BGA, 3BGA, 4BGA, 5BGA, 6BGA, 7BGA, 8BGA, 9BGA, KBGA, OBGA and #BGA. Each of 1BGA, 2BGA, 3BGA, 4BGA, 5BGA, 6BGA, 7BGA, 8BGA, 9BGA, KBGA, OBGA and #BGA corresponds to any of the plurality of character buttons in character button group 546. For example, character button image 2BGA corresponds to the character button to enter the numeric "2". For example, character button image #BGA corresponds to a character button to enter character "#".

A character button corresponding to a relevant one of character button images 1BGA, 2BGA, 3BGA, 4BGA, 5BGA, 6BGA, 7BGA, 8BGA, 9BGA, KBGA, OBGA and #BGA functions to transmit to content reproduction device 600 an RC signal to set the channel number of the TV image at a corresponding channel number (hereinafter, also referred to as a channel RC signal), when depressed. For example, the character button corresponding to character button image OBGA functions to transmit to content reproduction device 600 a channel RC signal to set the channel number of the TV image to "11", in response to a depression process.

Now, suppose that content reproduction device 600 takes a normal operation mode. Content reproduction device 600 in a normal operation mode is in an operation state that can perform a process not capable when in a standby mode. The power consumption of content reproduction device 600 in a standby operation mode is lower than that of content reproduction device 600 in a normal operation mode.

Suppose that a power OFF operation M was specified at portable terminal device 500 in an MCTA state. A power OFF operation M is directed to setting the operation mode of content reproduction device 600 to a standby mode. Namely, a power OFF operation M includes the operation of depressing feature button 542A corresponding to button image 542AGA at portable terminal device 500 in an MCTCA state. In this case, execution of a power OFF control process M is started at portable terminal device 500 in an MCTCA state. It is assumed that a power OFF control corresponding process T is to be performed at content reproduction device 600. A power OFF control corresponding process T is performed independent of other processes. It is assumed that control unit 510 of portable terminal device 500 performs a time and date monitor process M monitoring the current time and date. A time and date monitor process M is performed independent of other processes.

It is also assumed that control unit 510 of portable terminal device 500 performs a control device identifying process M of FIG. 34. A control device identifying process M is performed independent of other processes. By a control device identifying process M, the hourly control device data table stored in storage unit 520 is updated every time an RC signal is transmitted.

Figure 38:
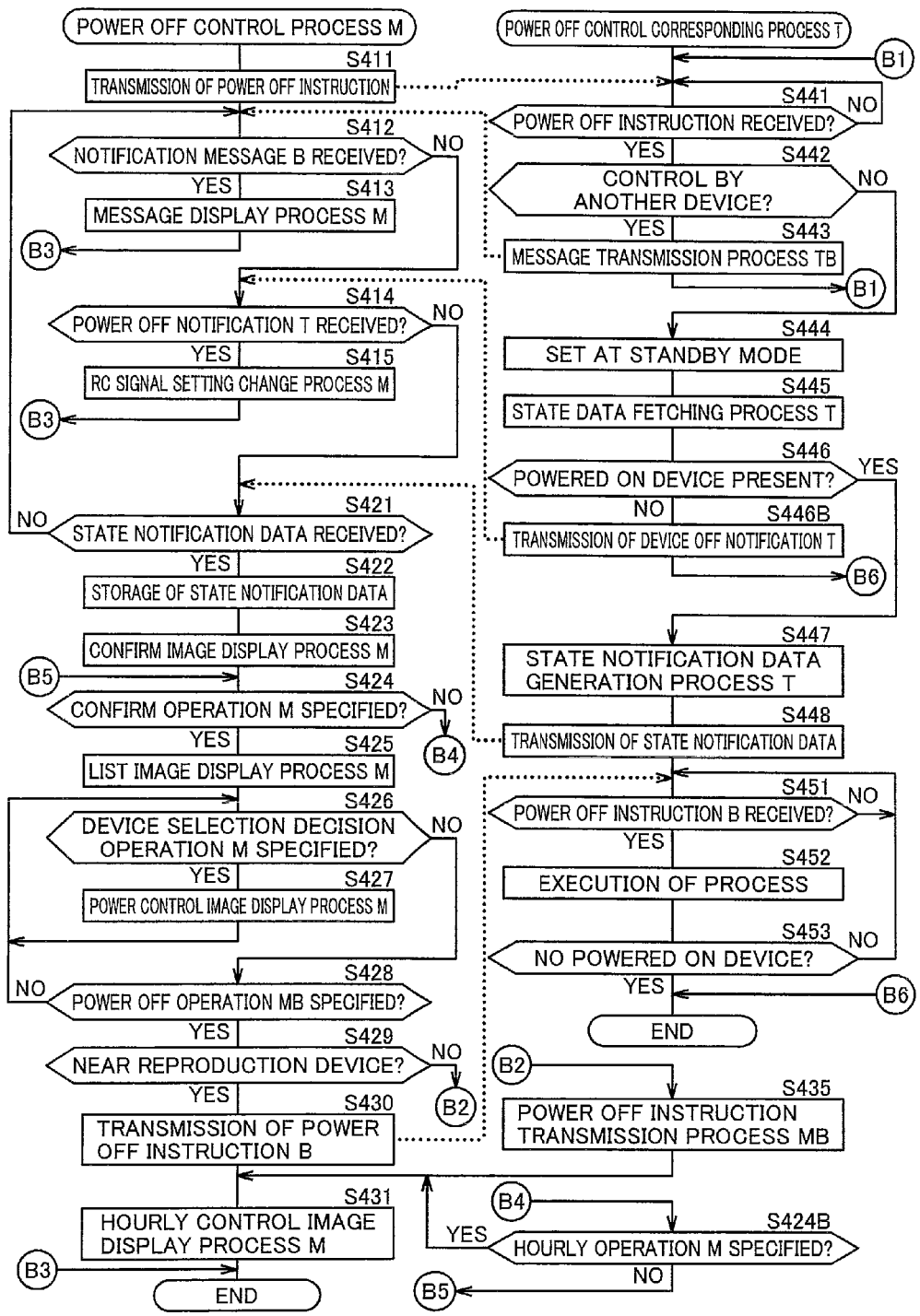
FIG. 38 is a flowchart of a power OFF control process M and a power OFF control corresponding process T.

FIG. 38 is a flow chart of a power OFF control process M and power OFF control corresponding process T. Referring to 38, the process of step S411 is performed in a power OFF control process M.

At step S411, control unit 510 transmits a TV power OFF RC signal as the power OFF instruction to content reproduction device 600. Thus, the process of step S411 ends.

In a power OFF control corresponding process T, the process of step S441 is performed.

At step S441, control unit 610 determines whether a TV power OFF RC signal as a power OFF instruction has been received or not. When YES at step S411, control proceeds to step S442. When NO at step S441, the process of step S441 is performed again. Assuming that a TV power OFF RC signal as a power OFF instruction has been received, control proceeds to step S442.

At step S442, a determination is made as to whether there is control by another device. Specifically, control unit 610 determines whether a device other than portable terminal device 500 transmitting a TV power OFF RC signal is controlling content reproduction device 600 by communication therewith. Control of content reproduction device 600 by another device is directed to, for example, allowing the relevant another device to receive the video content stored at content reproduction device 600. When YES at step S442, control proceeds to step S443 that will be described afterwards. When NO at step S443, control proceeds to step S444. Now, assuming that there is no control by another device, control proceeds to step S444.

At step S444, control unit 610 turns off the image display power switch, and sets the operation mode of content reproduction device 600 at a standby mode. Accordingly, the image displayed at display unit 630 is eliminated. Then, control proceeds to step S445.

At step S445, a state data fetching process T is performed. In a state data fetching process T, control unit 610 transmits to each of a plurality of devices in home network 501 a state request instruction to request state data indicating the state of each device, through communication. Hereinafter, a device to which a state request instruction is transmitted by control unit 610 is also referred to as a "state data fetch target device". Now, suppose that the state data fetch target device includes recorder device 600A, PC 600B, content reproduction device 700A, content reproduction device 700B, illumination device 910, illumination device 910A, and air conditioning device 920.

Upon receiving a state request instruction, the state data fetch target device transmits to content reproduction device 600 state data representing the power state based on its own operation mode and the communication state with content reproduction device 600. It is to be noted that a state data fetch target device that cannot communicate with content reproduction device 600 due to its main power being OFF (hereinafter, also referred to as a state presentation disabled device) cannot transmit the state data to content reproduction device 600.

Control unit 610 transmits a state request instruction to a plurality of state data fetch target devices, and receives a plurality of state data from the plurality of state data fetch target devices, excluding any state presentation disabled device. Control unit 610 stores the received plurality of state data in storage unit 620. Then, the process of step S445 ends.

In the case where the state data fetch target device is, for example, content reproduction device 700B, the state data transmitted to content reproduction device 600 by content reproduction device 700B that is a state data fetch target device is equivalent to state data D850 set forth below.

FIG. 39 represents state data D850, by way of example. Referring to FIG. 39, "device type label" in state data D850 is the device type label of the state data fetch target device. "Power state" refers to the power state of a state data fetch target device. When the operation mode of the state data fetch target device is in a normal mode, "ON" is written in the "power state" item. When the operation mode of the state data fetch target device is in a standby mode, "OFF" is written in the "power state" item. When the state data fetch target device is in a normal operation mode corresponding to pre-programmed recording, the description of "(during pre-programmed recording" is added to the "power state" item.

"Communication state" in state data D850 refers to the communication state between the state data fetch target device and content reproduction device 600. When communication is allowed between the state data fetch target device and content reproduction device 600, "on line" is written in the "communication state" item.

When the state data fetch target device is illumination device 910, for example, the state data transmitted to content reproduction device 600 by illumination device 910 identified as the state data fetch target device is state data D850A set forth below.

FIG. 40 shows state data D850A, by way of example. Respective items in state data D850A are similar to those in state data D850 of FIG. 39. Therefore, detailed description thereof will not be repeated.

Further, in the case where the state data fetch target device is, for example, illumination device 910A, the state data transmitted to content reproduction device 600 by illumination device 910A identified as the state data fetch target device is state data D850B set forth below.

FIG. 41 shows state data D850B, by way of example. With reference to FIG. 41, respective items in state data D850B are similar to those in state data D850 of FIG. 39. Therefore, detailed description thereof will not be repeated.

Moreover, in the case where the state data fetch target device is, for example, air conditioning device 920, the state data transmitted to content reproduction device 600 by air conditioning device 920 identified as the state data fetch target device is state data D850C set forth below.

FIG. 42 shows state data D850C, by way of example. With reference to FIG. 42, respective items in state data D850C are similar to those in state data D850 of FIG. 39. Therefore, detailed description thereof will not be repeated.

Referring to FIG. 38 again, control proceeds to step S446, after the process of step S445.

At step S446, a determination is made as to whether there is a device powered on. Specifically, control unit 610 determines whether there is one or more in the plurality of state data stored in storage unit 620 having "ON" for the "power state". When YES at step S446, control proceeds to step S447. When NO at step S446, control proceeds to step S446B that will be described afterwards. Now, assuming that there is one or more state data indicating "ON" for the "power state", control proceeds to step S447.

At step S447, a state notification data generation process T is performed. In a state notification data generation process T, control unit 610 generates state notification data from the one or more state data indicating "ON" for the "power state", stored in storage unit 620. Control unit 610 stores the generated state notification data into storage unit 620. The method of generating state notification data will be described afterwards. Then, the process of step S447 ends.

Now, suppose that the state data indicating "ON" for the "power state" stored in storage unit 620 is, by way of example, state data D850 of FIG. 39, state data D850A of FIG. 40 and state data D850B of FIG. 41. In this case, let the state notification data generated by a state notification data generation process T be state notification data TD860 set forth below.

FIG. 43 represents state notification data TD860, by way of example. Referring to FIG. 43, "device type label" in state notification data TD860 represents the device type label indicating the state data with "ON" for the "power state". "Device designation" refers to the name of the device with the corresponding "device type label". It is assumed that a device designation corresponding to each of the plurality of device type labels is prestored in storage unit 620. For example, let the device designation of device type label "HDREC-1" be an "HDD recorder". In this case, device designation "HDD recorder" is stored in storage unit 620 associated with device type label "HDREC-1".

The items of "power state" and "communication state" in state notification data TD860 are similar to those in state data D850 of FIG. 39. Therefore, detailed description thereof will not be repeated. The "site" item refers to the place where the device of the corresponding "device type label" is located. Likewise of storage unit 520, storage unit 620 has stored therein the site of content reproduction device 600, recorder device 600A, PC 600B, content reproduction device 700A, content reproduction device 700B, illumination device 910, illumination device 910A, and air conditioning device 920 corresponding to respective device type labels.

The method of control unit 610 generating state notification data using, by way of example, state data D850, state data D850A, and state data D850B will be described hereinafter.

In a state notification data generation process T, control unit 610 writes into the state notification data a plurality of information indicated by respective items of "device type label", "power state" and "communication state" of state data D850 in association. Further, control unit 610 writes into the state notification data the device designation "HDD recorder" corresponding to device type label "HDREC-1" in association therewith. Further, control unit 610 writes into the state notification data the site "living room" corresponding to device type label "HDREC-1", stored in storage unit 620, in association therewith.

By performing the process set forth above also for state data D850A and state data D850B, state notification data TD860 is generated.

Referring to FIG. 38 again, control proceeds to step S448, after the process of step S447.

At step S448, control unit 610 transmits to portable terminal device 500 through near-field wireless communication using communication unit 660, the generated state notification data. Now, suppose that the transmitted state notification data is state notification data TD860 shown in FIG. 43. Thus, the process of step S448 ends.

In a power OFF control process M, control proceeds to step S412, after the process of step S411.

At step S412, control unit 510 determines whether a notification message B that will be described afterwards has been received or not. When YES at step S412, control proceeds to step S413. When NO at step S412, control proceeds to step S414. Now, assuming that notification message B has not been received, control proceeds to step S414.

At step S414, control unit 510 determines whether a device OFF notification T that will be described afterwards has been received or not. When YES at step S414, control proceeds to step S415. When NO at step S414, control proceeds to step S421. Now, assuming that a device OFF notification T has not been received, control proceeds to step S421.

At step S421, control unit 510 determines whether state notification data has been received or not. When YES at step S421, control proceeds to step S422. When NO at step S421, the process of step S412 is performed again. Now, assuming that state notification data TD860 of FIG. 43 has been received, control proceeds to step S422.

At step S422, control unit 510 stores the received state notification data in storage unit 520. Then, control proceeds to step S423.

At step S423, a confirmation image display process M is performed. In a confirmation image display process M, control unit 510 generates a confirmation image based on the received state notification data, and causes display unit 530 to display the generated confirmation image. The confirmation image includes a confirmation message A. Confirmation message A indicates the number of devices that are powered on. Let the received state notification data be state notification data TD860. Since there are three device type labels with "ON" for the "power state" in state notification data TD860, confirmation message A is, for example, "There are three devices powered on. Confirm?" In this case, the generated confirmation image is equivalent to a confirmation image MG500 set forth below, displaying confirmation message A. Upon displaying a confirmation image, the process of step S423 ends.

Figure 44:
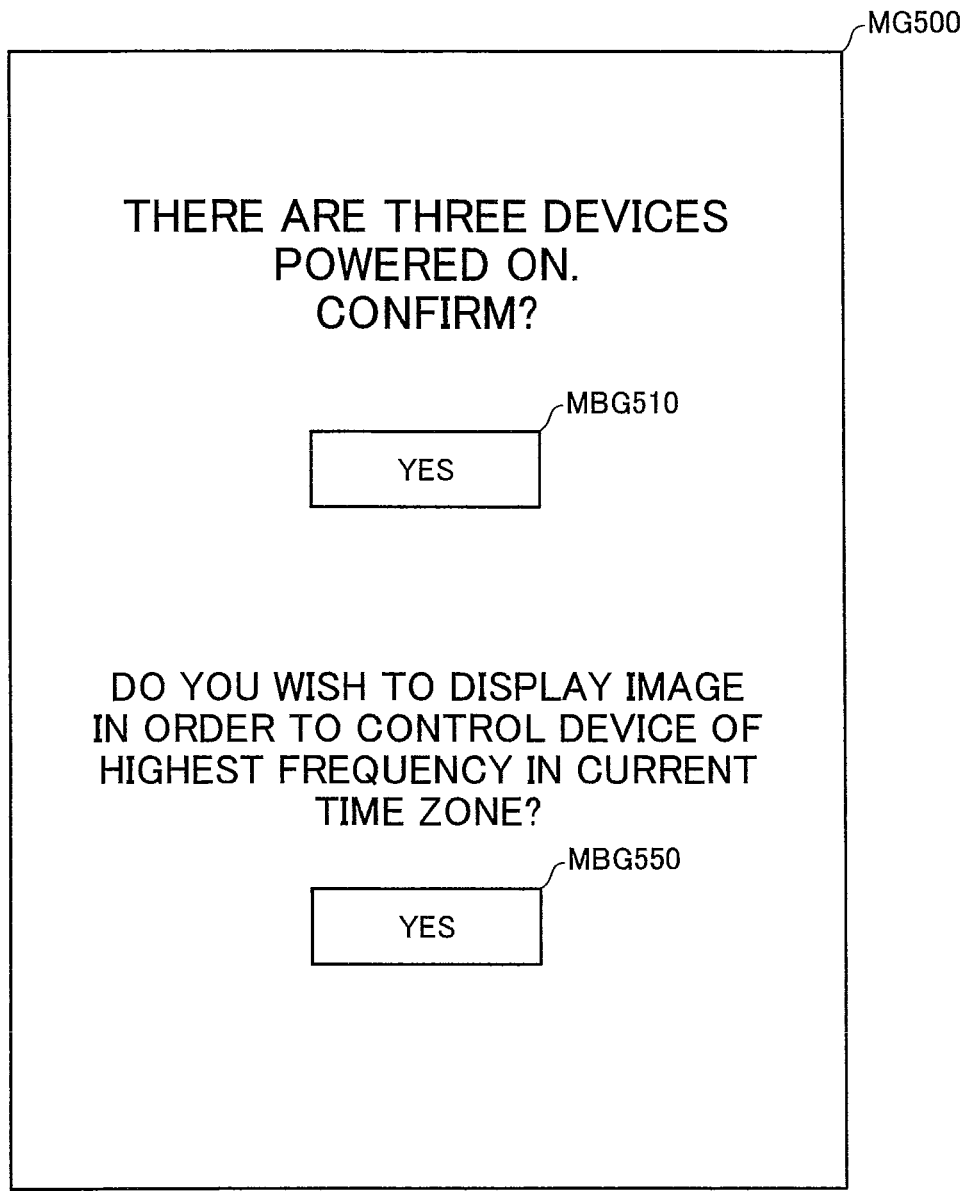
FIG. 44 shows a confirmation image, by way of example.

FIG. 44 shows confirmation image MG500, by way of example. Referring to FIG. 44, confirmation image MG500 includes confirmation message A set forth above. In addition, button images MBG510 and MBG550 are arranged in confirmation image MG500.

Button image MBG510 functions to display a list of devices that are powered on, in response to a depression process.

Button image MBG550 functions to render portable terminal device 500 controllable of the device of high usage frequency in the current time zone in response to a depression process.

Referring to FIG. 38 again, in a power OFF control process M, control proceeds to step S424, after the process of step S423.

At step S424, control unit 510 determines whether a confirmation operation M is specified or not. Now, a confirmation operation M is an interface operation M for a depression process of button image MBG510. When YES at step S424, control proceeds to step S425. When NO at step S424, control proceeds to step S424B that will be described afterwards. Now, assuming that a confirmation operation M is specified, control proceeds to step S425.

At step S425, a list image display process M is performed. In a list image display process M, control unit 510 generates a list image, based on the received state notification data, and causes display unit 530 to display the generated list image. The generated list image indicates the device designation indicated in the state notification data. When "(during preprogrammed recording)" is displayed in the power state item in the state notification data, the character string "(during preprogrammed recording)" is displayed in association with a corresponding device designation in the generated list image.

Now, let the received state notification data be state notification data TD860. In this case, the generated list image is a list image MG500A set forth below. Upon displaying a list image, the process of step S425 ends.

Figure 45:
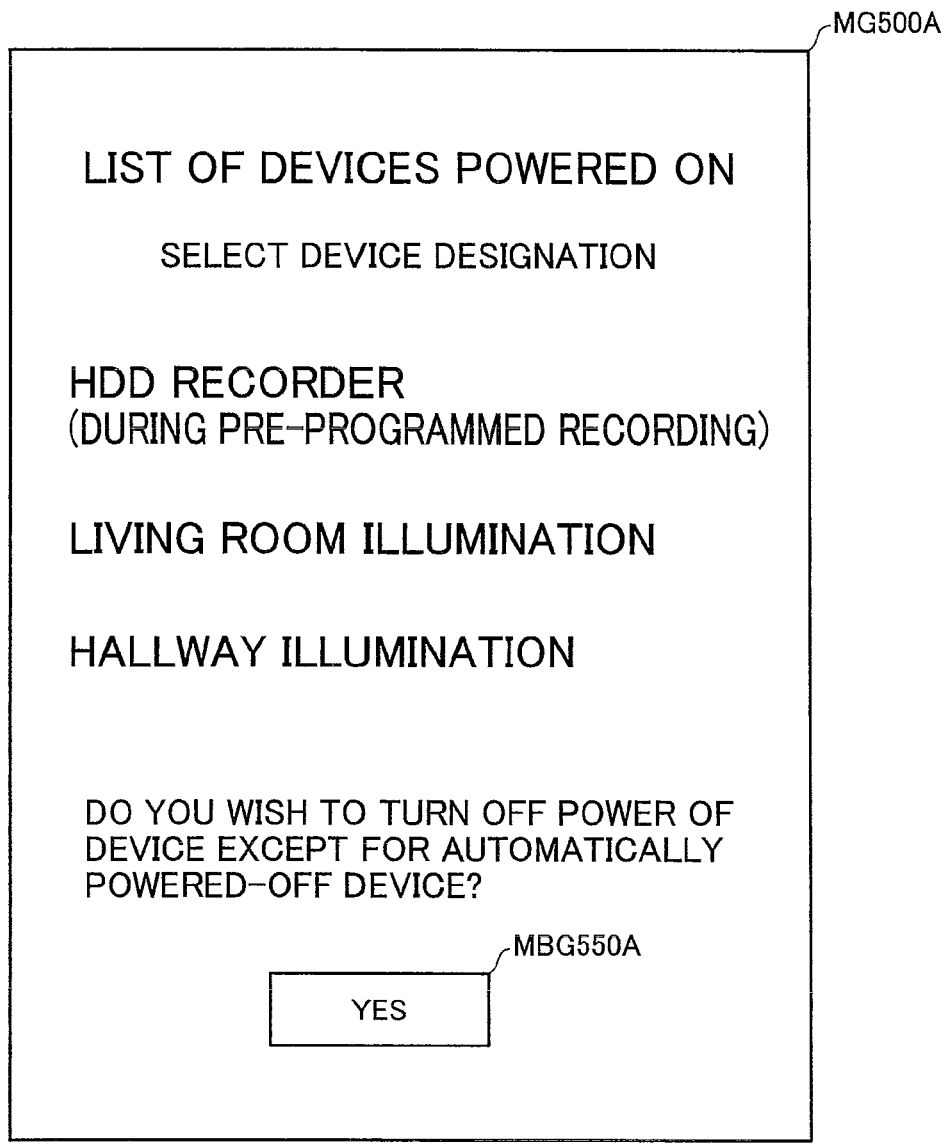
FIG. 45 shows a list image, by way of example.

FIG. 45 shows a list image 500A, by way of example. Referring to FIG. 45, a plurality of device designations, indicated in state notification data TD860, are displayed at list image MG500A. The character string of a device designation displayed at list image MG500A is a character string that can be selected by an interface operation M.

Since the power state item indicated by state notification data TD860 shows "(during preprogrammed recording)", the character string "(during preprogrammed recording)" is displayed beside the corresponding device designation "HDD recorder". The device with device designation "HDD recorder" corresponding to "(during preprogrammed recording)" automatically attains a standby mode from a normal mode at a predetermined time. Namely, the device with device designation "HDD recorder" has its power turned off automatically at a predetermined time. A device that automatically attains a standby mode from a normal mode at a predetermined time is also referred to as an automatic powered off device.

A button image MBG550A is arranged in list image MG500A. Button image MBG550A in response to a depression process functions to set the operation mode of a device among the plurality of devices with the plurality of device designations displayed in list image MG500A, other than the automatic powered off device, at a standby mode.

After the process of step S425, control proceeds to step S426.

At step S426, control unit 510 determines whether a device selection decision operation M is specified or not. A device selection decision operation M includes selecting any of the plurality of device designations displayed in list image MG500A to designate the relevant decision. When YES at step S426, control proceeds to step S427. When NO at step S426, control proceeds to step S428. Now, assuming that a device selection decision operation M is not specified, control proceeds to step S428.

At step S428, control unit 510 determines whether a power OFF operation MB is specified or not. A power OFF operation MB is an interface operation M for a depression process of button image MBG550A. When YES at step S428, control proceeds to step S429. When NO at step S428, the process of step S426 is performed again. Now, assuming that there is a power OFF operation MB, control proceeds to step S429.

At step S429, a determination is made as to whether there is a portable terminal device 500 in the vicinity of content reproduction device 600. Specifically, control unit 510 determines whether wireless communication is allowed directly with content reproduction device 600. When YES at step S429, control proceeds to step S430. When NO at step S429, control proceeds to step S435 described afterwards. Now, assuming that wireless communication is allowed directly with content reproduction device 600, control proceeds to step S430.

At step S430, control unit 510 directly transmits to content reproduction device 600 a power OFF instruction B using communication unit 560. A power OFF instruction B is directed to setting the operation mode of a device other than the automatic powered off device, among the devices having the device designations displayed in the list image, at a standby mode. Now, suppose that the list image is list image MG500A of FIG. 45. In this case, power OFF instruction B is directed to setting the operation mode of the devices having the device designation "living room illumination" and "hallway illumination" at a standby mode. Thus, the process of step S430 ends.

In a power OFF control corresponding process T, control proceeds to step S451, after the process of step S448.

At step S451, control unit 610 determines whether a power OFF instruction B is received or not. When YES at step S451, control proceeds to step S452. When NO at step S451, the process of step S451 is performed again. Now, assuming that a power OFF instruction B is received, control proceeds to step S452.

At step S452, control unit 610 executes a process based on power OFF instruction B.

Now, suppose that the received power OFF instruction B is directed to setting the operation mode of a device having the device designation "living room illumination" and "hallway illumination" at a standby mode. In this case, control unit 610 transmits to illumination device 910 an instruction to set the operation mode of illumination device 910 with "living room illumination" as the device designation at a standby mode (hereinafter, also referred to as a standby mode setting instruction A). Further, control unit 610 transmits to illumination device 910A an instruction to set the operation mode of illumination device 910A with "hallway illumination" as the device designation at a standby mode (hereinafter, also referred to as a standby mode setting instruction B). Then, the process of step S452 ends.

Upon receiving a standby mode setting instruction A, illumination device 910 sets its own operation mode at a standby mode. Further, illumination device 910A sets its own operation mode at a standby mode upon receiving a standby mode setting instruction B.

By the process set forth above, in accordance with the operation mode of content reproduction device 600 sets at a standby mode, a plurality of devices in a normal operation mode on home network 501, excluding an automatic powered off device, can be set at a standby mode. Therefore, even if there is a device forgotten to be set at a standby mode, that relevant device can be readily set at a standby mode. In other words, even if the user forgets to turn off the power of a device, that device can be readily be powered off.

Following the process of step S452, control proceeds to step S453.

At step S453, a determination is made as to whether there is no powered on device. Specifically, control unit 610 determines whether a standby mode setting instruction to set the operation mode at a standby mode has been transmitted to all the devices with the device designation indicated by the state notification data stored in storage unit 620. When YES at step S453, the power OFF control corresponding process T ends. When NO at step S453, the process of steps S451 is performed again.

Now, suppose that the state notification data stored in storage unit 620 is state notification data TD860 of FIG. 43. Further, suppose that a standby mode setting instruction has been transmitted to all the devices having a device designation indicated in state notification data TD860. In this case, a YES determination is made at step S453, and the power OFF control corresponding process T ends.

In a power OFF control process M, control proceeds to steps 431, after the process of step S430.

At step S431, an hourly control image display process M that will be described afterwards is performed. Upon completion of an hourly control image display process M, the power OFF control process M ends.

The process in the event of a user with portable terminal device 500 moving, after the process of step S422, and portable terminal device 500 can no longer directly effect wireless communication with content reproduction device 600 will be described hereinafter.

For the sake of illustration, it is assumed that the processes of steps S423, S424, S425, S226, S428 and S429 are performed in a control device identifying control process M. In this case, a NO determination is made at step S429 and control proceeds to step S435.

At step S435, a power OFF instruction transmission process MB is performed. In a power OFF instruction transmission process MB, control unit 510 causes display unit 530 to display a remote control message for a predetermined time (for example, 2 seconds). A remote control message is, for example "the device will be powered off by remote control".

Then, control unit 510 uses communication unit 566 to transmit the aforementioned power OFF instruction B to content reproduction device 600 via telephone network 60, network 70, and communication device 50. Let the transmitted power OFF instruction be an instruction to set the operation mode of a device with the device label "living room illumination" and "hallway illumination" at a standby mode via telephone network 60, network 70, and communication device 50. Then, control proceeds to step S431.

In a power OFF control corresponding process T, the above-described processes of steps S451, S452 and S453 are performed.

By the processes set forth above, even in the case where the user with portable terminal device 500 moves, after portable terminal device 500 receives and stores state notification data, and direct wireless communication of portable terminal device 500 with content reproduction device 600 is disabled, the plurality of devices in a normal operation mode on home network 501, excluding any automatic powered OFF device, can be set at a standby mode, in accordance with the operation mode of content reproduction device 600 being set at a standby mode.

Therefore, even if there is a device forgotten to be set at a standby mode in the case where the user with portable terminal device 500 moves and direct wireless communication of portable terminal device 500 with content reproduction device 600 is disabled, that relevant device can readily have its operation state set at a standby mode. In other words, even if the user forgets to turn off the power of a device in the case where direct wireless communication of portable terminal device 500 with content reproduction device 600 is disabled, that relevant device can be readily powered off.

Next, a process in the event of a device selection decision operation M when a list image MG500A of FIG. 45 is displayed at display unit 530 will be described hereinafter. In this case, a YES determination is made at step S426, and control proceeds to step S427.

At step S427, a power control image display process M is performed. In a power control image display process M, control unit 510 generates a power control image, and displays the power control image at display unit 530. The power control image is directed to setting the operation mode of the device with the device designation selected by a device selection decision operation M at a standby mode. Namely, the power control image is directed to setting the operation mode at a standby mode for every device.

When an interface operation M for a depression process of a button image displayed at the power control image is specified, control unit 510 performs an off instruction transmission process MB that will be described afterwards. When an off instruction transmission process MB is performed, the process of step S426 is performed again.

Now, suppose that the device designation selected by a device selection decision operation M is "living room illumination", by way of example. In this case, display unit 530 displays a power control image to set the operation mode of illumination device 910 with "living room illumination" as the device designation at a standby mode. The relevant power control image includes, for example, a message "Turn power of illumination device off?", and a button image. This button image is directed to transmitting a power OFF instruction B to content reproduction device 600, in response to a depression process. For the sake of illustration, power OFF instruction B is an instruction to set the operation mode of the device with "living room illumination" as the device designation at standby mode.

Now, assume that an interface operation M for a depression process of the button image displayed in the power control image is specified. In this case, an off instruction transmission process MB is performed.

In an off instruction transmission process MB, control unit 510 transmits a power OFF instruction B to content reproduction device 600. As set forth above, suppose that the transmitted power OFF instruction B is to set the operation mode of the device with "living room illumination" for the device designation at a standby mode.

Then, control unit 510 causes display unit 530 to display a list image having the device designation "living room illumination" erased from the plurality of device designations displayed in list image MG500A. Then, the process of step S426 is performed again.

At content reproduction device 600, the processes of steps S451, S452 and S453 set forth above are performed. By these processes, the operation mode of illumination device 910 with "living room illumination" for the device designation can be set at a standby mode.

Therefore, the power can be turned off for each device by the process of step S427.

Next, the case where a NO determination is made at step S424, and control proceeds to step S424B will be described hereinafter. Now, suppose that confirmation image MG500 of FIG. 44 is displayed at display unit 530.

At step S424B, control unit 510 determines whether an hourly operation M is specified or not. This hourly operation M is an interface operation M for a depression process of button image MBG550. When YES at step S424B, control proceeds to step S431. When NO at step S424B, the process of step S424 is performed again. Now, assuming that an hourly operation M is specified, control proceeds to step S431.

At step S431, an hourly control image display process M is performed. In an hourly control image display process M, control unit 510 identifies the time zone among the plurality of time zones indicated in the hourly control device data table stored in storage unit 520, corresponding to the current time and date monitored by the time and date monitor process M. Then, control unit 510 sets the device with the device type label corresponding to the identified time zone in the hourly control device data table to a controllable state under portable terminal device 500.

Now, suppose that the hourly control device data table used in the hourly control image display process M is hourly control device data table MD810 of FIG. 36. Further, suppose that the current time and date is Jan. 14, 2008, 23:20, by way of example. In this case, the time zone identified by control unit 510 is the time zone "20:00-23:59". Therefore, control unit 510 sets content reproduction device 700 with TV-A for the device type label corresponding to time zone "20:00-23:59" at a controllable state under portable terminal device 500.

For example, control unit 510 causes display unit 530 to display a control image to control content reproduction device 700A. In this case, the control image displayed at display unit 530 includes the display image of the power string "POWER ON/POWER OFF" above button image 542AGA in control image MG400A of FIG. 37. In this case, feature button 542A corresponding to button image 542AGA functions to transmit an RC signal to set the operation mode of content reproduction device 700A at a standby mode or normal mode (hereinafter, also referred to as a power RC signal), when depressed. By this process, portable terminal device 500 attains a controllable state of content reproduction device 700A. Then, a power OFF control process M ends.

By an hourly control image display process M, portable terminal device 500 attains a state that can control a device of high usage frequency in the current time zone. For example, in the case where the user moves from the living room to the bedroom to rest, an hourly control image display process M allows portable terminal device 500 owned by the user to attain a state allowing control of the television placed in the bedroom. Accordingly, the user does not have to take the remote controller set at the bedroom. As a result, the user's convenience can be improved.

Then, the case of a YES determination at step S442 in a power OFF control corresponding process T to proceed to step S443 will be described hereinafter.

At step S443, a message transmission process TB is performed. In a message transmission process TB, control unit 610 transmits a notification message B to portable terminal device 500. The transmitted notification message B is, for example "Currently used by another device. Power cannot be turned off." Then, the process of step S441 is performed again.

In a power OFF control process M, control proceeds to step S412, after the process of step S411.

At step S412, control unit 510 determines whether a notification message B is received or not. When YES at step S412, control proceeds to step S413. When NO at step S412, control proceeds to step S414. Now, assuming that a notification message B is received, control proceeds to step S413.

At step S413, a message display process M is performed. In a message display process M, control unit 510 causes display unit 530 to display a notification image showing the received notification message B. The notification image presents the aforementioned message of, for example, "Currently used by another device. Power cannot be turned off." Then, the power OFF control process M ends.

The case where a NO determination is made at step S446 in a power OFF control corresponding process T to proceed to step S446B will be described.

At step S446B, control unit 610 transmits a device OFF notification T to portable terminal device 500. A device OFF notification T informs that there is no device powered on other than an automatic powered off device. In other words, a device OFF notification T functions to indicate that there is no device in a normal operation mode among the devices other than an automatic powered off device. Thus, the power OFF control corresponding process T ends.

In a power OFF control process M, control unit 510 determines whether a device OFF notification T is received or not at step S414, as set forth above. Now, assuming that a device OFF notification T is received, control proceeds to step S415. Let control image MG400A be displayed at display unit 530.

At step S415, an RC signal setting change process M is performed. In an RC signal setting change process M, control unit 510 changes the character string "POWER OFF" above button image 542AGA displayed in control image MG400A at display unit 530 to "POWER ON". Further, control unit 510 sets feature button 542A corresponding to button image 542AGA as a button to transmit an RC signal directed to setting the operation mode of content reproduction device 600 at a normal mode (hereinafter, also referred to as a TV power ON RC signal), when depressed. Thus, the power OFF control process M ends.

In the case where content reproduction device 600 receives a TV power OFF RC signal that is a power OFF instruction transmitted from portable terminal device 500 in the present embodiment, a plurality of state data are received from a plurality of devices in the network. Content reproduction device 600 generates state notification data from one or more state data with "ON" for the "power state", and transmits the generated state notification data to portable terminal device 500.

In response to reception of state notification data, portable terminal device 500 displays a device type label that has "ON" for the "power state". When a confirmation operation M and power OFF operation M are specified, portable terminal device 500 transmits a power OFF instruction B to content reproduction device 600. A power OFF instruction B functions to set the operation mode of the plurality of devices with a device designation displayed, excluding an automatic powered OFF device, at a standby mode. Upon receiving a power OFF instruction B, content reproduction device 600 executes a process based on a power OFF instruction B.

Therefore, in accordance with the operation mode of content reproduction device 600 being set at a standby mode, the plurality of devices in a normal operation mode on home network 501, excluding any automatic powered OFF device, can be set at a standby mode. Therefore, even if there is a device forgotten to be set at a standby mode, that relevant device can readily have its operation state set to a standby mode. In other words, even if the user forgets to turn off the power of a device, that relevant device can be readily powered off.

The device to be set at a standby mode is a device whose state data is obtained, i.e. the device presenting state data. Therefore, there can be provided an advantage that the device presenting state information indicating its state can be controlled.

Even in the case where the user with portable terminal device 500 moves, after portable terminal device 500 receives and stores state notification data, and direct wireless communication of portable terminal device 500 with content reproduction device 600 is disabled, the plurality of devices in a normal operation mode on home network 501, excluding any automatic powered OFF device, can be set at a standby mode, in accordance with the operation mode of content reproduction device 600 being set at a standby mode.

Therefore, even if there is a device forgotten to be set at a standby mode in the case where the user with portable terminal device 500 moves and direct wireless communication of portable terminal device 500 with content reproduction device 600 is disabled, that relevant device can readily have its operation state set at a standby mode. In other words, even if the user forgets to turn off the power of a device in the case where direct wireless communication of portable terminal device 500 with content reproduction device 600 is disabled, that relevant device can be readily powered off.

By an hourly control image display process M at step S431 in the present embodiment, portable terminal device 500 attains a state that can control a device of high usage frequency in the current time zone. For example, in the case where the user moves from the living room to the bedroom to rest, an hourly control image display process M allows portable terminal device 500 owned by the user to attain a state allowing control of the television placed in the bedroom. Accordingly, the user does not have to take the remote controller set at the bedroom. As a result, the user's convenience can be improved.

In the present embodiment, the operation mode of other devices in a normal operation mode is set at a standby mode, in accordance with setting the operation mode of content reproduction device 600 at a standby mode. The present invention is not limited thereto. For example, the operation mode of another device in a standby mode may be set at a normal mode in accordance with setting the operation mode of content reproduction device 600 at a standby mode. Furthermore, the operation mode of another device in a standby operation mode may be set at a normal mode in accordance with the operation mode of content reproduction device 600 in a standby operation mode being set at a normal mode.

Fourth Embodiment

A process according to a connection state of a device will be described hereinafter.

The network system of the present embodiment differs from network system 1000 of FIG. 1 in that illumination device 910, illumination device 910A, and air conditioning device 920 are absent. The remaining elements are similar to those of network system 1000, and detailed description thereof will not be repeated. The configuration of each of portable terminal device 500 and content reproduction device 600 is similar to that described above in the first embodiment. Therefore, detailed description thereof will not be repeated.

(Process when Connection State Changes)

The process when a device, a medium or the like is connected to content reproduction device 600, i.e. when the connection state of content reproduction device 600 changes (hereinafter, also referred to as a connection state change corresponding process T), will be described. It is assumed that a reception data corresponding process M is performed at portable terminal device 500. A reception data corresponding process M is performed independent of other processes. Now, suppose that the operation mode of portable terminal device 500 is set at an RC mode.

Figure 46:
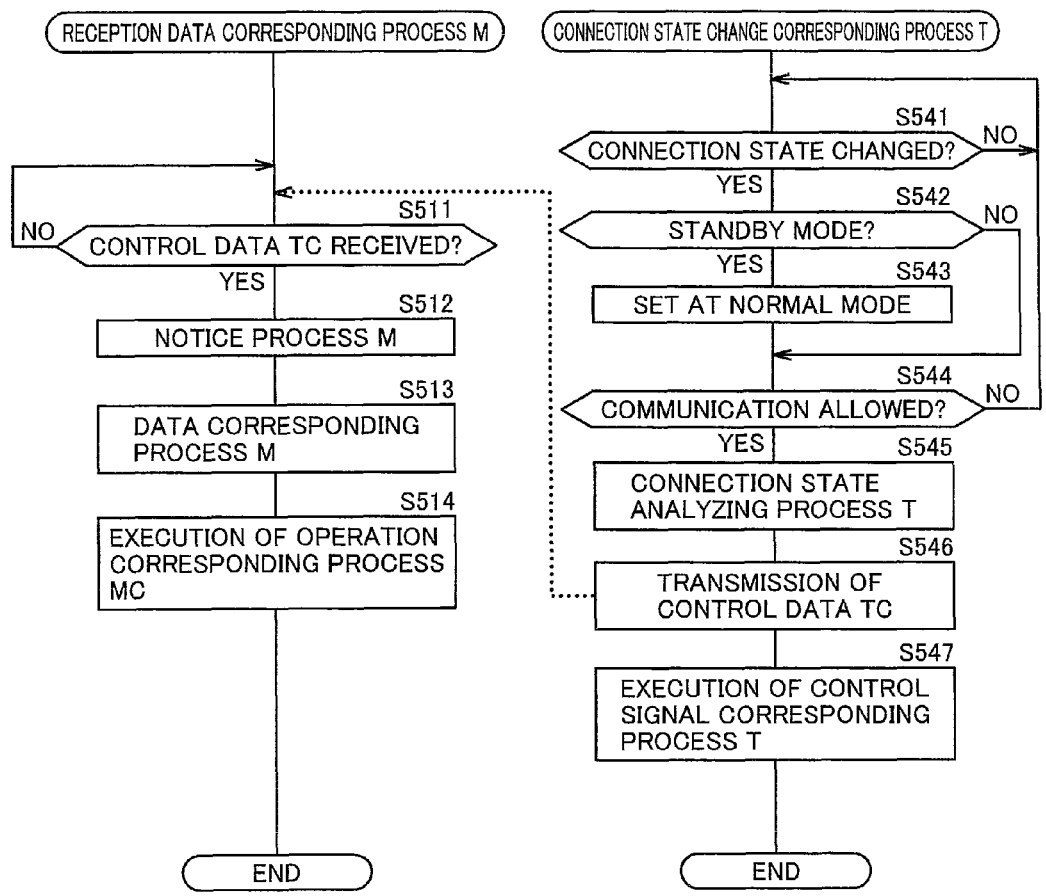
FIG. 46 is a flowchart of a reception data corresponding process M and a connection state change corresponding process T.

FIG. 46 is a flowchart of a reception data corresponding process M and a connection state change corresponding process T. Referring to FIG. 46, the process of step S541 is performed in a connection state change corresponding process T.

At step S541, control unit 610 determines whether the connection state of content reproduction device 600 has changed or not. A device, medium, or the like will be connected to content reproduction device 600. For example, when a recording medium is connected to content reproduction device 600 that does not have a recording medium connected, control unit 610 determines that the connection state of content reproduction device 600 has changed. When YES at step S541, control proceeds to step S542. When NO at step S541, the process of step S541 is performed again.

The connection state of content reproduction device 600 includes not only a physical connection state, but also a communication state with another device through wireless or wired communication. Content reproduction device 600 is provided with a recording medium insert region T not shown. Recording medium insert region T is the region to insert (connect) a recording medium to content reproduction device 600.

Now, it is assumed that, using a recording medium insert region T not shown, a recording medium is inserted to content reproduction device 600 to which a recording medium is not connected. In this case, a recording medium access unit 650 is capable of data access to the connected recording medium. Accordingly, control unit 610 senses connection of a recording medium. Namely, control unit 610 determines that there is a change in the connection state of content reproduction device 600. In this case, control proceeds to step S542.

The connected recording medium may be any medium as long as data can be recorded. The connected recording medium is, for example, recording medium 555A shown in FIG. 1, such as a USB (registered trademark) memory, memory card, DVD-ROM (Digital Versatile Disk Read Only Memory), or the like. Recording medium 555A stores content, programs, or the like.

A step S542, control unit 610 determines whether the operation mode of its own content reproduction device 600 is at a standby mode or not. When YES at step S542, control proceeds to step S543. When NO at step S542, control proceeds to step S544. Now, assuming that the operation mode of content reproduction device 600 is at a standby mode, control proceeds to step S543. A NO determination made at step S542 implies that the operation mode of content reproduction device 600 is at a normal mode.

At step S543, control unit 610 turns the aforementioned image display power switch on and sets the operation mode of content reproduction device 600 at a normal mode. Accordingly, an image can be displayed at display unit 630. Then, control proceeds to step S544.

At step S544, control unit 610 determines whether communication is allowed with portable terminal device 500 by wireless communication. When YES at step S544, control proceeds to step S545. When NO at step S544, the process of step S541 is performed again. A NO determination at step S544 implies that portable terminal device 500 is not located at a position capable of wireless communication with content reproduction device 600. Now, assuming that communication with portable terminal device 500 is allowed, control proceeds to step S545.

At step S545, a connection state analyzing process T is performed. In a connection state analyzing process T, control unit 610 analyzes the connection state of content reproduction device 600 after the change (hereinafter, simply also referred to as post-change connection state). In a connection state analyzing process T, the process carried out by control unit 610 varies according to the relevant post-change connection state.

Now, suppose that the post-change connection state is equivalent to a state in which a recording medium is connected to content reproduction device 600. Hereinafter, a recording medium connected to content reproduction device 600 is also referred to as "connected recording medium". For the sake of illustration, content subjected to encryption (hereinafter, also referred to as encrypted content) is stored in the connected recording medium. By way of example, the encrypted content can be decrypted by entering a 4-digit number.

In this case, control unit 610 in a connection state analyzing process T gains access to the data in the connected recording medium and recognizes that encrypted content is recorded in the connected recording medium. Moreover, control unit 610 recognizes that an entry of a 4-digit number is required to decrypt the encrypted content. In this case, control unit 610 generates a numeric input image TG 600 and a terminal-oriented notice image MG700, and causes display unit 630 to display only the generated numeric input image TG 600.

Figure 47:
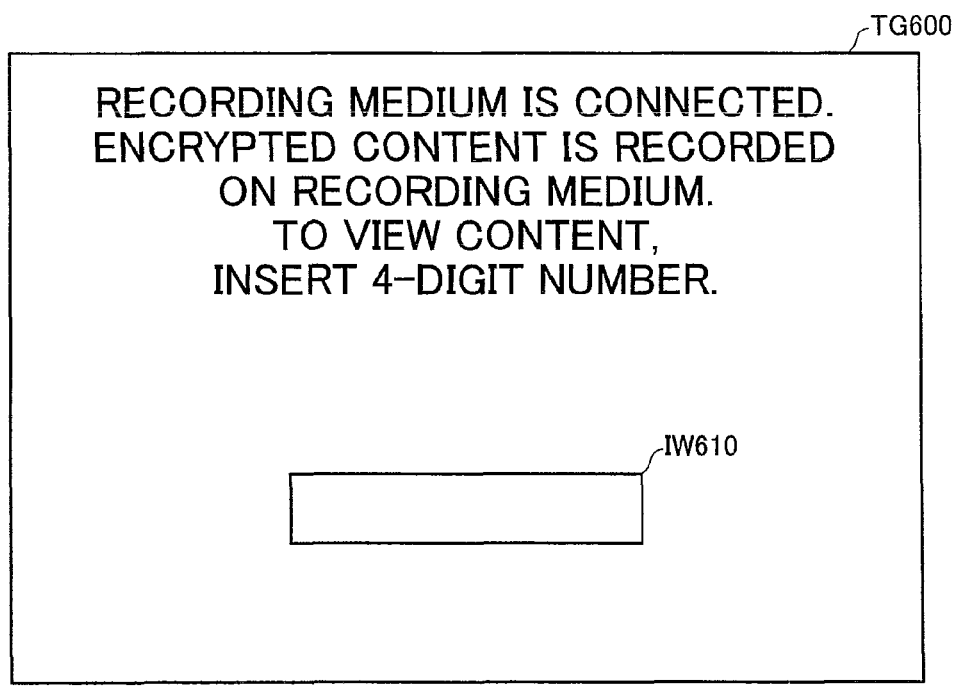
FIG. 47 represents a numeric input image, by way of example.

FIG. 47 shows a numeric input image TG600, by way of example. Referring to FIG. 47, an entry box IW610 is arranged in numeric input image TG600. Entry box IW610 is a box for entering a number.

Figure 48:
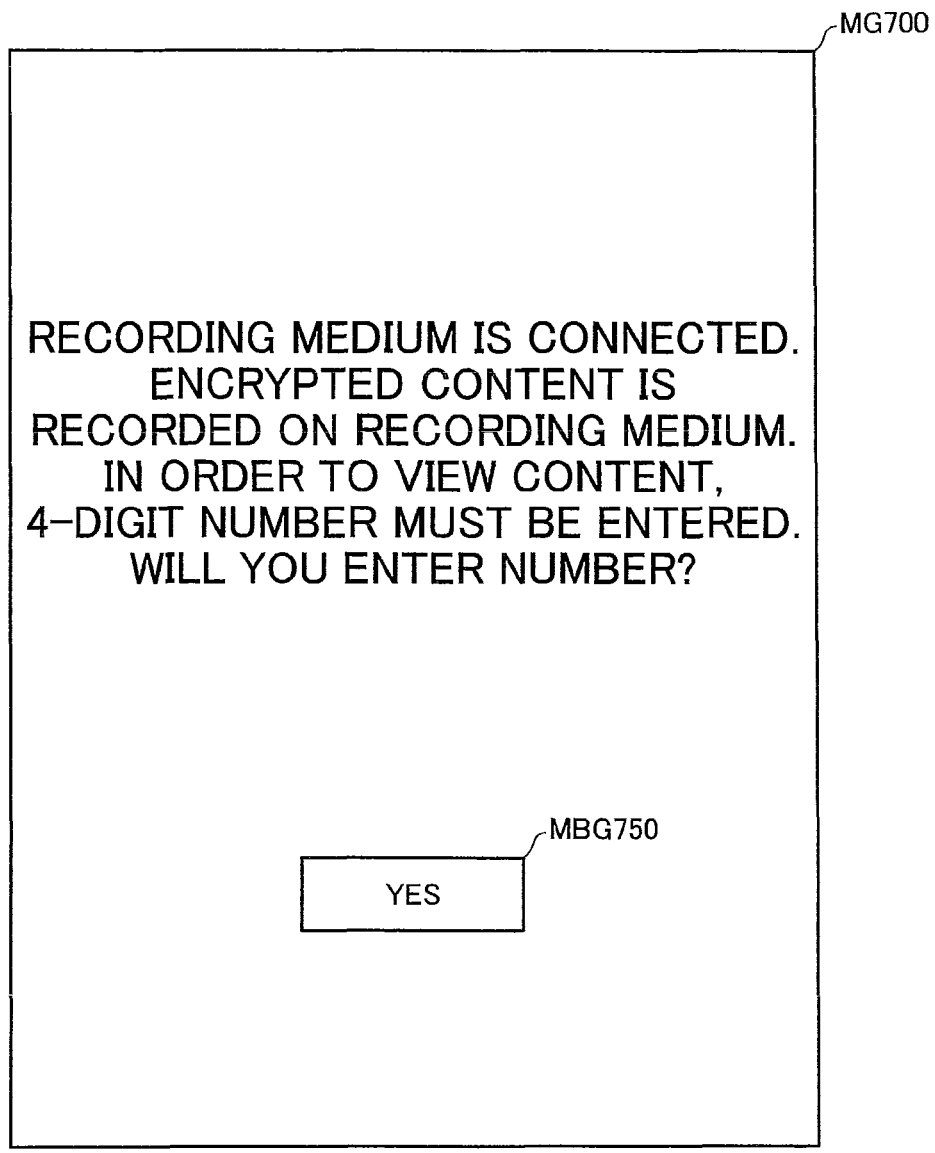
FIG. 48 shows a terminal-oriented notice image, by way of example.

FIG. 48 shows a terminal-oriented notice image MG700, by way of example.

Terminal-oriented notice image MG700 is to be displayed at display unit 530 of portable terminal device 500.

Referring to FIG. 48, a button image MBG750 is arranged in terminal-oriented notice image MG700. Button image MBG750 functions to cause display unit 530 to display a control image MG400C that will be described afterwards, in response to a depression process.

Referring to FIG. 46 again, control unit 610 in a connection state analyzing process T generates control data TC according to the post-change connection state. When the post-change connection state corresponds to a state where a recording medium is connected to content reproduction device 600 and a number must be entered, let generated control data TC be data to cause terminal-oriented notice image MG700 of FIG. 48 and a control image MG400C that will be set forth below to be displayed in order at display unit 530 of portable terminal device 500. In this case, control data TC is directed to causing display unit 530 to display control image MG400C when an interface operation M for a depression process of button image MBG750 is specified under the state where terminal-oriented notice image MG 700 is displayed at display unit 530. Then, a connection state analyzing process T under the state where a recording medium is connected to content reproduction device 600 ends.

Figure 49:
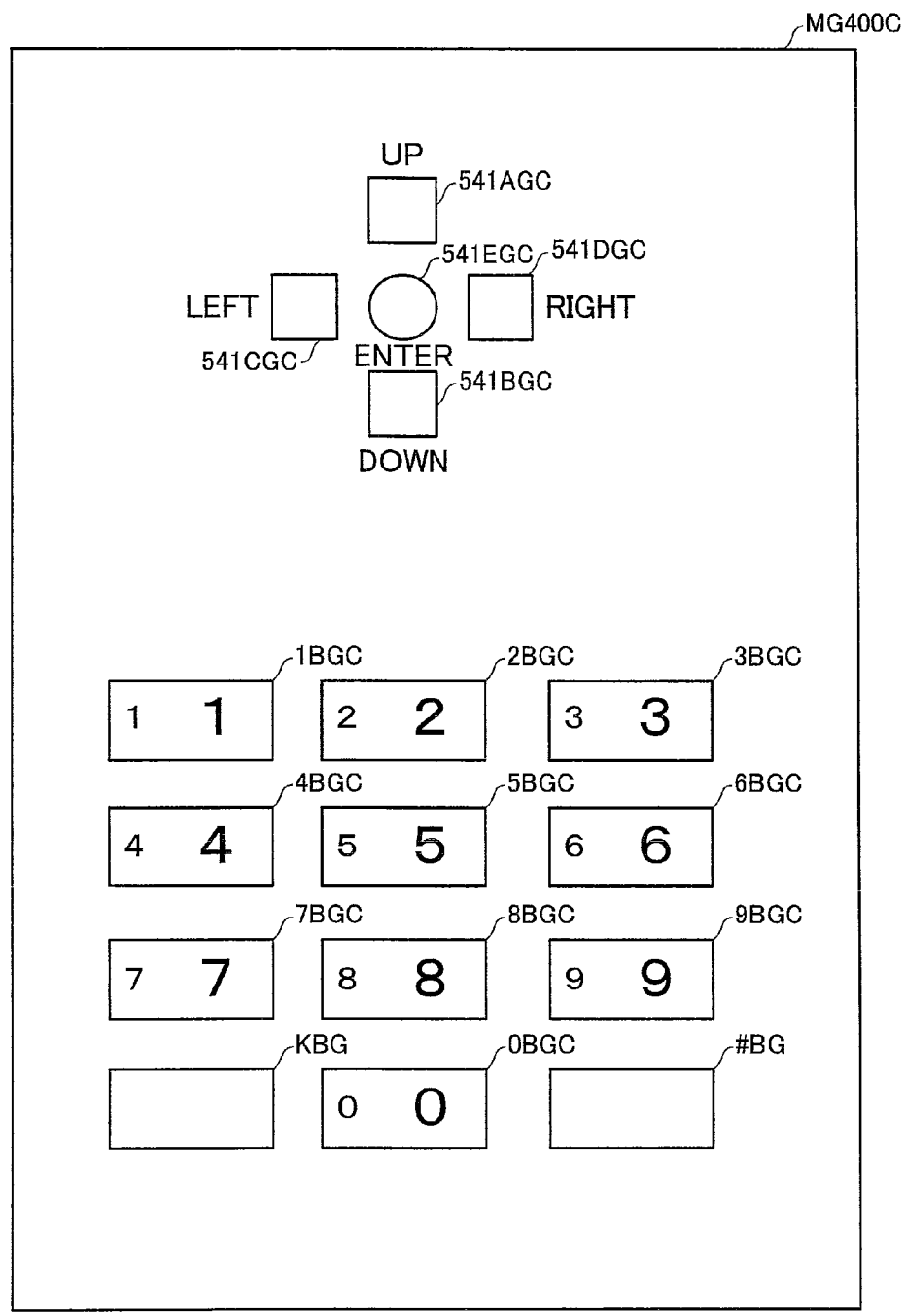
FIG. 49 represents a control image, by way of example.

FIG. 49 shows a control image MG400C, by way of example. Hereinafter, the state in which portable terminal device 500 takes an RC operation mode and control image MG400C is displayed at display unit 530 is also referred to as an MCTCC state.

Referring to FIG. 49, control image MG400C also displays direction button images 541AGC, 541BGC, 541CGC and 541DGC as well as determination button image 541EGC corresponding to direction buttons 541A, 541B, 541C and 541D as well as determination button 541E, respectively.

In an MCTCC state, direction button 541A corresponding to direction button image 541AGC functions to transmit to content reproduction device 600 an UP-RC signal, when depressed. An UP-RC signal is an RC signal to move a cursor or the like appearing in display unit 630 upwards.

In an MCTCC state, direction button 541B corresponding to direction button image 541BGC functions to transmit to content reproduction device 600 a DOWN-RC signal, when depressed. A DOWN-RC signal is an RC signal to move a cursor or the like appearing in display unit 630 downwards.

In an MCTCC state, direction button 541C corresponding to direction button image 541CGC functions to transmit to content reproduction device 600 a LEFT-RC signal, when depressed. A LEFT-RC signal is an RC signal to move a cursor or the like appearing in display unit 630 leftwards.

In an MCTCC state, direction button 541D corresponding to direction button image 541DGC functions to transmit to content reproduction device 600 a RIGHT-RC signal, when depressed. A RIGHT-RC signal is an RC signal to move a cursor or the like appearing in display unit 630 rightwards.

In an MCTCC state, determination button 541E corresponding to determination button image 541EGC functions to transmit to content reproduction device 600 an ENTER-RC signal, when depressed. An ENTER-RC signal is an RC signal to designate decision of the information entered in the input box appearing in display unit 630.

Control image MG400C also displays character button images 1BGC, 2BGC, 3BGC, 4BGC, 5BGC, 6BGC, 7BGC, 8BGC, 9BGC, KBG, OBGC, and #BG. Each of character button images 1BGC, 2BGC, 3BGC, 4BGC, 5BGC, 6BGC, 7BGC, 8BGC, 9BGC, KBG, OBGC, and #BG corresponds to any one of the plurality of character buttons in character button group 546. For example, character button image 2BGC corresponds to the character button to enter the numeric "2". For example, character button image #BG corresponds to a character button to enter character "#".

In an MCTCC state, character button images KBG and #BG are qualified as invalid buttons. An invalid button, even when depressed, does not cause a process to be performed.

In an MCTCC state, a character button corresponding to a relevant one of character button images 1BGC, 2BGC, 3BGC, 4BGC, 5BGC, 6BGC, 7BGC, 8BGC, 9BGC, and OBGC functions to transmit to content reproduction device 600 an RC signal to enter a numeric (hereinafter, also referred to as a numeric RC signal), when depressed. For example, the character button corresponding to character button image 5BGC functions to transmit to content reproduction device 600 a numeric RC signal to enter the numeric "5", when depressed.

When the post-change connection state is equivalent to a state in which a recording medium is connected to content reproduction device 600 and a numeric has to be entered, control data TC includes data representing the corresponding relationship between the plurality of button images displayed in control image MG400C and the buttons provided at portable terminal device 500, and data of RC signals to be used in response to depression of a button at portable terminal device 500.

Referring to FIG. 46 again, control proceeds to step S546, after the process of step S545.

At step S546, control unit 610 transmits, through near-field wireless communication using communication unit 660, the generated control data TC to portable terminal device 500. Thus, a connection state analyzing process T ends.

At step S547, control unit 610 executes a control signal corresponding process T. A control signal corresponding process T is performed independent of other processes.

In a control signal corresponding process T, control unit 610 performs a process corresponding to the received RC signal that is a control signal.

In a reception data corresponding process M, first the process of step S511 is performed.

At step S511, control unit 510 determines whether control data TC is received or not. When YES at step S511, control proceeds to step S512. When NO at step S511, the process of step S511 is performed again. Now, assuming that control data TC is received, control proceeds to step S512.

At step S512, a notice process M is performed. A notice process M is to notify change in the connection state of content reproduction device 600. In a notice process M, a vibration occurrence process is performed. In a vibration occurrence process, control unit 510 transmits a control instruction to vibrator 579 (hereinafter, also referred to as a vibration control instruction) to cause vibration at vibrator 579. Upon receiving a vibration control instruction, vibrator 579 vibrates at its own for a predetermined time (for example, 2 seconds) to cause portable terminal device 500 to vibrate.

In a notice process M, a sound generation process may be performed instead of the vibration generation process. In a sound generation process, control unit 510 transmits to audio output unit 572 sound data to notify change in the connection state of content reproduction device 600. Audio output unit 572 outputs sound based on the received audio data (for example, a bleep) from the speaker. Thus, the process of step S512 ends.

By the notice process M set forth above, the user can readily become aware that the connection state of content reproduction device 600 has changed.

Following the process of step S512, control proceeds to step S513.

At step S513, a data corresponding process M is performed. In a data corresponding process M, control unit 510 performs a process according to the received control data TC.

Now suppose that control data TC is generated by a connection state analyzing process T when the post-change connection state corresponds to a state in which a recording medium is connected to content reproduction device 600 and a numeric has to be entered. In this case, control unit 510 uses control data TC to cause display unit 530 to display terminal-oriented notice image MG700 of FIG. 48.

When an interface operation M for a depression process of button image MBG750 is specified, control unit 510 uses control data TC to cause display unit 530 to display control image MG400C of FIG. 49. In this case, portable terminal device 500 attains an MCTCC state. Namely, portable terminal device 500 attains a controllable state with content reproduction device 600. In other words, portable terminal device 500 attains a state allowing entry of a numeric by controlling content reproduction device 600. Then, control proceeds to step S514.

At step S514, control unit 510 executes an operation corresponding process MC. An operation corresponding process MC is performed independent of other processes. Then, the reception data corresponding process M ends.

In an operation corresponding process MC, control unit 510 performs a process corresponding to the operation made at portable terminal device 500. Specifically, control unit 510 determines whether a button corresponding to a button image arranged in the control image displayed at display unit 530 is depressed or not. Control unit 510 performs a process assigned to a button, in response to depression of the button.

Now, suppose that the control image displayed at display unit 530 is a control image MG400C of FIG. 49. Let a numeric input image TG600 be displayed at display unit 630. In this case, when a character button corresponding to character button image 5BGC, for example, is depressed, control unit 510 transmits a numeric RC signal to enter a numeric "5" to content reproduction device 600.

Upon receiving a numeric RC signal to enter the numeric "5" at content reproduction device 600, control unit 610 displays numeric "5" in input box IW610 in a control signal corresponding process T performed independent of other processes. In the case where a 4-digit number to decrypt the encrypted content is entered at input box IW610, control unit 610 decrypts the encrypted content, and causes display unit 630 to display the decrypted content. The decrypted content is, for example, a motion picture, a still picture, and the like.

By the process set forth above, portable terminal device 500 can attain a controllable state with content reproduction device 600 according to a post-change connection state. In other words, there is provided an advantage that portable terminal device 500 identified as another device can attain a controllable state with a device corresponding to the connection state of content reproduction device 600.

Another example corresponding to the case where the connection state of content reproduction device 600 has changed will be described hereinafter. Now, suppose that content reproduction device 600 to which a recording medium was not connected is now connected with a recording medium utilizing a recording medium insert region T not shown.

In this case, a YES determination is made at step S541 to proceed to step S542.

The process of step S542 is performed, and then, if required, the process of step S543 is performed to proceed to step S544.

At step S544, a YES determination is made to proceed to step S545.

At step S545, the aforementioned connection state analyzing process T is performed. Now, suppose that motion picture content is recorded in the connected recording medium connected to content reproduction device 600.

In this case, control unit 610 in a connection state analyzing process T gains access to the data in the connected recording medium, and recognizes that motion picture content is recorded in the connected recording medium. Control unit 610 generates a notice image TA and a terminal-oriented notice image MA, and causes display unit 630 to display only the generated notice image TA. Notice image TA includes a message TA, which is, for example, "Recording medium has been connected. Motion picture content is recorded in the recording medium."

Terminal-oriented notice image MA is to be displayed at display unit 530 of portable terminal device 500. A message MA is displayed at terminal-oriented notice image MA, which is, for example, "Recording medium has been connected. Motion picture content is recorded in the recording medium. Do you wish to reproduce the motion picture?" Further, a button image MA is arranged in terminal-oriented notice image MA. Button image MA is directed to display control image MG400 of FIG. 26 at display unit 530, when depressed.

In a connection state analyzing process T, control unit 610 generates control data TC according to the post-change connection state. Suppose that the generated control data TC is directed to displaying in sequence the aforementioned terminal-oriented notice image MA and control image MG400 of FIG. 26 at display unit 530 of portable terminal device 500 when the post-change connection state is equivalent to the state in which a recording medium is connected to content reproduction device 600 and motion picture content is recorded in that recording medium. In this case, it is assumed that control data TC includes data to display control image MG400 at display unit 530 when an interface operation M for a depression process of button image MA is specified with terminal-oriented notice image MA displayed at the display unit 530. Further in this case, it is assumed that control data TC includes data to transmit an RC signal to reproduce motion picture content (hereinafter, also referred to as a reproduction RC signal) to content reproduction device 600 when an interface operation M for a depression process of button image MA is specified.

In this case, the generated control data TC also includes data indicating the corresponding relationship between the plurality of button images displayed at control image MG400 and the buttons provided at portable terminal device 500, and also the data of RC signals used in response to depression of a button at portable terminal device 500.

At step S546, a process similar to that described above is performed. Therefore, detailed description thereof will not be repeated. By this process, the generated control data TC is transmitted to portable terminal device 500.

At step S547, a similar operation is performed. Therefore, detailed description thereof will not be repeated.

In a reception data corresponding process M, the processes of steps S511 and S512 are performed, similar to those described above. At step S513, a data corresponding process M, similar to that described above, is performed.

In a reception data corresponding process M, control unit 510 uses control data TC to display terminal-oriented notice image MA at display unit 530. When an interface operation M for a depression process of button image MA is specified, control unit 510 uses control data TC to display control image MG400 of FIG. 26 at display unit 530. In this case, portable terminal device 500 attains an MCTC state. Namely, portable terminal device 500 attains a state controllable of content reproduction device 600. In other words, portable terminal device 500 can control the reproduction of the motion picture content stored in the recording medium by controlling content reproduction device 600.

Further, control unit 510 transmits to content reproduction device a reproduction RC signal to reproduce the motion picture content. Upon receiving a reproduction RC signal at content reproduction device 600, control unit 610 in a control signal corresponding process T that is performed independent of other processes reproduces the motion picture content, and causes display unit 630 to display a reproduced image of the motion picture content.

At step S514, a process similar to that set forth above is performed. Therefore, detailed description thereof will not be repeated. By this process, an operation corresponding process MC is executed.

In an operation corresponding process MC, a process similar to that described above is performed. Therefore, detailed description thereof will not be repeated.

Now, suppose that the control image displayed at display unit 530 is control image MG400 of FIG. 26. Also, suppose that the motion picture content is reproduced at content reproduction device 600, and a reproduced image of the motion picture content is displayed at display unit 630.

In this case, when determination button 541E corresponding to determination button image 541EG, for example, is depressed, an RC signal to temporarily stop the reproduced content (hereinafter, also referred to as a temporary-stop RC signal) is transmitted to content reproduction device 600. Upon receiving a temporary-stop RC signal at content reproduction device 600, control unit 610 in a control signal corresponding process T that is performed independent of other processes temporarily stops the reproduced motion picture content.

By the process set forth above, portable terminal device 500 can attain a state controllable of content reproduction device 600 corresponding to the post-change connection state. In other words, there can be provided the advantage of implementing portable terminal device 500 that is another device to become controllable of a device according to the connection state of content reproduction device 600.

Another example corresponding to the case where the connection state of content reproduction device 600 has changed will be described hereinafter. Now, suppose that the main power of recorder device 600A is off. In this case, recorder device 600A attains a state not capable of communication with content reproduction device 600. Under this state, it is assumed that the main power of recorder device 600A is turned on, and recorder device 600A attains a normal operation mode, allowing communication between content reproduction device 600 and recorder device 600A. In other words, the connection state of content reproduction device 600 with another device has changed.

In this case, control unit 610 determines, at step S541, that the communication connection state of content reproduction device 600 has changed and proceeds to step S542.

The process at step S542 is performed, and then, if necessary, the process of step S543 is performed to proceed to step S544.

At step S544, a YES determination is made, and control proceeds to step S545.

At step S545, the aforementioned connection state analyzing process T is performed. Now, suppose that motion picture content is recorded at recorder device 600A.

In this case, control unit 610 in a connection state analyzing process T generates a notice image TB and a terminal-oriented notice image MB, and causes display unit 630 to display only the generated notice image TB. A message TB is displayed at notice image TB, which is, for example, "A recorder device has been connected. Motion picture content is recorded in the recorder device." In a connection state analyzing process T, a process TC set forth below may be performed instead of displaying a notice image TB at display unit 630.

A process TC includes, for example, a process of switching the input for content reproduction device 600 to display a screen of recorder device 600A that is an external device. A process TC also includes a process of displaying a notice image TB at a region in an image (for example, a TV image) displayed at display unit 630. Further, a process TC includes a process of displaying a message TB at display unit 630 as tickers. Moreover, a process TC includes a process of displaying at display unit 630 an icon, for example, notifying that a recorder device is connected.

Terminal-oriented notice image MB is to be displayed at display unit 530 of portable terminal device 500. A message MB is displayed at terminal-oriented notice image MB, which is, for example, "Recorder device has been connected. Motion picture content is recorded in the recorder device. Do you wish to reproduce the motion picture?" Further, a button image MB is arranged in terminal-oriented notice image MB. Button image MB is directed to displaying control image MG400 of FIG. 26 at display unit 530, in response to a depression process.

In a connection state analyzing process T, control unit 610 generates control data TC according to the post-change connection state. Suppose that the generated control data TC includes data to display in sequence the aforementioned terminal-oriented notice image MB and control image MG400 of FIG. 26 at display unit 530 of portable terminal device 500 when the post-change connection state is equivalent to the state in which a recorder device 600A is connected to content reproduction device 600. Now, suppose that control image MG400 functions to control recorder device 600A.

In this case, it is assumed that control data TC includes data to display control image MG400 at display unit 530 when an interface operation M for a depression process of button image MB is specified with a terminal-oriented notice image MB displayed at the display unit 530. Further, in this case, it is assumed that control data TC includes data to transmit, when an interface operation M for a depression process of button image MB is specified, an RC signal to content reproduction device 600 to switch the input to display a screen of recorder device 600A (hereinafter, also referred to as an input switching RC signal) and an RC signal to recorder device 600A to reproduce the motion picture content.

In this case, the generated control data TC also includes data indicating the corresponding relationship between the plurality of button images displayed at control image MG400 and the buttons provided at portable terminal device 500, and also the data of RC signals used in response to depression of a button at portable terminal device 500. It is assumed that an RC signal used in response to depression of a button provided at portable terminal device 500 in an MCTC state is an RC signal for reproduction-control of the motion picture content in recorder device 600A. Namely, the generated control data TC is data for controlling recorder device 600A.

At step S546, a process similar to that described above is performed. Therefore, detailed description thereof will not be repeated. By this process, the generated control data TC is transmitted to portable terminal device 500.

At step S547, a similar operation is performed. Therefore, detailed description thereof will not be repeated.

In a reception data corresponding process M, the processes of steps S511 and S512 are performed, similar to those described above. At step S513, a data corresponding process M, similar to that described above, is performed.

In a reception data corresponding process M, control unit 510 uses control data TC to display terminal-oriented notice image MB at display unit 530. When an interface operation M for a depression process of button image MB is specified, control unit 510 uses control data TC to display control image MG400 of FIG. 26 at display unit 530. In this case, portable terminal device 500 attains an MCTC state. Namely, portable terminal device 500 attains a state controllable of content recorder device 600A. In other words, portable terminal device 500 can control the reproduction of the motion picture content stored at recorder device 600A.

Further, control unit 510 transmits to content reproduction device 600 an input switching RC signal. Control unit 510 also transmits to recorder device 600A a reproduction RC signal.

Upon receiving an input switching RC signal at content reproduction device 600 in a control signal corresponding process T that is performed independent of other processes, input switching is performed to display a screen of recorder device 600A that is an external device.

Upon receiving a reproduction RC signal, recorder device 600A reproduces the motion picture content, and transmits to content reproduction device 600 data of the reproduction image of the motion picture content (hereinafter, also referred to as reproduction data).

At step S514, a process similar to that set forth above is performed. Therefore, detailed description thereof will not be repeated. By this process, an operation corresponding process MC is executed.

In an operation corresponding process MC, a process similar to that described above is performed. Therefore, detailed description thereof will not be repeated.

Now, suppose that the control image displayed at display unit 530 is control image MG400 of FIG. 26. As mentioned before, control image MG400 is a control image to control recorder device 600A. Also, suppose that the reproduced image of the motion picture content reproduced at recorder device 600A is displayed at display unit 630 of content reproduction device 600.

In this case, when determination button 541E corresponding to determination button image 541EG, for example, is depressed, in an operation corresponding process MC, control unit 510 transmits to recorder device 600A a temporary-stop RC signal to temporarily stop the reproduced content. Upon receiving a temporary-stop RC signal, recorder device 600A temporarily stops the reproduced motion picture content.

By the process set forth above, portable terminal device 500 can attain a state controllable of recorder device 600A corresponding to the post-change connection state. In other words, there can be provided the advantage of implementing portable terminal device 500 that is another device to become controllable of a device according to the connection state of content reproduction device 600.

In the present embodiment, an image pickup device (for example, a digital video camera) may be connected to content reproduction device 600 using a video terminal not shown, provided at content reproduction device 600, and a video cable. In this case, a reception data corresponding process M and a connection state change corresponding process T are carried out, in a manner as described above. Suppose that a control image to control the image pickup device is displayed at display unit 530 of portable terminal device 500 by these processes. Therefore, portable terminal device 500 can control the reproduction of motion picture content recorded at the image pickup device. For example, when the power of an HDD recorder connected to content reproduction device 600 is turned ON, the operation menu may be displayed at portable terminal device 500.

In the present embodiment, a portable terminal device recorded with content (hereinafter, also referred to as a content terminal device) may be connected to a communication terminal not shown provided at content reproduction device 600, and a communication cable. The content reproduction device is, for example, a music player, a cellular phone, or the like. The content recorded in the content terminal device includes, for example, music content, motion picture content, and still picture content image.

In this case, a reception data corresponding process M and connection state change corresponding process T are performed, in a manner as described above. Suppose that a control image to control the content reproduction device is displayed at display unit 530 of portable terminal device 500 by these processes. Therefore, portable terminal device 500 is capable of controlling the reproduction of the content recorded at the content reproduction device.

As described above, content reproduction device 600 determines whether there is change in the connection state of content reproduction device 600 in the present embodiment. When the connection state changes, content reproduction device 600 generates control data TC to control a device according to the connection state, and transmits control data TC to portable terminal device 500. Portable terminal device 500 performs a process based on the received control data TC. By this process, there can be provided an advantage of implementing portable terminal device 500 identified as another device to attain a state controllable of a device according to the connection state of content reproduction device 600.

(Functional Block Diagram)

Figure 50:
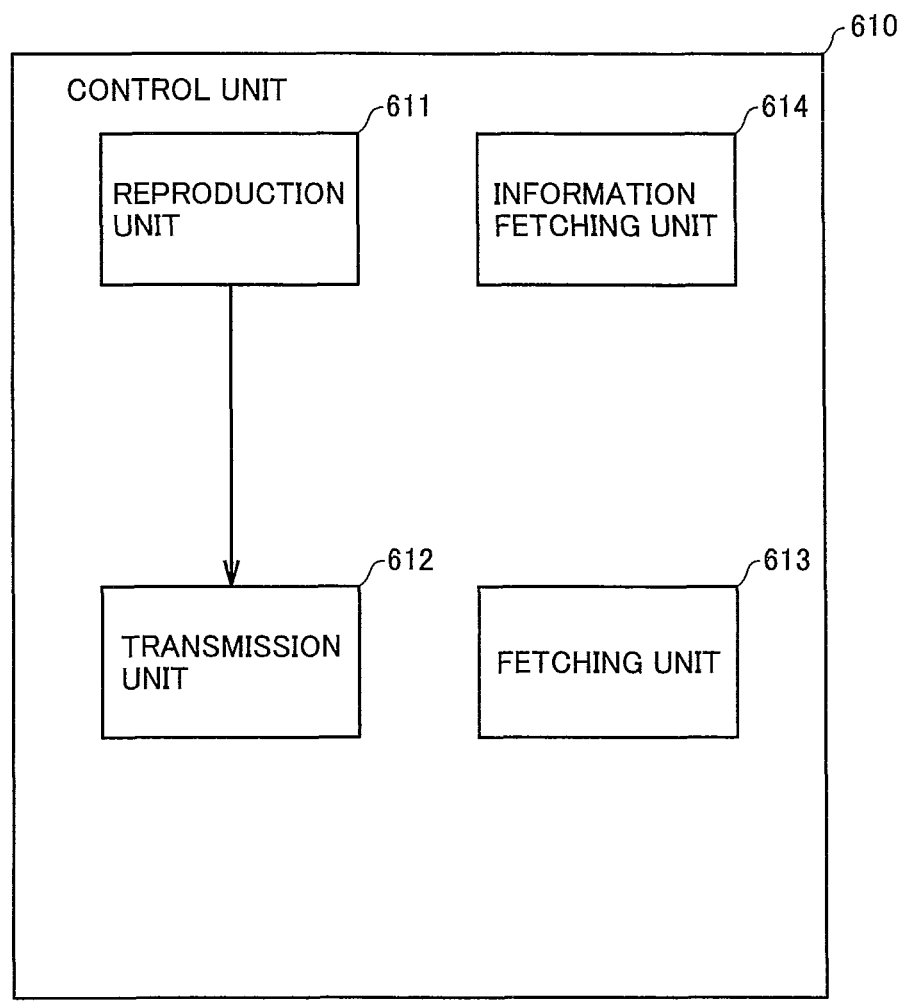
FIG. 50 is a functional block diagram of a control unit according to a first embodiment.

FIG. 50 is a functional block diagram of control unit 610 of the first embodiment. Referring to FIG. 50, control unit 610 includes a reproduction unit 611 and a transmission unit 612.

Now, storage unit 620 shown in FIG. 4 stores content, and environment information corresponding to the content. Reproduction unit 611 reproduces the content. When the content is reproduced by reproduction unit 611, transmission unit 612 transmits to portable terminal device 500 the environment generation control information to generate reproduction environment based on the environment information corresponding to the content.

Control unit 610 further includes a fetching unit 613. Fetching unit 613 fetches content, and environment information corresponding to the content.

Control unit 610 further includes an information fetching unit 614. Information fetching unit 614 fetches environment generation control information to generate the reproduction environment for content reproduction device 600 under a state in which control of an external device is not performed by portable terminal device 500.

All or some of reproduction unit 611, transmission unit 612, fetching unit 613 and information fetching unit 614 in control unit 610 may be implemented in hardware. Further, all or some of reproduction unit 611, transmission unit 612, fetching unit 613 and information fetching unit 614 may be a module of a program executed by control unit 610.

Figure 51:
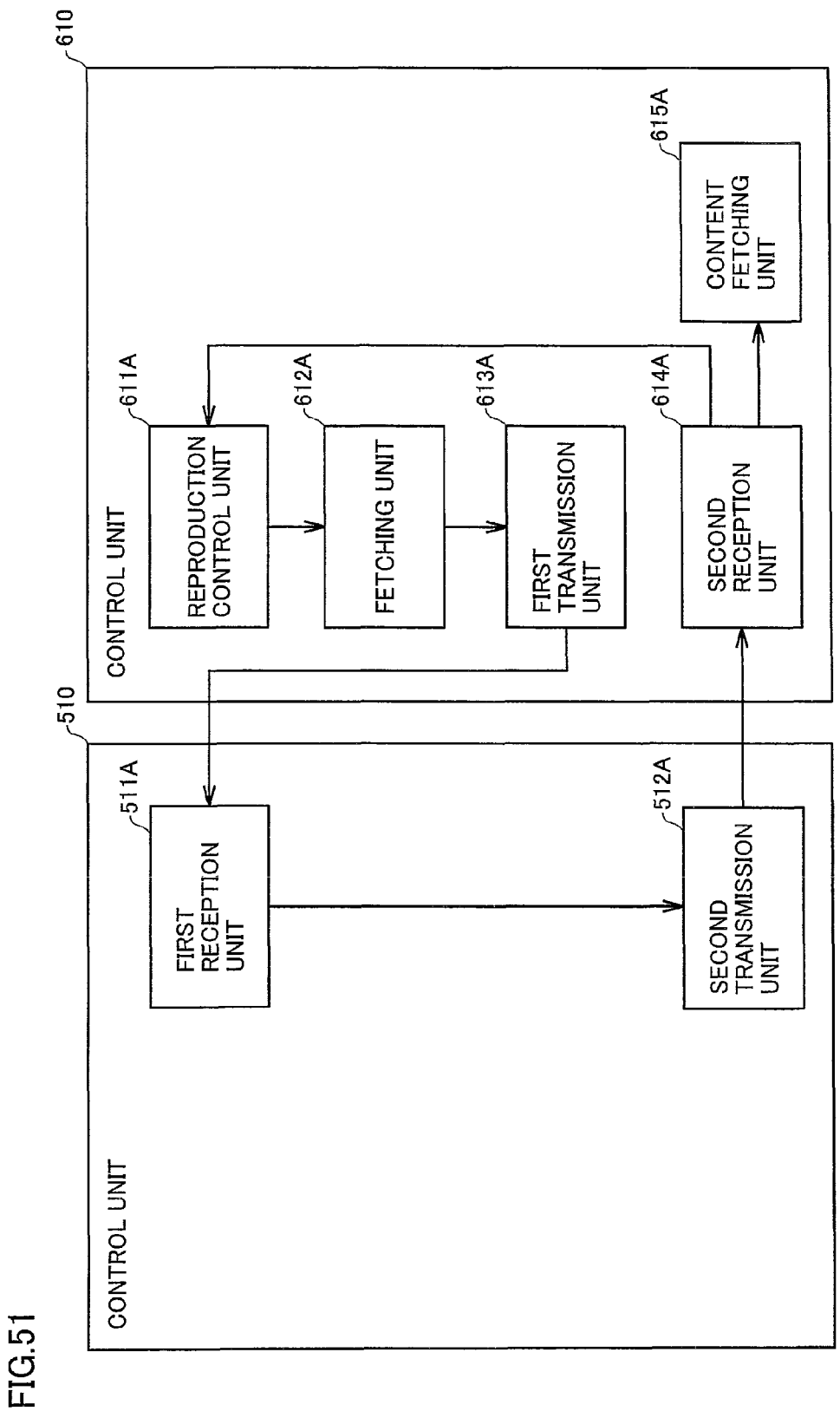
FIG. 51 is a functional block diagram of two different control units according to a second embodiment.

FIG. 51 is a functional block diagram of control unit 510 and control unit 610 according to the second embodiment. Referring to FIG. 51, control unit 510 includes a first reception unit 511A, and a second transmission unit 512A. Control unit 610 includes a reproduction control unit 611A, a fetching unit 612A, a first transmission unit 613A and a second reception unit 614A.

Reproduction control unit 611A controls reproduction of content. Fetching unit 612A fetches reproduction information that is the information to reproduce reproduction stopped content that is the content whose reproduction is stopped by reproduction control unit 611A. First transmission unit 613A transmits the reproduction information to portable terminal device 500.

First reception unit 511A receives the reproduction information transmitted from content reproduction device 600. Storage unit 520 of FIG. 3 stores the received reproduction information. Second transmission unit 512A transmits to content reproduction device 600 the reproduction information stored in storage unit 520.

Second reception unit 614A receives the reproduction information transmitted from portable terminal device 500. Reproduction control unit 611A uses the received reproduction information to reproduce the reproduction stopped content.

Control unit 610 further includes a content fetching unit 615A. The reproduction information includes location information indicating the location of content. Content fetching unit 615A fetches content according to the location information.

All or some of first reception unit 511A and second transmission unit 512A in control unit 510 may be implemented in hardware. Further, all or some of first reception unit 511A and second transmission unit 512A may be a module of a program executed by control unit 510.

Further, all or some of reproduction control unit 611A, fetching unit 612A, first transmission unit 613A, second reception unit 614A and content fetching unit 615A may be implemented in hardware. Further, all or some of reproduction control unit 611A, fetching unit 612A, first transmission unit 613A, second reception unit 614A and content fetching unit 615A may be a module of a program executed by control unit 610.

Figure 52:
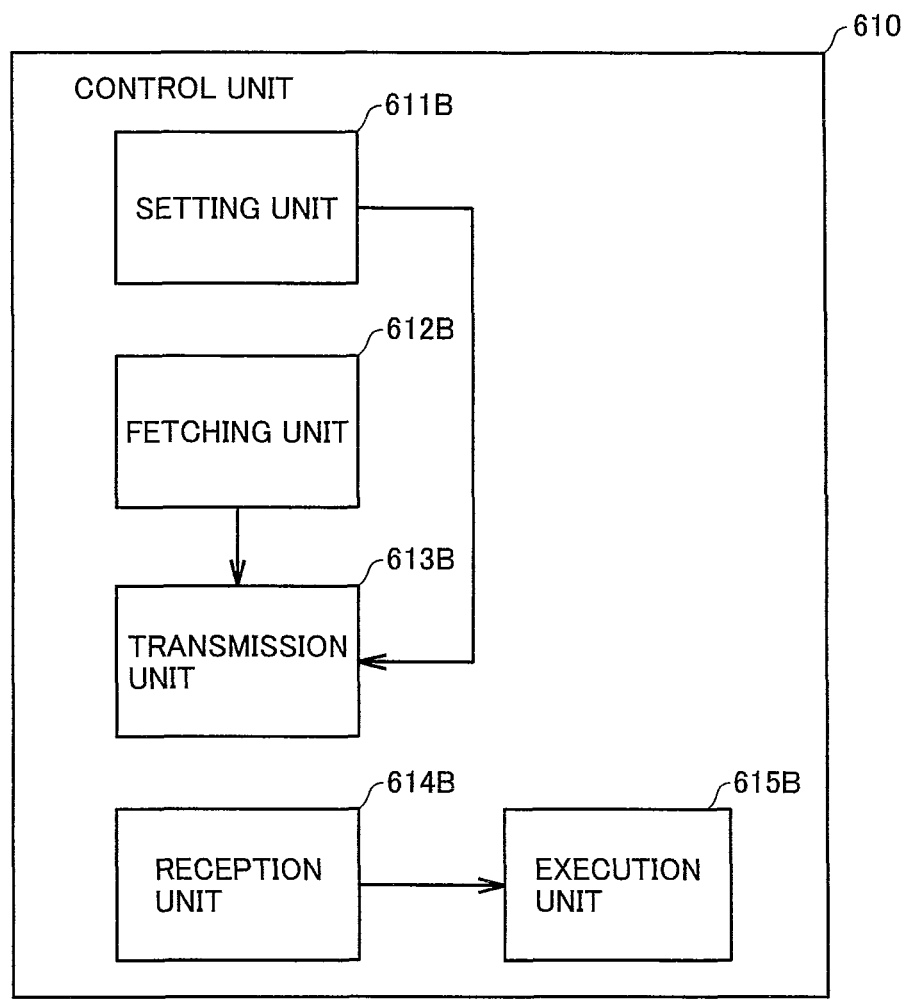
FIG. 52 is a functional block diagram of a control unit according to a third embodiment.

FIG. 52 is a functional block diagram of a control unit 610 according to a third embodiment. Referring to FIG. 52, control unit 610 includes a setting unit 611B, a fetching unit 612B, a transmission unit 613B, a reception unit 614B and an execution unit 615B.

Setting unit 611B sets content reproduction device 600 at an operating state, or a standby state having lower power consumption than in an operating state. Fetching unit 612B fetches the state information indicating the state of a device near the content reproduction device. Transmission unit 613B transmits to portable terminal device 500 the obtained state information, according to the setting of the state of content reproduction device 600 by setting unit 611B.

Portable terminal device 500 transmits to content reproduction device 600 a control instruction to control the device presenting the state information, based on the received state information.

Reception unit 614B receives the control instruction transmitted from portable terminal device 500 receiving the state information. Execution unit 615B performs a process according to the received control instruction.

All or a portion of setting unit 611B, fetching unit 612B, transmission unit 613B, reception unit 614B and execution unit 615B, included in control unit 610, may be implemented in hardware. Further, all or some of setting unit 611B, fetching unit 612B, transmission unit 613B, reception unit 614B and execution unit 615B may be a module of a program executed by control unit 610.

Figure 53:
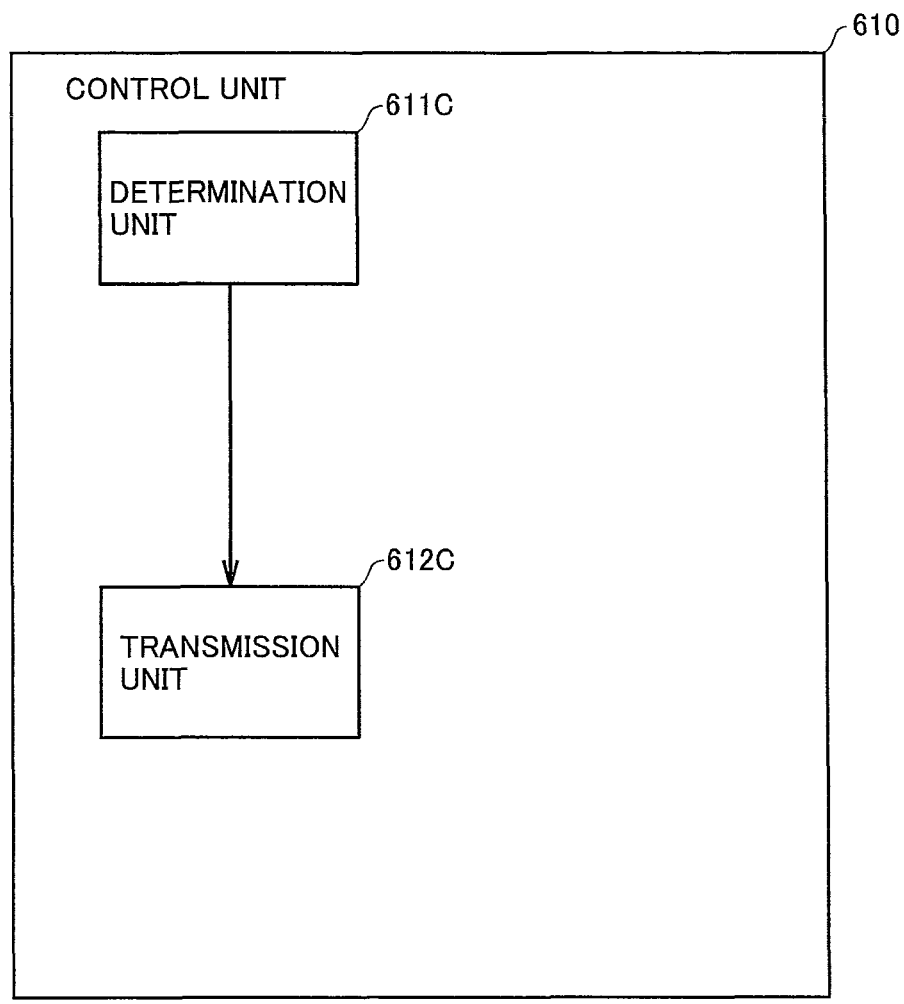
FIG. 53 is a functional block diagram of a control unit according to a fourth embodiment.

FIG. 53 is a functional block diagram of a control unit 610 according to a fourth embodiment. Referring to FIG. 53, control unit 610 includes a determination unit 611C and a transmission unit 612C.

Determination unit 611C determines whether there is a change in the connection state of content reproduction device 600. When a determination is made that there is a change in the connection state by determination unit 611C, transmission unit 612C transmits to portable terminal device 500 control information to control a device according to the post-change connection state.

All or some of determination unit 611C and transmission unit 612C included in control unit 610 may be implemented in hardware. Further, all or some of determination unit 611C and transmission unit 612C may be a module of a program executed by control unit 610.

It should be understood that the embodiments disclosed herein are illustrative and non-restrictive in every respect. The scope of the present invention is defined by the appended claims, rather than the description set forth above, and all changes that fall within limits and bounds of the claims, or equivalence thereof are intended to be embraced by the claims.

The invention claimed is:

1. A content reproduction device configured to communicate with a portable terminal device to control an external device for presenting an ambient physical reproduction environment customized for content, based on an environment control program, the portable terminal device capable of communication with said external device, for communicating an environment control signal corresponding to said content to said external device, said portable terminal controlling said external device based on the environment control signal, the external device for changing an ambient physical reproduction environment in correspondence with said content, said content reproduction device comprising:

a storage unit for storing said content in association with environment information as a recommended environment for reproducing the content, wherein the environment information is dependent upon the content and is used to establish the ambient physical reproduction environment suitable for reproducing the corresponding content, a reproduction unit for reproducing said content, and a transmission unit for transmitting, to said portable terminal device, said environment control program, when said reproduction unit reproduces said content, such that the reproduced content is presented in correspondence with the ambient physical reproduction environment.

2. The content reproduction device according to claim 1, wherein said transmission unit transmits said environment control program to said portable terminal device through near-field wireless communication.

3. The content reproduction device according to claim 1, wherein said environment information includes at least one environment item, and a predetermined value suitable for said content, associated with each of said at least one environment item.

4. The content reproduction device according to claim 3, wherein said at least one environment item includes at least one of ambient temperature, humidity, and light intensity.

5. The content reproduction device according to claim 1, comprising an information fetching unit for fetching control information to specify said ambient physical reproduction environment in a state where control of said external device is not performed by said portable terminal device, wherein said transmission unit transmits said control information to said portable terminal device according to reproduction of said content being stopped.

6. A content reproduction method for presenting an ambient physical reproduction environment suitable for content by an external device, a portable terminal device, and a content reproduction device, said content reproduction method comprising:

said content reproduction device storing content in association with environment information, as a recommended environment for reproducing the content, wherein the environment information is dependent upon the content and is used to establish the ambient physical reproduction environment suitable for reproducing the corresponding content, said content reproduction device reproducing said content, said content reproduction device transmitting, to said portable terminal device, an environment control program, when said content is to be reproduced, said portable terminal device sending an instruction to said external device based on said environment control program, and said external device changing the ambient physical reproduction environment, in correspondence with reproduction of said content by said content reproduction device, based on said instruction from said portable terminal device.

7. A content reproduction system for presenting reproduction environment suitable for content, comprising:

an external device for changing an ambient physical reproduction environment in correspondence with said content, a portable terminal device capable of communication with said external device, for communicating an environment control signal corresponding to said content to said external device, said portable terminal controlling said external device based on the environment control signal, and a content reproduction device, said content reproduction device including a storage unit for storing said content in association with environment information as a recommended environment for reproducing said content, wherein the environment information is dependent upon the content, and is used to establish the ambient physical reproduction environment suitable for reproducing the corresponding content, a reproduction unit for reproducing said content, and a transmission unit for transmitting an environment control program according to said content to said portable terminal device when said reproduction unit reproduces said content such that the external device customizes the ambient physical reproduction environment based on said environment control signal from said control program being executed in said portable terminal while the content is being reproduced by said reproduction unit.

* * * * *